US012748047B2

(12) United States Patent
Yasuhiko et al.

(10) Patent No.: US 12,748,047 B2
(45) Date of Patent: Sep. 29, 2026

(54) OBSERVATION DEVICE AND OBSERVATION METHOD

(71) Applicant: HAMAMATSU PHOTONICS K.K., Hamamatsu (JP)

(72) Inventors: Osamu Yasuhiko, Hamamatsu (JP); Kozo Takeuchi, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 197 days.

(21) Appl. No.: 18/704,137

(22) PCT Filed: Sep. 29, 2022

(86) PCT No.: PCT/JP2022/036582

§ 371 (c)(1),
(2) Date: Apr. 24, 2024

(87) PCT Pub. No.: WO2023/095442

PCT Pub. Date: Jun. 1, 2023

(65) Prior Publication Data

US 2024/0410825 A1 Dec. 12, 2024

(30) Foreign Application Priority Data

Nov. 29, 2021 (JP) ................................ 2021-192929

(51) Int. Cl.
*G01N 21/45* (2006.01)
*G01N 21/41* (2006.01)
*G01N 15/14* (2006.01)

(52) U.S. Cl.
CPC ......... *G01N 21/45* (2013.01); *G01N 21/4133* (2013.01); *G01N 15/14* (2013.01)

(58) Field of Classification Search
CPC .... G01N 21/45; G01N 21/4133; G01N 15/14; G01N 21/47; G03H 1/0808;
(Continued)

(56) References Cited

U.S. PATENT DOCUMENTS 8,848,199 B2 * 9/2014 Choi ...................... G01N 21/45 356/497
9,546,952 B2 * 1/2017 Choi ...................... G01N 21/51
(Continued)

FOREIGN PATENT DOCUMENTS

JP H09-42925 A 2/1997
JP 2013-096918 A 5/2013
(Continued)

OTHER PUBLICATIONS

European Search Report issued on Sep. 30, 2025 in corresponding European patent application 22898227.8.
(Continued)

*Primary Examiner* — Jonathan M Hansen
(74) *Attorney, Agent, or Firm* — Faegre Drinker Biddle & Reath LLP

(57) ABSTRACT

An observation apparatus includes a light source, a beam splitter, a mirror, a mirror, a cylindrical lens, a lens, a cylindrical lens, a beam splitter, a lens, a frequency shifter, an imaging unit, and an analysis unit. The analysis unit generates a complex amplitude image of each of a plurality of light irradiation directions of object light based on time series data of an interference intensity image output from the imaging unit, and generates a three-dimensional complex differential interference image of an observation object based on the complex amplitude image of each of the plurality of light irradiation directions. The analysis unit obtains a three-dimensional phase image of the observation object based on the three-dimensional complex differential interference image.

14 Claims, 35 Drawing Sheets

(58) Field of Classification Search
CPC .... G03H 2001/005; G03H 1/265; G03H 1/32; G03H 2001/0447; G03H 2001/0452; G03H 2001/0454; G03H 2001/0463; G03H 2210/62; G03H 1/0443
See application file for complete search history.

(56) References Cited

U.S. PATENT DOCUMENTS

| | | | | |
|---|---|---|---|---|
| 2009/0125242 | A1* | 5/2009 | Choi | G01N 21/51 702/19 |
| 2015/0177133 | A1* | 6/2015 | Choi | G03H 1/265 356/517 |
| 2025/0003873 | A1 | 1/2025 | Yasuhiko et al. | |

FOREIGN PATENT DOCUMENTS

| | | | |
|---|---|---|---|
| JP | 6918395 | B1 | 8/2021 |
| JP | 7058901 | B1 | 4/2022 |
| KR | 10-1855366 | B1 | 5/2018 |
| WO | WO-2013/065796 | A1 | 5/2013 |
| WO | WO-2016/208322 | A1 | 12/2016 |
| WO | WO-2019/044336 | A1 | 3/2019 |
| WO | WO-2021/256202 | A1 | 12/2021 |

OTHER PUBLICATIONS

International Preliminary Report on Patentability mailed Jun. 13, 2024 for PCT/JP2022/036582.

* cited by examiner (a)

(b)

(a)

(b)

(a)

(b)

OBSERVATION DEVICE AND OBSERVATION METHOD

TECHNICAL FIELD

The present disclosure relates to an observation apparatus and an observation method.

BACKGROUND ART

An observation apparatus described in Patent Document 1 splits light output from a light source into object light and reference light, combines the object light passed through a moving observation object and the reference light obtained by shifting an optical frequency by a heterodyne frequency, and performs heterodyne interference between the object light and the reference light. Further, the observation apparatus can acquire time series data of a complex amplitude image of the object light on an imaging plane based on time series data of an intensity image of interference light reaching the imaging plane of a camera. The above observation apparatus can perform non-staining and non-invasive imaging of the moving observation object, and may be used for, for example, observing moving cells in a flow cytometer.

CITATION LIST

Patent Literature

Patent Document 1: International Publication No. 2013/065796

SUMMARY OF INVENTION

Technical Problem

Although the observation apparatus described in Patent Document 1 can be applied to the observation of a single cell as the observation object, it is difficult to apply the observation apparatus to the observation of a multiple scattering object such as a three-dimensional cell tissue called a spheroid or an organoid. This is because, when a large amount of multiple scattered light occurs in the observation object, influence of the multiple scattered light significantly appears in the acquired image.

Light scattering refers to a phenomenon in which light interacts with an object to change a traveling direction of the light. In particular, when spatial non-uniformity of a refractive index in the object increases, the light interacts with the object many times in passing through the object. The light which interacts with the object many times as described above is referred to as the multiple scattered light. On the other hand, the light which interacts with the object only once is referred to as single scattered light. It is known that the multiple scattered light causes an increase in speckle and a deterioration in single-scattering to multi-scattering ratio (SMR), and thus, becomes a barrier for performing the measurement.

The speckle is generated by a large change in intensity or phase caused spatially by interference of the multiple scattered light when the light is temporally and spatially coherent. In order to suppress speckle generation, a light source which outputs temporally or spatially incoherent light may be used. For example, a general bright field microscope such as a phase contrast microscope acquires an image without speckles by using a spatially and temporally incoherent light source such as a halogen lamp, a light emitting diode, or the like. The deterioration of the SMR is caused by that the multiple scattered light becomes dominant over the single scattered light, and the single scattered light is buried in the multiple scattered light. As the observation object becomes larger and an observation depth becomes deeper, a component of the single scattered light exponentially decreases, whereas a component of the multiple scattered light increases.

A scattering direction of the single scattered light has a direct correspondence relationship with a structure of the object, and thus, it is easily used to measure the structure of the object. On the other hand, the relationship between the multiple scattered light and the structure of the object is complex, and it is difficult to extract information on the structure of the object. Therefore, in the imaging technique using the single scattered light, it is known that the measurement fails when the single scattered light is buried in the multiple scattered light (that is, when the SMR deteriorates).

The suppression of the SMR deterioration is possible by a technique called gating for selectively detecting the single scattered light out of the single scattered light and the multiple scattered light. The multiple scattered light is suppressed by the gating, and thus, the speckles can be suppressed at the same time as the SMR deterioration is suppressed. The gating is achieved using degrees of freedom such as space, time, and polarization. A confocal microscope is an example of the spatial gating. Optical coherence tomography (OCT) is an example of the temporal and spatial gating.

The observation apparatus described in Patent Document 1 does not remove the influence of the multiple scattered light, and thus, the speckle increases in the acquired image and the SMR deteriorates, when the multiple scattered light generated in the observation object is large. Therefore, although the observation apparatus described in Patent Document 1 can be applied to the observation of a single cell in which the occurrence of the multiple scattered light is small, it is difficult to apply the observation apparatus to the observation of the multiple scattering object such as the three-dimensional cell tissue in which the occurrence of the multiple scattered light is large.

An object of an embodiment is to provide an observation apparatus and an observation method capable of observing a moving observation object while reducing influence of multiple scattered light even when the observation object is a multiple scattering object.

Solution to Problem

An embodiment of a first aspect is an observation apparatus. The observation apparatus includes (1) an interference optical system for splitting light output from a light source into object light and reference light, irradiating an observation object moving along a first direction with the object light, and combining and outputting the object light passed through the observation object and the reference light; (2) a frequency shifter provided on an optical path of the object light or the reference light from splitting to combining in the interference optical system, and for setting respective optical frequencies of the object light and the reference light different from each other by a heterodyne frequency; (3) an imaging unit having an imaging plane for receiving the object light and the reference light output from the interference optical system, and for imaging an interference intensity image generated by interference between the object light and the reference light on the imaging plane, and outputting time series data of the interference intensity image; and (4)

an analysis unit for performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane coaxially with each other, and the analysis unit generates a complex differential interference image of each of a plurality of positions and a plurality of light irradiation directions when performing focused irradiation of the object light on the observation object by the irradiation optical system based on the time series data of the interference intensity image, and generates a three-dimensional phase image of the observation object based on the complex differential interference image.

An embodiment of a second aspect is an observation apparatus. The observation apparatus includes (1) an interference optical system for splitting light output from a light source into object light and reference light, irradiating an observation object moving along a first direction with the object light, and combining and outputting the object light passed through the observation object and the reference light; (2) an imaging unit having an imaging plane for receiving the object light and the reference light output from the interference optical system, and for imaging an interference intensity image generated by interference between the object light and the reference light on the imaging plane, and outputting time series data of the interference intensity image; and (3) an analysis unit for performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane from directions different from each other, and the analysis unit generates a complex differential interference image of each of a plurality of positions and a plurality of light irradiation directions when performing focused irradiation of the object light on the observation object by the irradiation optical system based on the time series data of the interference intensity image, and generates a three-dimensional phase image of the observation object based on the complex differential interference image.

An embodiment of a first aspect is an observation method. The observation method includes (1) an interference step of causing object light and reference light to interfere with each other, by using an interference optical system for splitting light output from a light source into the object light and the reference light, irradiating an observation object moving along a first direction with the object light, and combining and outputting the object light passed through the observation object and the reference light; (2) a modulation step of setting respective optical frequencies of the object light and the reference light different from each other by a heterodyne frequency, by using a frequency shifter provided on an optical path of the object light or the reference light from splitting to combining in the interference optical system; (3) an imaging step of imaging an interference intensity image generated by interference between the object light and the reference light on an imaging plane, and outputting time series data of the interference intensity image, by using an imaging unit having the imaging plane for receiving the object light and the reference light output from the interference optical system; and (4) an analysis step of performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane coaxially with each other, and the analysis step includes generating a complex differential interference image of each of a plurality of positions and a plurality of light irradiation directions when performing focused irradiation of the object light on the observation object by the irradiation optical system based on the time series data of the interference intensity image, and generating a three-dimensional phase image of the observation object based on the complex differential interference image.

An embodiment of a second aspect is an observation method. The observation method includes (1) an interference step of causing object light and reference light to interfere with each other, by using an interference optical system for splitting light output from a light source into the object light and the reference light, irradiating an observation object moving along a first direction with the object light, and combining and outputting the object light passed through the observation object and the reference light; (2) an imaging step of imaging an interference intensity image generated by interference between the object light and the reference light on an imaging plane, and outputting time series data of the interference intensity image, by using an imaging unit having the imaging plane for receiving the object light and the reference light output from the interference optical system; and (3) an analysis step of performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane from directions different from each other, and the analysis step includes generating a complex differential interference image of each of a plurality of positions and a plurality of light irradiation directions when performing focused irradiation of the object light on the observation object by the irradiation optical system based on the time series data of the interference intensity image, and generating a three-dimensional phase image of the observation object based on the complex differential interference image.

An embodiment is a program. The program is a program for causing a computer to execute the steps of the observation method of the above configuration.

An embodiment is a recording medium. The recording medium is a computer readable recording medium recording the program of the above configuration.

Advantageous Effects of Invention

According to the observation apparatus and the observation method of the embodiments, it is possible to observe a moving observation object while reducing influence of multiple scattered light even when the observation object is a multiple scattering object.

DESCRIPTION OF EMBODIMENTS

Hereinafter, embodiments of an observation apparatus and an observation method will be described in detail with reference to the accompanying drawings. In the description of the drawings, the same elements will be denoted by the same reference signs, and redundant description will be omitted. The present invention is not limited to these examples, and the Claims, their equivalents, and all the changes within the scope are intended as would fall within the scope of the present invention.

First Embodiment

As a configuration of an apparatus according to a first embodiment, an observation apparatus 1A and an observation apparatus 1B will be described.

Figure 1:
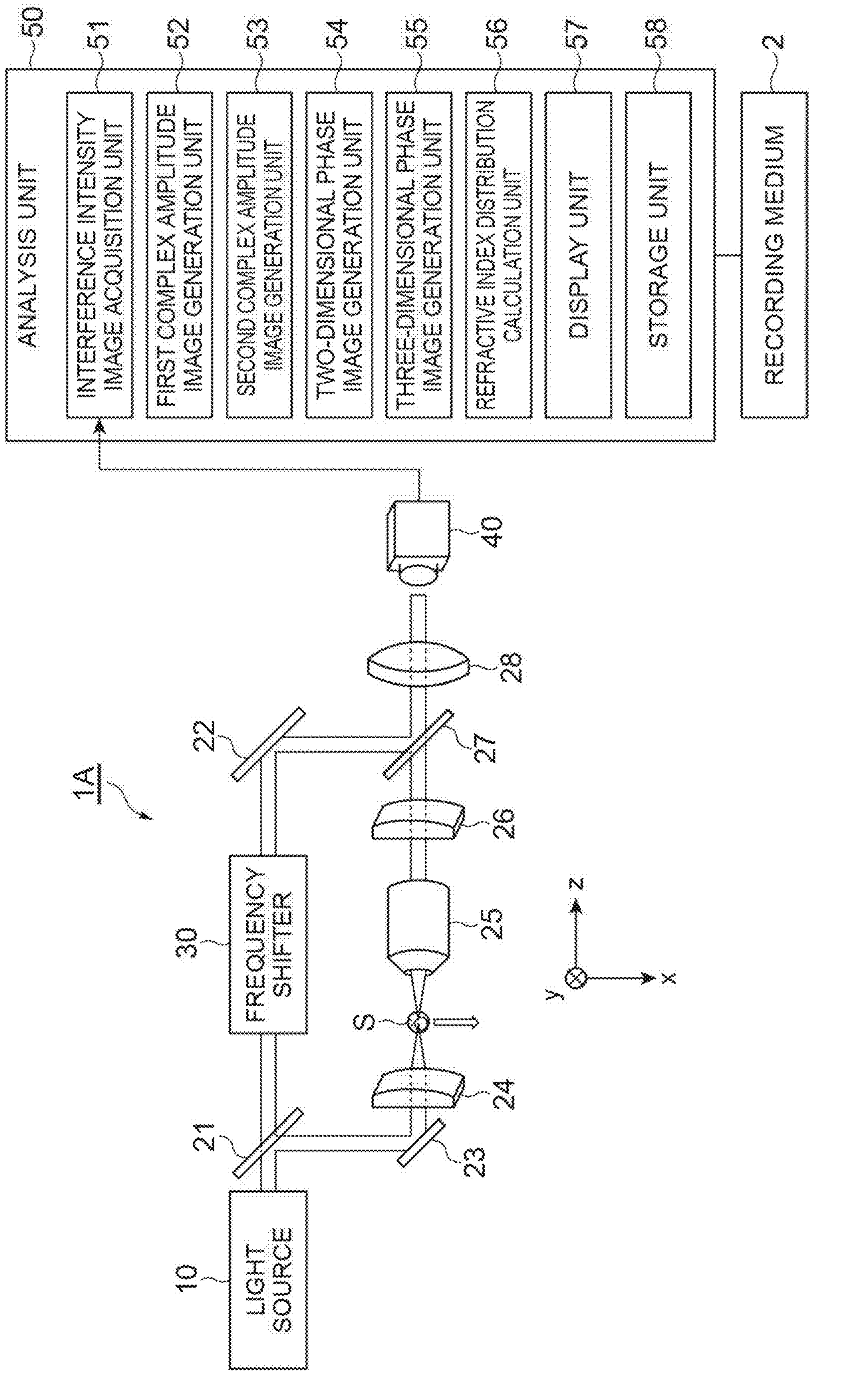
FIG. 1 is a diagram illustrating a configuration of an observation apparatus 1A.

FIG. 1 is a diagram illustrating a configuration of an observation apparatus 1A. The observation apparatus 1A includes a light source 10, a beam splitter 21, a mirror 22, a mirror 23, a cylindrical lens 24, a lens 25, a cylindrical lens 26, a beam splitter 27, a lens 28, a frequency shifter 30, an imaging unit 40, and an analysis unit 50.

The observation apparatus 1A is an apparatus for observing an observation object S moving along a first direction between the cylindrical lens 24 and the lens 25. For example, the observation object S is a cell flowing along a flow path in a flow cytometer. In this diagram, an xyz orthogonal coordinate system is illustrated for convenience of explanation. A moving direction (direction of an arrow in the diagram) of the observation object S is set to an x direction (first direction). An optical axis direction of the cylindrical lens 24 and the lens 25 is set to a z direction. A direction orthogonal to both the x direction and the z direction is set to a y direction (second direction).

The light source 10 outputs spatially and temporally coherent light, and is preferably a laser light source. The beam splitter 21 is optically coupled to the light source 10, and splits the light output from the light source 10 into object light and reference light. The beam splitter 21 outputs the object light to the mirror 23, and outputs the reference light to the frequency shifter 30.

The frequency shifter 30 is optically coupled to the beam splitter 21, and inputs the reference light arriving from the beam splitter 21. The frequency shifter 30 shifts an optical frequency of the reference light by a heterodyne frequency, and outputs the reference light after the shift. The mirror 22 is optically coupled to the frequency shifter 30, and reflects the reference light arriving from the frequency shifter 30 to the beam splitter 27.

The mirror 23 is optically coupled to the beam splitter 21, and reflects the object light arriving from the beam splitter 21 to the cylindrical lens 24. The cylindrical lens 24 is optically coupled to the mirror 23, and is an irradiation optical system for irradiating the observation object S with the object light arriving from the mirror 23. The cylindrical lens 24 focuses the object light and irradiates a line-shaped region extending in the y direction (second direction) in the observation object S with the object light. A value of an x component $k_x$ of a wavenumber vector of the light with which the observation object S is irradiated is within a certain range, and a value of a y component $k_y$ is a certain constant value.

The object light with which the observation object S is irradiated by the cylindrical lens 24 and passed through the observation object S reaches an imaging plane of the imaging unit 40 sequentially through the lens 25, the cylindrical lens 26, and the lens 28 constituting an imaging optical system.

The beam splitter 27 is provided between the cylindrical lens 26 and the lens 28. The beam splitter 27 inputs the object light arriving from the cylindrical lens 26, and inputs the reference light arriving from the mirror 22, and further, combines and outputs the object light and the reference light. In this case, the beam splitter 27 outputs the object light and the reference light coaxially with each other.

The optical system from the light source 10 to the imaging unit 40 constitutes an interference optical system, and causes the object light passed through the observation object S and the reference light to interfere with each other (an interference step). The frequency shifter 30 sets the respective optical frequencies of the object light and the reference light different from each other by the heterodyne frequency (a modulation step). The frequency shifter 30 may be configured using, for example, an acousto-optic element. The frequency shifter 30 may be provided on the optical path of the reference light, or may be provided on the optical path of the object light.

The imaging unit 40 has the imaging plane for receiving the object light and the reference light output from the interference optical system, images an interference intensity image generated by interference between the object light and the reference light on the imaging plane, and outputs time series data of the interference intensity image obtained by the imaging to the analysis unit 50 (an imaging step).

The analysis unit 50 is electrically connected to the imaging unit 40, and inputs the time series data of the interference intensity image output from the imaging unit 40 to perform a required analysis (an analysis step). The analysis unit 50 generates a complex amplitude image of each of a plurality of light irradiation directions of the object light based on the time series data of the interference intensity image, and generates a three-dimensional complex differential interference image of the observation object S based on the complex amplitude image of each of the plurality of light irradiation directions. In addition, the analysis unit 50 obtains a three-dimensional refractive index distribution of the observation object S based on the three-dimensional complex differential interference image. The details of the analysis unit 50 will be described later.

Figure 2:
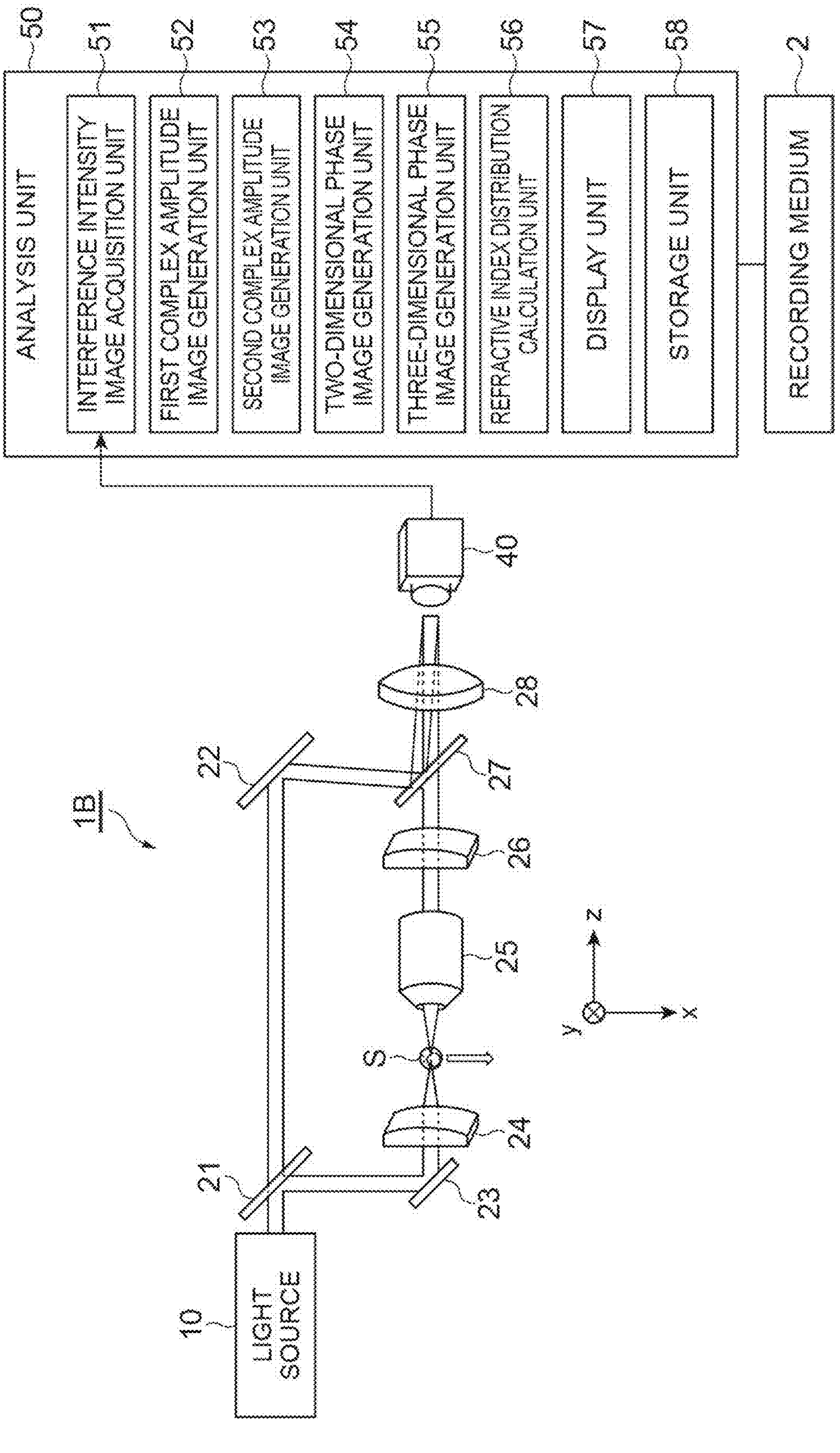
FIG. 2 is a diagram illustrating a configuration of an observation apparatus 1B.

FIG. 2 is a diagram illustrating a configuration of an observation apparatus 1B. The observation apparatus 1B (FIG. 2) is different compared with the configuration of the observation apparatus 1A (FIG. 1) in that the frequency shifter 30 is not provided, and different in that the object light and the reference light are incident on the imaging plane of the imaging unit 40 from directions different from each other. According to the above differences, a part of the processing contents of the analysis unit 50 is different.

Figure 3:
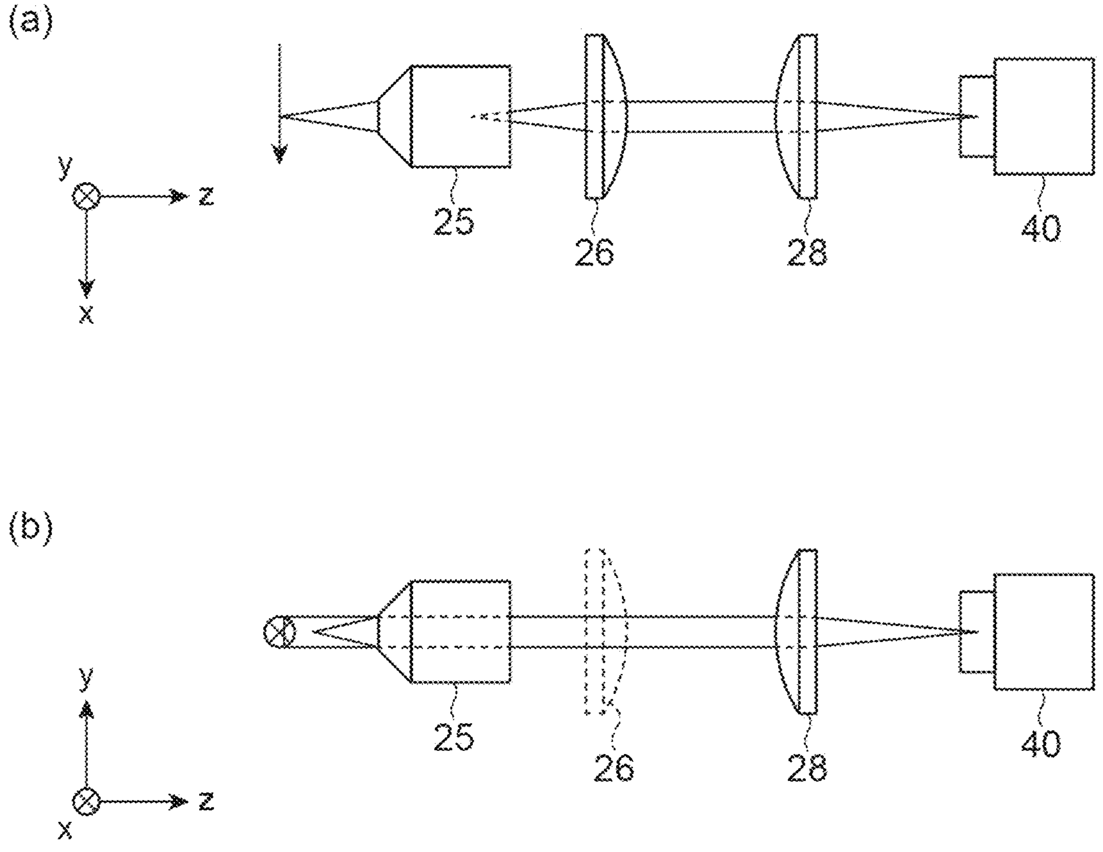
FIG. 3 includes diagrams illustrating an imaging optical system including a lens 25, a cylindrical lens 26, and a lens 28 in each of the configurations of the observation apparatus 1A (FIG. 1) and the observation apparatus 1B (FIG. 2), and shows (a) the diagram viewed in a y direction, and (b) the diagram viewed in an x direction.

FIG. 3 includes diagrams illustrating the imaging optical system including the lens 25, the cylindrical lens 26, and the lens 28 in each of the configurations of the observation apparatus 1A (FIG. 1) and the observation apparatus 1B (FIG. 2). (a) in FIG. 3 is a diagram viewed in the y direction, and (b) in FIG. 3 is a diagram viewed in the x direction.

In the x direction, a pupil plane of the lens 25 and the imaging plane of the imaging unit 40 are in a positional relationship conjugate to each other, that is, the observation object S and the imaging plane of the imaging unit 40 are in a positional relationship of Fourier transform. In the y direction, the observation object S and the imaging plane of the imaging unit 40 are in a positional relationship conjugate to each other.

The analysis unit 50 of each of the observation apparatus 1A (FIG. 1) and the observation apparatus 1B (FIG. 2) performs a required operation based on the time series data of the interference intensity image output from the imaging unit 40. The analysis unit 50 may be a computer. The analysis unit 50 includes an interference intensity image acquisition unit 51, a first complex amplitude image generation unit 52, a second complex amplitude image generation unit 53, a two-dimensional phase image generation unit 54, a three-dimensional phase image generation unit 55, a refractive index distribution calculation unit 56, a display unit 57, and a storage unit 58.

The interference intensity image acquisition unit 51 acquires the time series data of the interference intensity image output from the imaging unit 40. The interference intensity image acquisition unit 51 includes a CPU, and has an input port for inputting the data of the interference intensity image output from the imaging unit 40.

The first complex amplitude image generation unit 52, the second complex amplitude image generation unit 53, the two-dimensional phase image generation unit 54, the three-dimensional phase image generation unit 55, and the refractive index distribution calculation unit 56 perform processing based on the time series data of the interference intensity image, and include a processing device such as a CPU, a GPU, a DSP, an FPGA, or the like. The display unit 57 displays an image to be processed, an image in the middle of the processing, an image after the processing, and the like, and includes, for example, a liquid crystal display.

The storage unit 58 stores data of various images, and includes a hard disk drive, a flash memory, a RAM, a ROM, and the like. The first complex amplitude image generation unit 52, the second complex amplitude image generation unit 53, the two-dimensional phase image generation unit 54, the three-dimensional phase image generation unit 55, the refractive index distribution calculation unit 56, and the storage unit 58 may be constituted by a cloud computing.

The storage unit 58 also stores a program for causing the interference intensity image acquisition unit 51, the first complex amplitude image generation unit 52, the second complex amplitude image generation unit 53, the two-dimensional phase image generation unit 54, the three-dimensional phase image generation unit 55, and the refractive index distribution calculation unit 56 to execute respective steps of the processing.

The program may be stored in the storage unit 58 at the time of manufacture or shipment of the observation apparatus, may be acquired via a communication line after shipment and then stored in the storage unit 58, or may be recorded in a computer readable recording medium 2 and then stored in the storage unit 58. The recording medium 2 may be an arbitrary medium such as a flexible disk, a CD-ROM, a DVD-ROM, a BD-ROM, a USB memory, or the like.

The details of the processing of each of the interference intensity image acquisition unit 51, the first complex amplitude image generation unit 52, the second complex amplitude image generation unit 53, the two-dimensional phase image generation unit 54, the three-dimensional phase image generation unit 55, and the refractive index distribution calculation unit 56 will be described later.

The observation apparatus 1A (FIG. 1) acquires the interference intensity image by temporal modulation by providing the frequency shifter 30. On the other hand, the observation apparatus 1B (FIG. 2) acquires the interference intensity image by spatial modulation by causing the object light and the reference light to be incident on the imaging plane of the imaging unit 40 from directions different from each other. In the observation apparatus 1A (FIG. 1) and the observation apparatus 1B (FIG. 2), the processing of the first complex amplitude image generation unit 52 of the analysis unit 50 is different according to the above difference of the optical system.

Figure 4:
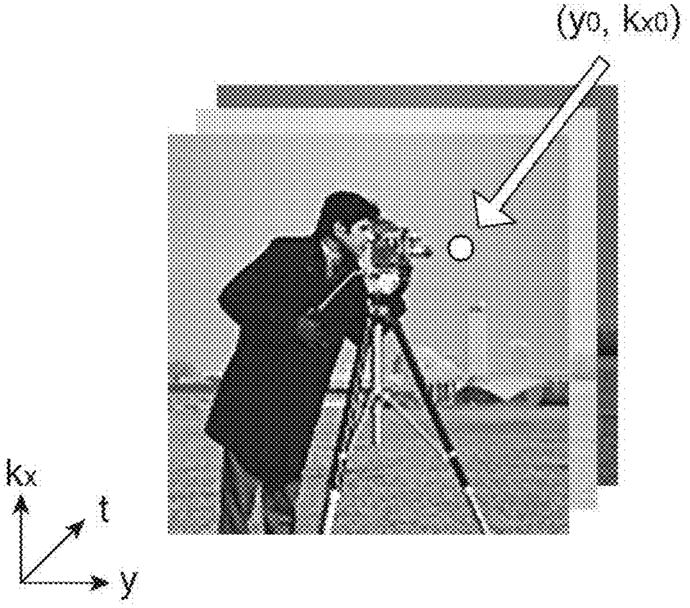
FIG. 4 includes diagrams illustrating processing contents of a first complex amplitude image generation unit 52 of an analysis unit 50 of the observation apparatus 1A (FIG. 1), and shows (a) time series data $I(k_x, y, t)$ of an interference intensity image output from an imaging unit 40, and (b) data $I(k_{x0}, y_0, t)$ in which a time t at a certain light irradiation direction $k_{x0}$ and a certain second direction position $y_0$ is a variable.
Figure 4:
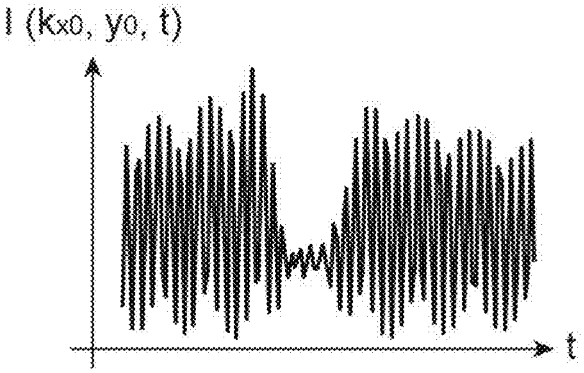
Figure 5:
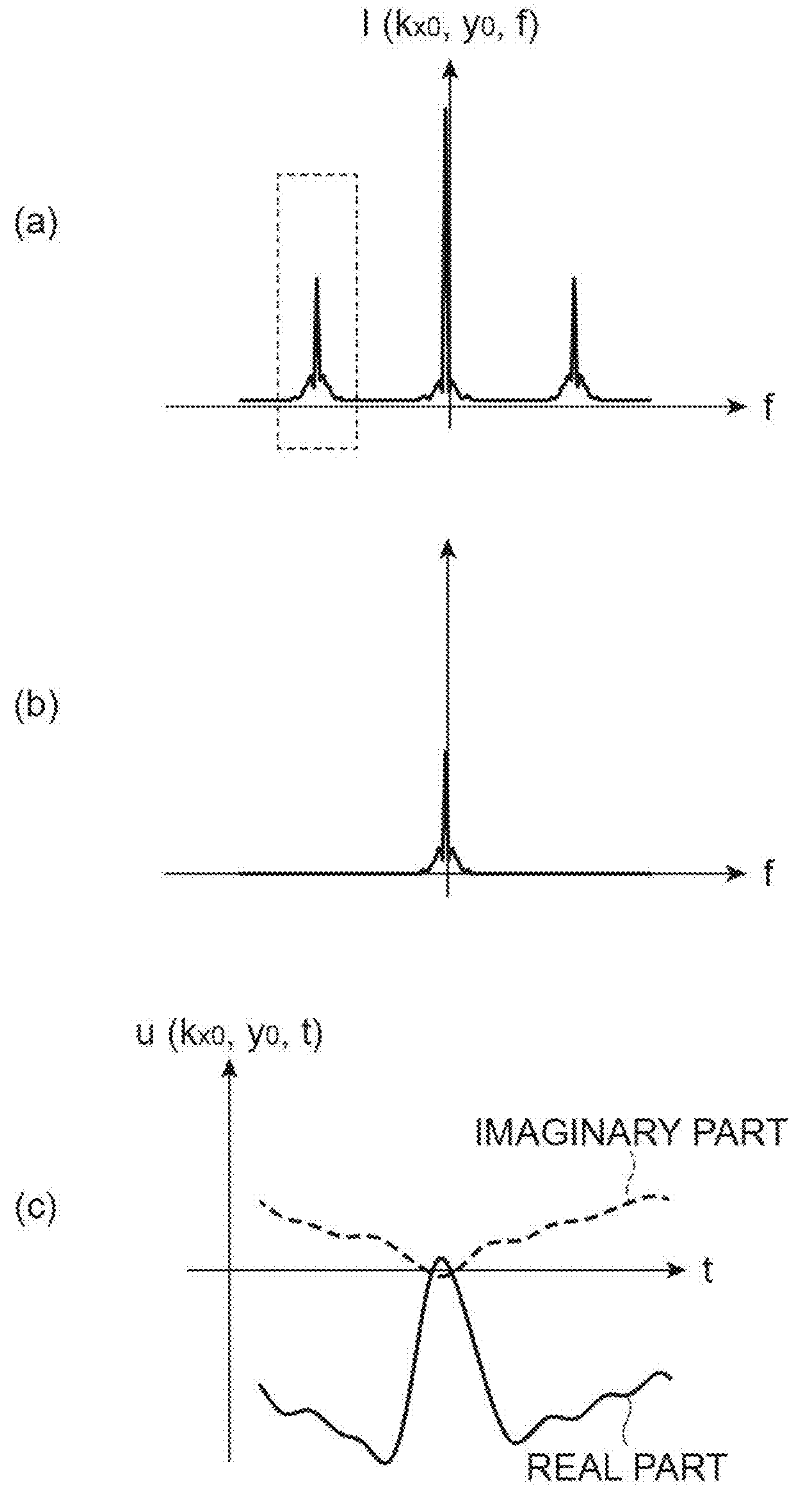
FIG. 5 includes diagrams illustrating the processing contents of the first complex amplitude image generation unit 52 of the analysis unit 50 of the observation apparatus 1A (FIG. 1), and shows (a) a result of Fourier transform of $I(k_{x0}, y_0, t)$, (b) a result of cutting out a part of the result of Fourier transform of (a) and shifting it in parallel, and (c) a result of Fourier transform of the result of (b).

FIG. 4 and FIG. 5 include diagrams illustrating the processing contents of the first complex amplitude image generation unit 52 of the analysis unit 50 of the observation apparatus 1A (FIG. 1). The time series data ((a) in FIG. 4) of the interference intensity image output from the imaging unit 40 is the interference intensity image at each time t on a plane with a light irradiation direction $k_x$ and a second direction position y, and is represented by $I(k_x, y, t)$ of the following Formula (1). $u(k_x, y, t)$ is a complex amplitude of the object light, and $u_{ref}$ is a complex amplitude of the reference light. When data $I(k_{x0}, y_0, t)$ ((b) in FIG. 4) in which a time t at a certain light irradiation direction $k_{x0}$ and a certain second direction position $y_0$ is a variable is Fourier transformed with respect to t, a frequency spectrum $I(k_{x0}, y_0, f)$ ((a) in FIG. 5) at the light irradiation direction $k_{x0}$ and the second direction position $y_0$ is obtained. f is a frequency.

[Formula 1]

$$I(k_x, y, t) = |u(k_x, y, t) + u_{ref}|^2 = |u|^2 + |u_{ref}|^2 + u^* \cdot u_{ref} + u \cdot u_{ref}^* \quad (1)$$

Three peaks separated by the heterodyne frequency appear in the above frequency spectrum. In the three peaks, the center peak is due to a first term and a second term in the rightmost side of Formula (1), and the left and right two peaks are due to a third term or a fourth term in the rightmost side of Formula (1).

A certain range including any one peak out of the left and right two peaks in the frequency spectrum (a range indicated by a rectangle with a dashed line in (a) in FIG. 5) is cut out, and shifted in parallel such that the peak frequency is set to 0 ((b) in FIG. 5). Further, when the result is Fourier transformed with respect to the frequency f, a complex amplitude $u(k_{x0}, y_0, t)$ of the object light at the certain light irradiation direction $k_{x0}$ and the second direction position $y_0$ is obtained ((c) in FIG. 5). By performing the similar processing for all the light irradiation directions $k_x$ and the second direction positions y, the time series data $u(k_x, y, t)$ of the complex amplitude image of the object light is obtained.

Figure 6:
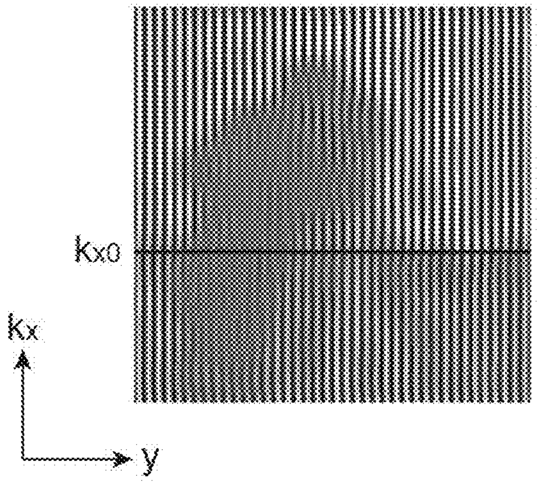
FIG. 6 includes diagrams illustrating the processing contents of the first complex amplitude image generation unit 52 of the analysis unit 50 of the observation apparatus 1B (FIG. 2), and shows (a) time series data $I(k_x, y, t)$ of the interference intensity image output from the imaging unit 40, and (b) data $I(k_{x0}, y, t_0)$ in which a second direction position y at a certain light irradiation direction $k_{x0}$ and a certain time to is a variable.
Figure 6:
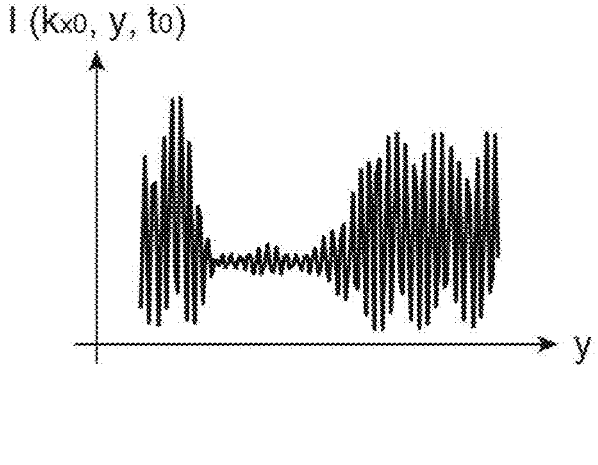
Figure 7:
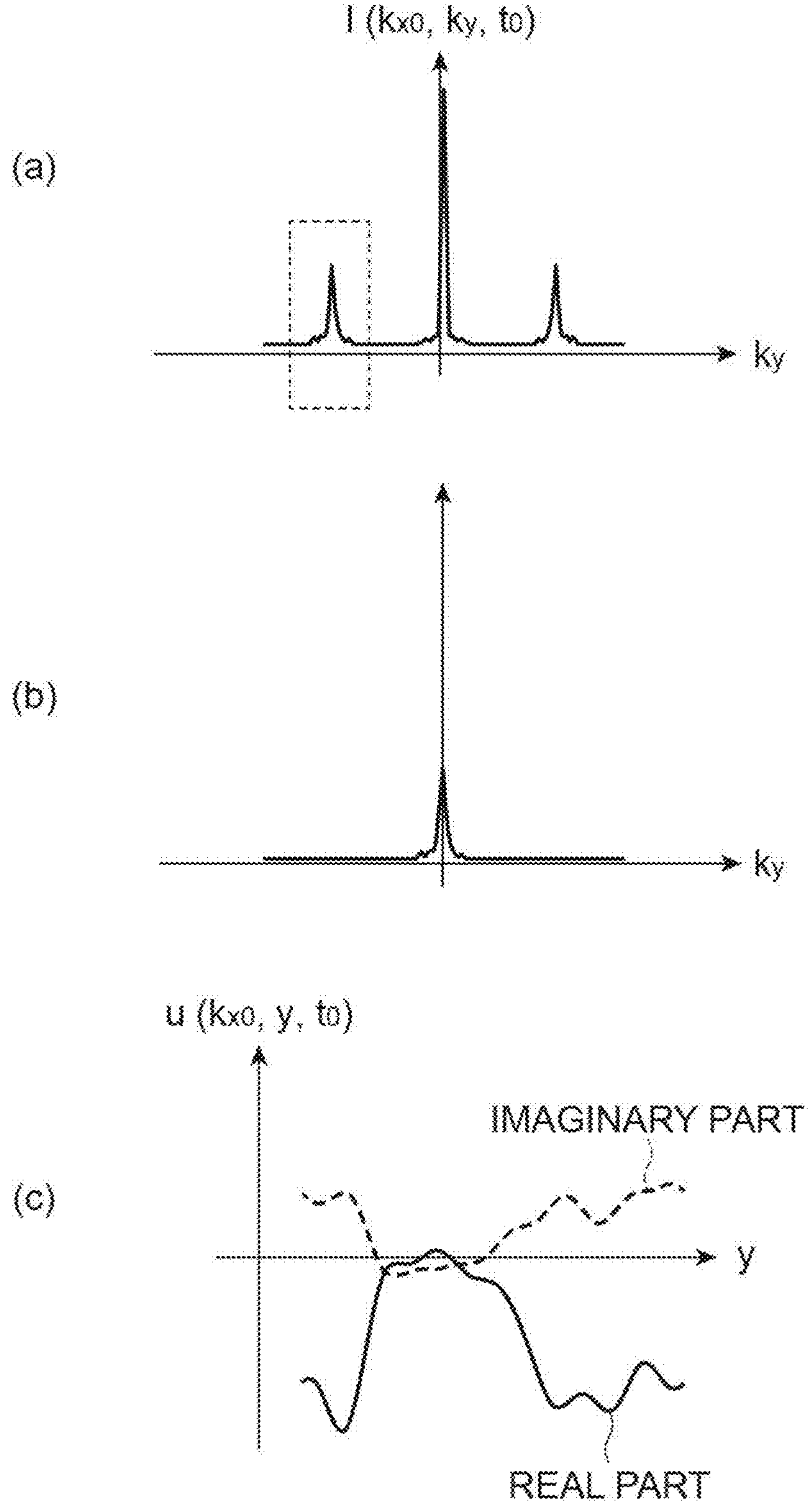
FIG. 7 includes diagrams illustrating the processing contents of the first complex amplitude image generation unit 52 of the analysis unit 50 of the observation apparatus 1B (FIG. 2), and shows (a) a result of Fourier transform of $I(k_{x0}, y, t_0)$, (b) a result of cutting out a part of the result of Fourier transform of (a) and shifting it in parallel, and (c) a result of Fourier transform of the result of (b).

FIG. 6 and FIG. 7 include diagrams illustrating the processing contents of the first complex amplitude image generation unit 52 of the analysis unit 50 of the observation apparatus 1B (FIG. 2). The time series data ((a) in FIG. 6) of the interference intensity image output from the imaging unit 40 is the interference intensity image at each time t on a plane with a light irradiation direction $k_x$ and a second direction position y, and is represented by $I(k_x, y, t)$ of the above Formula (1). When data $I(k_{x0}, y, t_0)$ ((b) in FIG. 6) in which a second direction position y at a certain light irradiation direction $k_{x0}$ and a certain time to is a variable is Fourier transformed with respect to y, a spatial wavenumber spectrum $I(k_{x0}, k_y, t_0)$ ((a) in FIG. 7) at the light irradiation direction $k_{x0}$ and the time to is obtained. $k_y$ is a spatial wavenumber in the y direction.

Three peaks separated by a wavenumber difference according to an angle between the object light and the reference light incident on the imaging plane of the imaging unit 40 appear in the above spatial wavenumber spectrum. In the three peaks, the center peak is due to the first term and the second term in the rightmost side of Formula (1), and the left and right two peaks are due to the third term or the fourth term in the rightmost side of Formula (1).

A certain range including any one peak out of the left and right two peaks in the spatial wavenumber spectrum (a range indicated by a rectangle with a dashed line in (a) in FIG. 7) is cut out, and shifted in parallel such that the peak frequency is set to 0 ((b) in FIG. 7). Further, when the result is Fourier transformed with respect to the spatial wavenumber $k_y$, a complex amplitude $u(k_{x0}, y, t_0)$ of the object light at the certain light irradiation direction $k_{x0}$ and the certain time to is obtained ((c) in FIG. 7). By performing the similar processing for all the light irradiation directions $k_x$ and the times t, the time series data $u(k_x, y, t)$ of the complex amplitude image of the object light is obtained.

As described above, in each of the configurations of the observation apparatus 1A (FIG. 1) and the observation apparatus 1B (FIG. 2), the first complex amplitude image generation unit 52 of the analysis unit 50 can obtain the time series data $u(k_x, y, t)$ of the complex amplitude image of the object light reaching the imaging plane of the imaging unit 40 based on the time series data $I(k_x, y, t)$ of the interference intensity image output from the imaging unit 40. In addition, the first complex amplitude image generation unit 52 of the analysis unit 50 generates the complex amplitude image of each of the plurality of light irradiation directions based on the time series data $u(k_x, y, t)$ of the complex amplitude image of the object light as described as follows.

Figure 8:
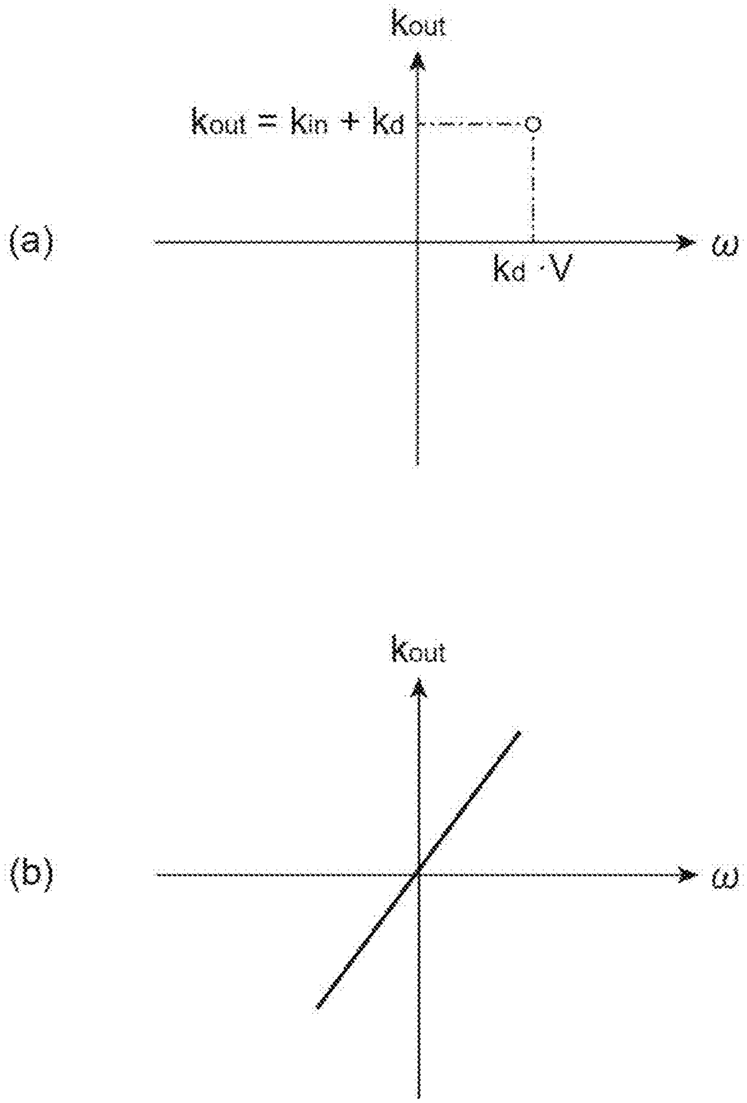
FIG. 8 includes (a), (b) diagrams for describing object light output from an observation object S in each of the configurations of the observation apparatus 1A (FIG. 1) and the observation apparatus 1B (FIG. 2).
Figure 9:
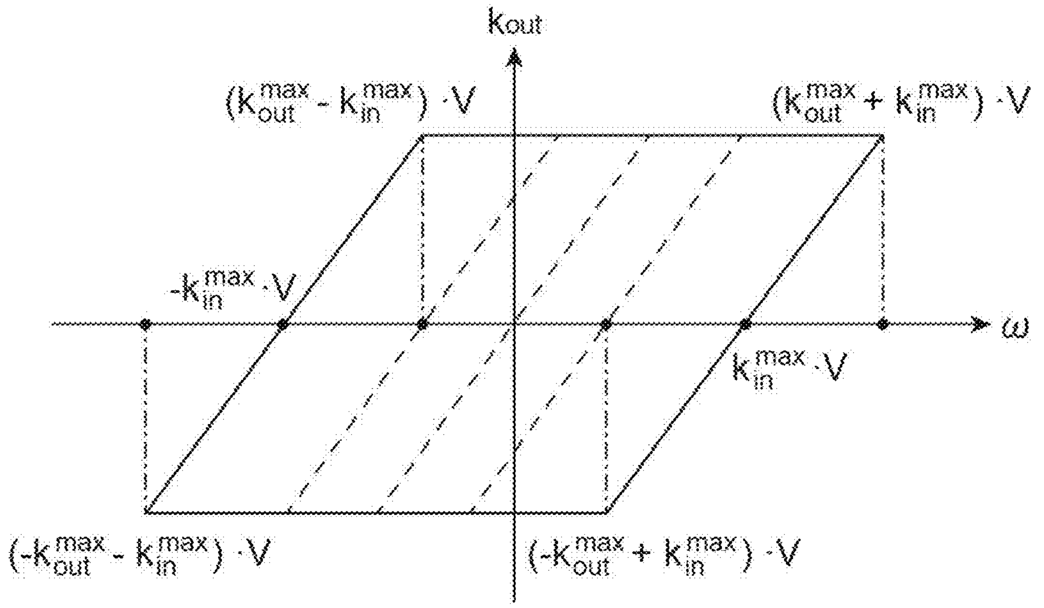
FIG. 9 includes (a), (b) diagrams for describing the object light output from the observation object S in each of the configurations of the observation apparatus 1A (FIG. 1) and the observation apparatus 1B (FIG. 2).
Figure 9:
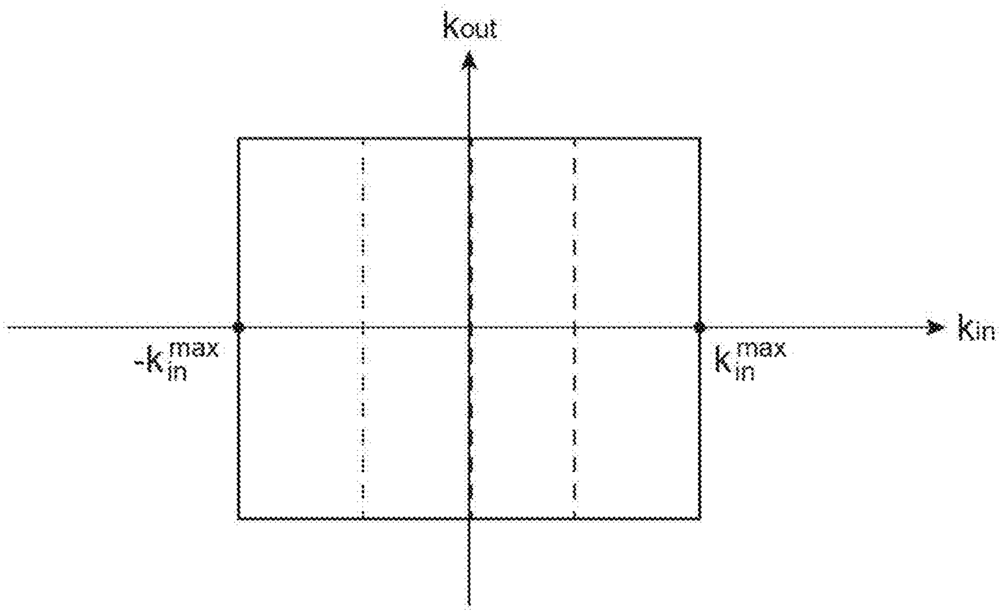

FIG. 8 and FIG. 9 includes diagrams for describing the object light output from the observation object S in each of the configurations of the observation apparatus 1A (FIG. 1) and the observation apparatus 1B (FIG. 2).

It is assumed that the observation object is stationary, the observation object has a single spatial wavenumber represented by a wavenumber vector $k_d$, and an incident wave on the observation object is a plane wave having a single wavenumber represented by a wavenumber vector $k_{in}$. In this case, a wavenumber vector $k_{out}$ of the object light output from the observation object is represented by a sum of the vector $k_d$ and the vector $k_{in}$ as shown in the following Formula (2).

[Formula 2]

$$k_{out} = k_{in} + k_d \tag{2}$$

It is assumed that the observation object moves with a constant velocity vector V, the observation object has a single spatial wavenumber represented by the wavenumber vector $k_d$, and the incident wave on the observation object is a plane wave having a single wavenumber represented by the wavenumber vector $k_{in}$. In this case, the wavenumber vector $k_{out}$ of the object light output from the observation object is represented by the sum of the vector $k_d$ and the vector $k_{in}$ as shown in the above Formula (2).

Further, a Doppler shift occurs in the object light output from the observation object, and a Doppler frequency ω thereof is represented by an inner product of the vector $k_d$ and the vector V as shown in the following Formula (3). That is, as shown in (a) in FIG. 8, on a plane in which the horizontal axis is the Doppler frequency ω and the vertical axis is a magnitude of the wavenumber vector $k_{out}$ of the output object light, ω and $k_{out}$ of the object light output from the observation object are represented by one point.

[Formula 3]

$$\omega = k_d \cdot V = (k_{out} - k_{in}) \cdot V \tag{3}$$

It is assumed that the observation object moves with the constant velocity vector V, the observation object has various spatial wavenumbers, and the incident wave on the observation object is a plane wave having a single wavenumber represented by the wavenumber vector $k_{in}$. In this case, the wavenumber vector $k_{out}$ of the object light output from the observation object is represented by the above Formula (2), and further, the Doppler frequency ω is represented by the above Formula (3).

However, the observation object has the various spatial wavenumbers $k_d$, and thus, as shown in (b) in FIG. 8, on the plane in which the horizontal axis is the Doppler frequency ω and the vertical axis is the magnitude of the wavenumber vector $k_{out}$ of the output object light, ω and $k_{out}$ of the object light output from the observation object are provided on one straight line.

It is assumed that the observation object moves with the constant velocity vector V, the observation object has the various spatial wavenumbers, and the incident wave on the observation object has various wavenumber vectors. In this case, the observation object has the various spatial wavenumbers $k_d$ and the incident wave has the various wavenumber vector $k_{in}$, and thus, as shown in (a) in FIG. 9, on the plane in which the horizontal axis is the Doppler frequency ω and the vertical axis is the magnitude of the wavenumber vector $k_{out}$ of the output object light, ω and $k_{out}$ of the object light output from the observation object are provided within a parallelogram region.

ω and $k_{out}$ of the object light output from the observation object S in each of the configurations of the observation apparatus 1A (FIG. 1) and the observation apparatus 1B (FIG. 2) are within the parallelogram region on the ω-$k_{out}$ plane as shown in (a) in FIG. 9.

$$k_{out}^{max},\ k_{out}^{min},\ k_{in}^{max},\ \text{and}\ k_{in}^{min}$$

shown in (a) in FIG. 9 are values determined by NA of the optical system before or after the observation object.

On each of oblique dashed lines shown in (a) in FIG. 9 (three lines shown in the diagram), $k_{in}$ is constant. By using the relationship of the above Formula (3), the ω-$k_{out}$ plane shown in (a) in FIG. 9 can be converted into the $k_{in}$-$k_{out}$ plane shown in (b) in FIG. 9. The first complex amplitude image generation unit 52 of the analysis unit 50 generates the complex amplitude image of each of the plurality of light irradiation directions based on the complex amplitude image $u(k_x, y, t)$ of the object light using the above fact.

Figure 10:
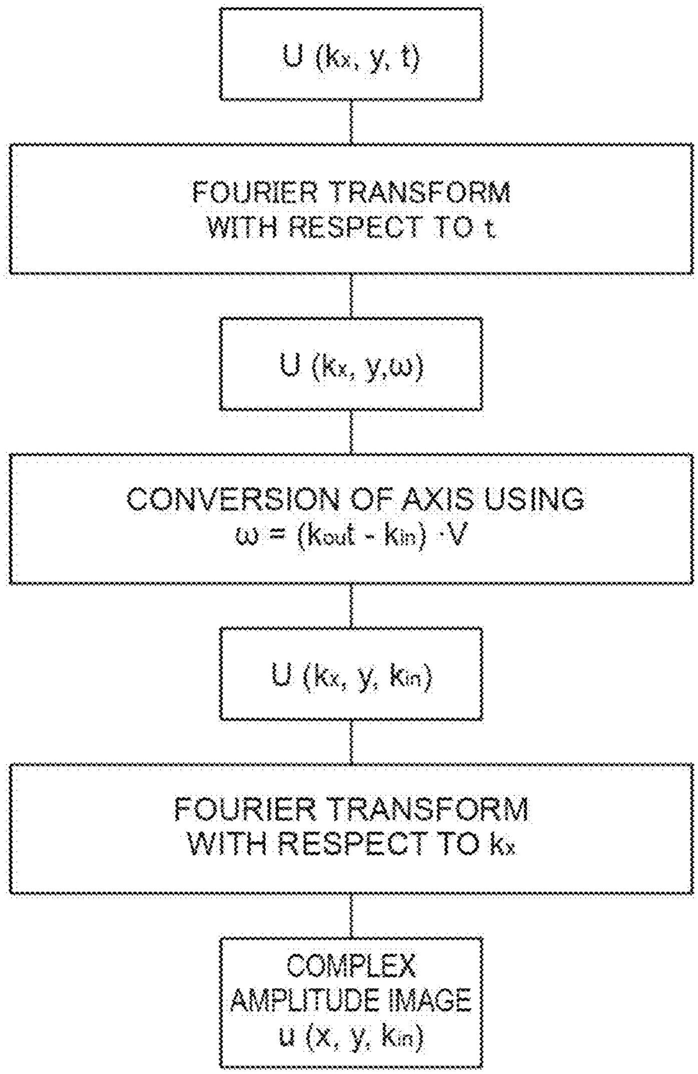
FIG. 10 is a flowchart illustrating the processing contents of the first complex amplitude image generation unit 52 of the analysis unit 50.

That is, as illustrated in FIG. 10, the first complex amplitude image generation unit 52 performs Fourier transform on $u(k_x, y, t)$ with respect to t to obtain $U(k_x, y, \omega)$. Subsequently, by using the relationship of the above Formula (3), $U(k_x, y, \omega)$ is converted into $U(k_x, y, k_{in})$. In this case, $k_{out}$ is $k_x$. Further subsequently, $U(k_x, y, k_{in})$ is Fourier transformed with respect to $k_x$ to obtain $u(x, y, k_{in})$.

As described above, the first complex amplitude image generation unit 52 of the analysis unit 50 can obtain the time series data $u(k_x, y, t)$ of the complex amplitude image of the object light reaching the imaging plane of the imaging unit 40 based on the time series data $I(k_x, y, t)$ of the interference intensity image output from the imaging unit 40, and further, can generate the complex amplitude image u(x, y) of each of the plurality of light irradiation directions $k_{in}$ based on the time series data $u(k_x, y, t)$ of the complex amplitude image of the object light.

Figure 11:
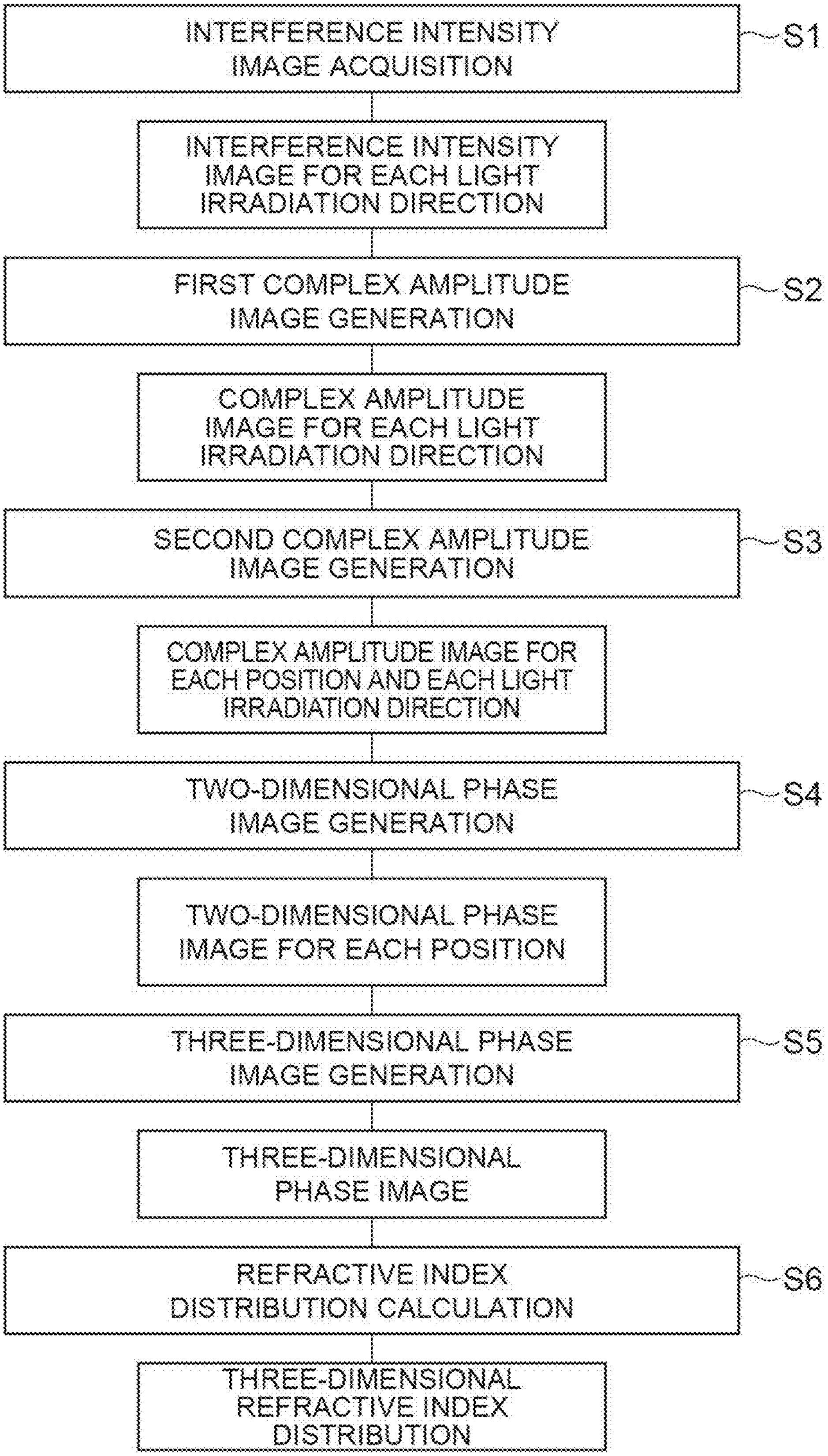
FIG. 11 is a flowchart of an observation method according to a first embodiment.

FIG. 11 is a flowchart of an observation method according to the first embodiment. This observation method can be applied to each of the observation apparatus 1A and the observation apparatus 1B. The observation method includes an interference intensity image acquisition step S1, a first complex amplitude image generation step S2, a second complex amplitude image generation step S3, a two-dimensional phase image generation step S4, a three-dimensional phase image generation step S5, and a refractive index distribution calculation step S6.

The processing step of the interference intensity image acquisition step S1 is performed by the interference intensity image acquisition unit 51. The processing step of the first complex amplitude image generation step S2 is performed by the first complex amplitude image generation unit 52. The processing step of the second complex amplitude image generation step S3 is performed by the second complex amplitude image generation unit 53.

The processing step of the two-dimensional phase image generation step S4 is performed by the two-dimensional phase image generation unit 54. The processing step of the three-dimensional phase image generation step S5 is performed by the three-dimensional phase image generation unit 55. The processing step of the refractive index distribution calculation step S6 is performed by the refractive index distribution calculation unit 56.

In the interference intensity image acquisition step S1, the interference intensity image acquisition unit 51 acquires the time series data of the interference intensity image output from the imaging unit 40. In the first complex amplitude image generation step S2, the first complex amplitude image generation unit 52 obtains the time series data $u(k_x, y, t)$ of the complex amplitude image of the object light reaching the imaging plane of the imaging unit 40 based on the time series data $I(k_x, y, t)$ acquired by the interference intensity image acquisition unit 51 as described above, and in addition, generates the complex amplitude image u (x, y) of each of the plurality of light irradiation directions $k_{in}$ based on the time series data $u(k_x, y, t)$ of the complex amplitude image of the object light.

In the second complex amplitude image generation step S3, the second complex amplitude image generation unit 53 generates, for each of the plurality of light irradiation directions, a complex amplitude image of each of a plurality of z direction positions based on the complex amplitude image at the reference position (z=0) generated by the first complex amplitude image generation unit 52.

Assuming that a two-dimensional Fourier transform of the complex amplitude image u(x, y, 0) at the reference position is $U(k_x, k_y, 0)$, the complex amplitude image u(x, y, d) at the position of z=d and the two-dimensional Fourier transform $U(k_x, k_y, d)$ of the complex amplitude image u(x, y, d) are represented by the following Formulas. i is an imaginary unit, and $k_0$ is a wavenumber of the light in the observation object.

[Formula 4]

$$U(k_x, k_y, d) = U(k_x, k_y, 0)\exp\left(i\sqrt{k_0^2 - k_x^2 - k_y^2}\, d\right) \tag{4}$$

[Formula 5]

$$u(x, y, d) = \int U(k_x, k_y, d)\exp(-ik_x x - ik_y y)dk_x dk_y \tag{5}$$

In the two-dimensional phase image generation step S4, the two-dimensional phase image generation unit 54 generates, for each of the plurality of positions, a two-dimensional phase image based on the complex amplitude image of each of the plurality of light irradiation directions generated by the second complex amplitude image generation unit 53. The two-dimensional phase image generated in this step corresponds to a phase image centered on the focused z direction position. The details of the two-dimensional phase image generation step S4 will be described later.

In addition, the two-dimensional phase image generation step S4 and the subsequent steps may be performed after all the complex amplitude images at the plurality of positions are generated for each of the plurality of light irradiation directions in the second complex amplitude image generation step S3. Further, processes of generating the complex amplitude image at one certain z direction position for each of the plurality of light irradiation directions in the second complex amplitude image generation step S3 and generating the two-dimensional phase image at the position in the two-dimensional phase image generation step S4 may be set as a unit, and the unit process may be repeatedly performed while scanning the z direction position. The latter case is preferable in that a capacity of image data to be stored in the storage unit 58 can be reduced.

In the three-dimensional phase image generation step S5, the three-dimensional phase image generation unit 55 generates a three-dimensional phase image based on the two-dimensional phase image at each of the plurality of positions generated by the two-dimensional phase image generation unit 54. The three-dimensional phase image generated in this step is an image in which the positions x and y in the two-dimensional phase image and the position z of the two-dimensional phase image are variables.

In the refractive index distribution calculation step S6, the refractive index distribution calculation unit 56 obtains a three-dimensional refractive index distribution of the observation object by deconvolution based on the three-dimensional phase image generated by the three-dimensional phase image generation unit 55.

Assuming that the refractive index distribution of the observation object is n(x, y, z), an electric susceptibility distribution is f(x, y, z), and a refractive index of a background medium is nm, there is a relationship of the following Formula (6) between them. The three-dimensional phase image Φ(x, y, z) generated by the three-dimensional phase image generation unit 55 is represented by convolution of a kernel function g(x, y, z) and the electric susceptibility distribution f(x, y, z) as shown in the following Formula (7). Therefore, the three-dimensional refractive index distribution n(x, y, z) of the observation object can be obtained by deconvolution based on the three-dimensional phase image Φ (x, y, z).

[Formula 6]

$$f(x, y, z) = k_0^2\left[\left(n(x, y, z)/n_m\right)^2 - 1\right] \quad (6)$$

[Formula 7]

$$\Phi(x, y, z) = \int g(x-x', y-y', z-z')f(x,' y', z')dx'dy'dz' \quad (7)$$

Figure 12:
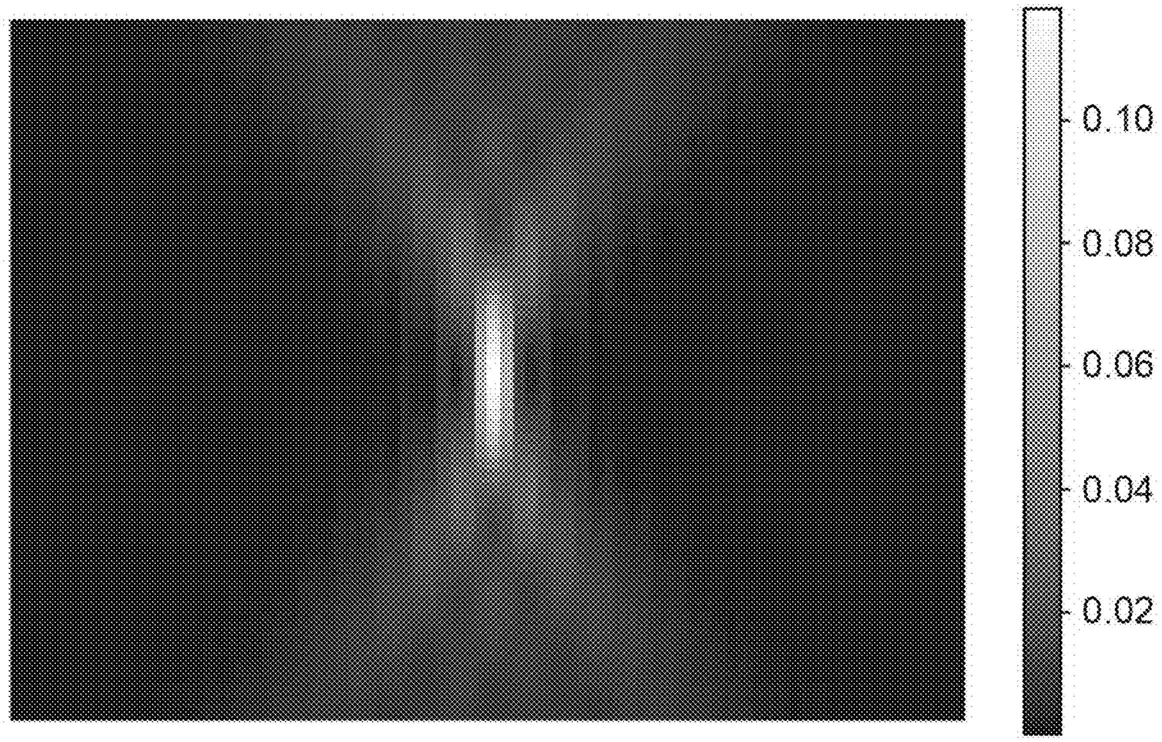
FIG. 12 is a diagram showing a kernel function g.

In addition, the kernel function g is a function based on a Green function corresponding to a solution of a wave equation. FIG. 12 is a diagram showing the kernel function g. In this diagram, a center position having the largest value of the kernel function g is the origin, the vertical direction is the z axis, and the horizontal direction is the direction perpendicular to the z axis.

Next, the details of the two-dimensional phase image generation step S4 in the observation method of the first embodiment will be described. In the two-dimensional phase image generation step S4, the two-dimensional phase image generation unit 54 generates, for each of the plurality of positions, the two-dimensional phase image based on the complex amplitude image of each of the plurality of light irradiation directions generated by the second complex amplitude image generation unit 53. The two-dimensional phase image generation step S4 may include three configurations described below.

Figure 13:
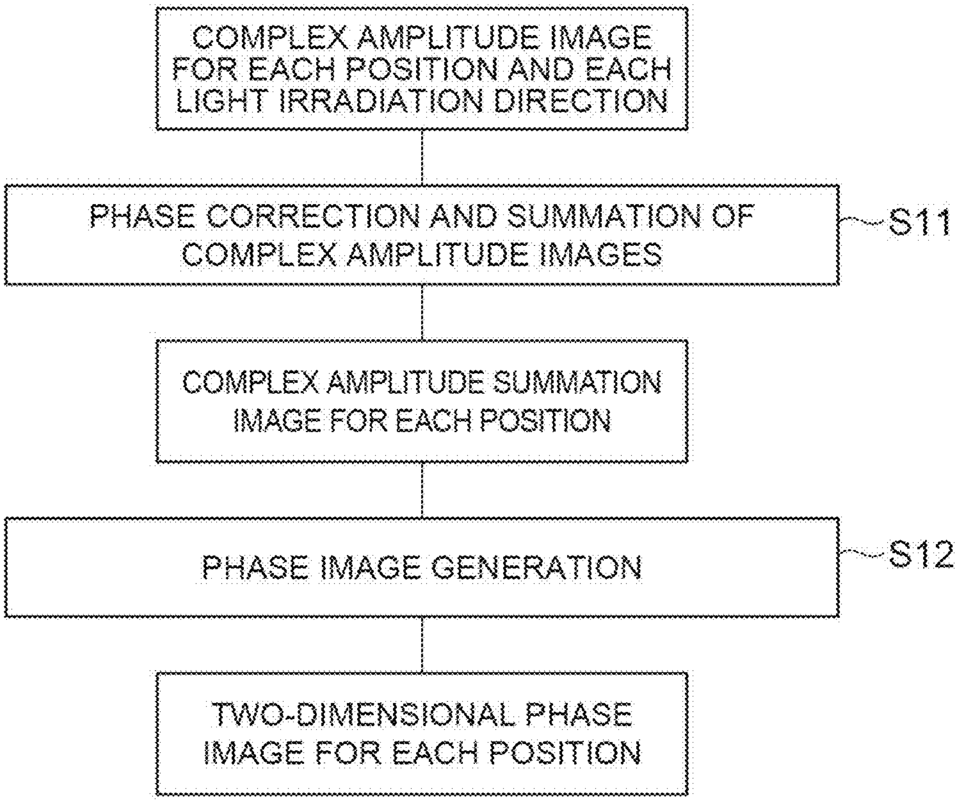
FIG. 13 is a flowchart of a first configuration of a two-dimensional phase image generation step S4.

FIG. 13 is a flowchart of a first configuration of the two-dimensional phase image generation step S4. In the first configuration, for each of the plurality of positions, the two-dimensional phase image generation step S4, in a step S11, corrects the phase of the complex amplitude image of each of the plurality of light irradiation directions based on the light irradiation direction, and then generates a complex amplitude summation image representing a summation of the complex amplitude images after the correction, and in a step S12, generates the two-dimensional phase image based on the complex amplitude summation image.

The processing of the step S11 is based on a collective accumulation of single scattering (CASS) technique. In the light with which the object is irradiated along a certain light irradiation direction and passed through the object, a spatial frequency distribution of the single scattered light which interacts with the object only once is shifted according to the light irradiation direction, whereas a spatial frequency distribution of the multiple scattered light which interacts with the object a plurality of times randomly changes according to the light irradiation direction. The CASS technique uses the above difference between the light irradiation direction dependencies of the spatial frequency distributions of the single scattered light and the multiple scattered light.

That is, in the step S11, the phase of the complex amplitude image of each of the plurality of light irradiation directions is corrected based on the light irradiation direction (that is, the spatial frequency distribution of the complex amplitude image is shifted in parallel according to the light irradiation direction in the spatial frequency domain), so that the spatial frequency distribution of the single scattered light component in the complex amplitude image has a shape and arrangement independent of the light irradiation direction, while the spatial frequency distribution of the multiple scattered light component in the complex amplitude image has a random shape and arrangement.

Further, in the step S11, the complex amplitude summation image representing the summation of the plurality of complex amplitude images after the above correction is generated (that is, synthetic aperture processing is performed) to coherently sum the single scattered light components in the complex amplitude images, while the multiple scattered light components in the complex amplitude images cancel each other out.

Therefore, the influence of the multiple scattered light is reduced in the complex amplitude summation image generated in the step S11. Further, the three-dimensional refractive index distribution obtained finally in the refractive index distribution calculation step S6 also reduces the influence of the multiple scattered light, suppresses the speckles, and improves the SMR.

Figure 14:
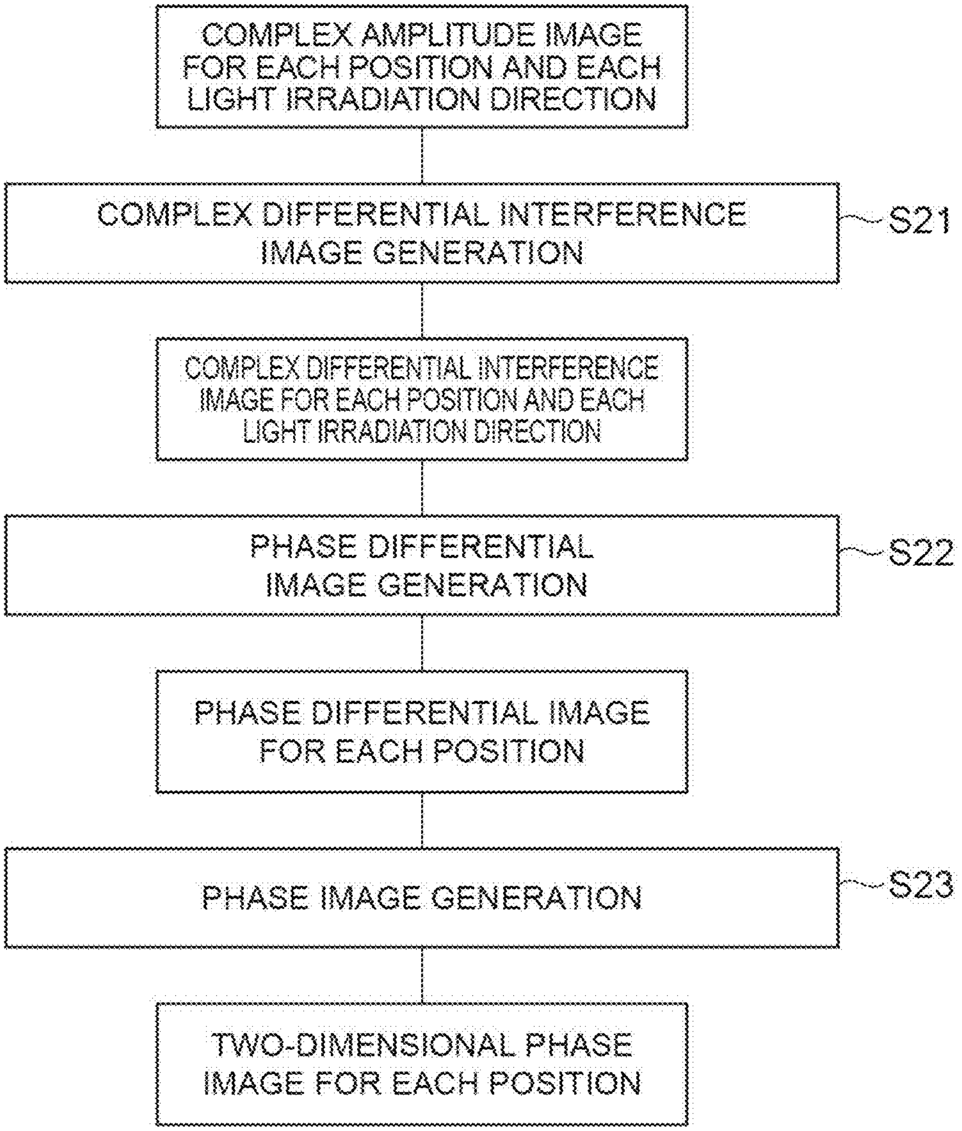
FIG. 14 is a flowchart of a second configuration of the two-dimensional phase image generation step S4.

FIG. 14 is a flowchart of a second configuration of the two-dimensional phase image generation step S4. In the second configuration, for each of the plurality of positions, the two-dimensional phase image generation step S4, in a step S21, generates a complex differential interference image of each of the plurality of light irradiation directions based on the complex amplitude image of each of the plurality of light irradiation directions. In a step S22, the step generates a phase differential image based on a summation of the complex differential interference images of the plurality of light irradiation directions. In a step S23, the step generates the two-dimensional phase image based on the phase differential image.

Assuming that the complex amplitude image at the position of z=d is u(x, y, d), the complex differential interference image q (x, y, d) generated in the step S21 is represented by the following Formula (8). At least one of δx and δy is non-zero. When δx≠0 and δy=0, the complex differential interference image q in which the x direction is a shear direction is obtained. When δx=0 and δy≠0, the complex differential interference image q in which the y direction is the shear direction is obtained. When δx≠0 and δy≠0, the complex differential interference image q with the shear direction different from both of the x direction and the y direction is obtained. In addition, the complex differential interference image q (x, y, d) may be obtained by Formula (8) after transforming the complex amplitude image u(x, y, d) as in the following Formula (9).

[Formula 8]

$$q(x, y, d) = u^*(x+\delta x, y+\delta y, d)\cdot u(x, y, d) \quad (8)$$

[Formula 9]

$$u(x, y, d)\exp(-ik_x x - ik_y y) \quad (9)$$

Assuming that the summation of the complex differential interference images q of the plurality of light irradiation directions is $q_{sum}$(x, y, d), the phase differential image ϕ(x, y, z) generated in the step S22 is represented by the following Formula (10) as the phase of $q_{sum}$(X, y, d). In the step S23, the two-dimensional phase image can be generated by performing integration or deconvolution of the phase differential image ϕ(x, y, z).

[Formula 10]

$$\phi(x, y, d) = \angle q_{sum}(x, y, d) \quad (10)$$

In addition, in the step S21, the complex differential interference image may be generated for each of a plurality of shear directions different from each other on the complex amplitude image. In this case, for each of the plurality of positions, the two-dimensional phase image generation step S4, in the step S21, generates the complex differential interference image of each of the plurality of light irradiation directions for each of the plurality of shear directions on the image different from each other based on the complex amplitude image of each of the plurality of light irradiation directions. In the step S22, the step generates the phase differential image based on the summation of the complex differential interference images of the plurality of light irradiation directions for each of the plurality of shear directions. In the step S23, the step generates the two-dimensional phase image based on the phase differential image of each of the plurality of shear directions.

The influence of the multiple scattered light is reduced in the phase differential image generated based on the summation of the complex differential interference image of each of the plurality of light irradiation directions in the step S22. Further, the three-dimensional refractive index distribution obtained finally in the refractive index distribution calculation step S6 also reduces the influence of the multiple scattered light, and suppresses the speckles. Further, when the complex differential interference image is generated for each of the plurality of shear directions different from each other on the complex amplitude image in the step S21, it is possible to suppress the appearance of linear noises in the two-dimensional phase image obtained in the step S23.

In the above description, the case in which the two-dimensional phase image is generated by performing integration or deconvolution of the phase differential image in the step S23 is described. However, the phase differential image may also be treated as the two-dimensional phase image.

Figure 15:
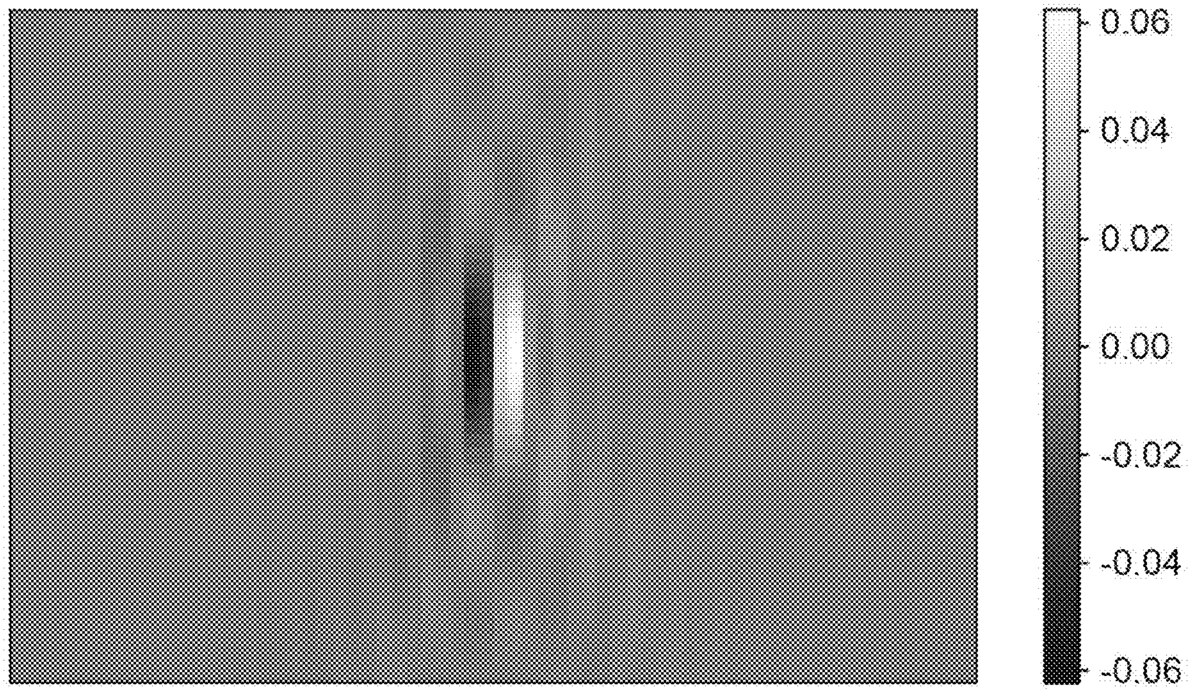
FIG. 15 is a diagram showing the kernel function.

In this case, the three-dimensional refractive index distribution of the observation object can be obtained from the phase differential image (two-dimensional phase image) generated in the step S22 by using a kernel (FIG. 15) including a kernel used in deconvolution of the step S23, in deconvolution of the refractive index distribution calculation step S6, without performing the step S23. The kernel shown in FIG. 15 is obtained by convolution integration of the kernel shown in FIG. 12 and the kernel used in deconvolution of the step S23.

Figure 16:
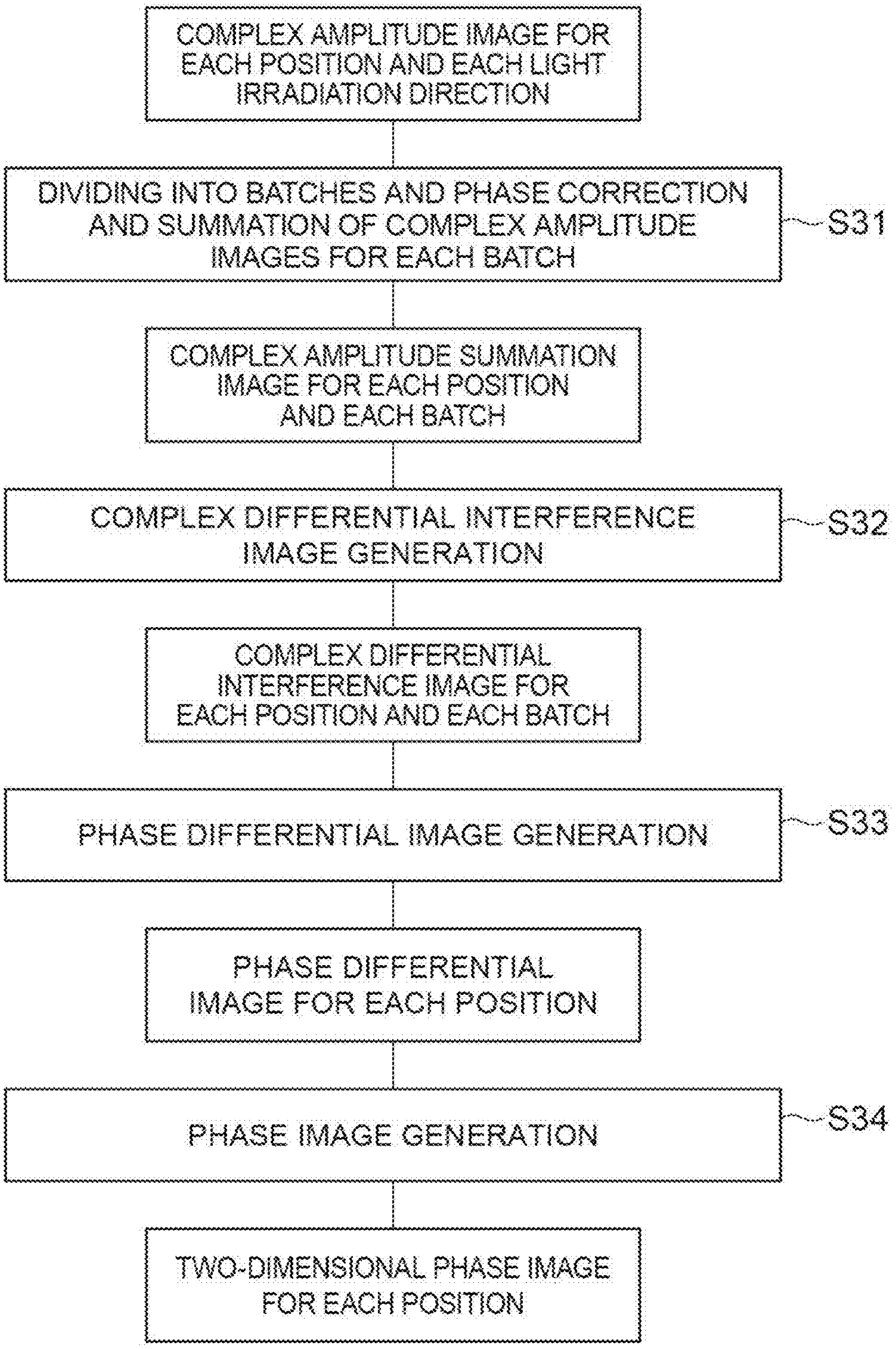
FIG. 16 is a flowchart of a third configuration of the two-dimensional phase image generation step S4.

FIG. 16 is a flowchart of a third configuration of the two-dimensional phase image generation step S4. In the third configuration, for each of the plurality of positions, the two-dimensional phase image generation step S4, in a step S31, divides the complex amplitude image of each of the plurality of light irradiation directions into a plurality of batches, corrects the phase of the complex amplitude image included in the batch based on the light irradiation direction for each of the plurality of batches, and then generates the complex amplitude summation image representing the summation of the complex amplitude images after the correction.

In a step S32, the step generates the complex differential interference image of each of the plurality of batches based on the complex amplitude summation image of each of the plurality of batches. In a step S33, the step generates the phase differential image based on the summation of the complex differential interference images of the plurality of batches. In a step S34, the step generates the two-dimensional phase image based on the phase differential image.

The processing of the step S31 in the third configuration corresponds to dividing the complex amplitude image of each of the plurality of light irradiation directions into the plurality of batches, and then performing the processing of the step S11 in the first configuration for each of the plurality of batches. The processing of the steps S32 and S33 in the third configuration corresponds to performing the processing of the steps S21 and S22 in the second configuration for each of the plurality of batches. The processing of the step S34 in the third configuration corresponds to performing the processing of the step S23 in the second configuration.

In addition, in the step S32, the complex differential interference image may be generated for each of the plurality of shear directions different from each other on the complex amplitude image. In this case, the two-dimensional phase image generation step S4, in the step S32, generates the complex differential interference image of each of the plurality of batches for each of the plurality of shear directions on the image different from each other based on the complex amplitude summation image of each of the plurality of batches. In the step S33, the step generates the phase differential image based on the summation of the complex differential interference images of the plurality of batches for each of the plurality of shear directions. In the step S34, the step generates the two-dimensional phase image based on the phase differential image of each of the plurality of shear directions.

The suppression of the speckles in the third configuration is comparable with the first configuration and the second configuration. The improvement of the SMR in the third configuration is an intermediate degree between the first configuration and the second configuration.

In the above description also, the case in which the two-dimensional phase image is generated by performing integration or deconvolution of the phase differential image in the step S34 is described. However, the phase differential image may also be treated as the two-dimensional phase image. In this case, the three-dimensional refractive index distribution of the observation object can be obtained from the phase differential image (two-dimensional phase image) generated in the step S33 by using the kernel including the kernel used in deconvolution of the step S34, in deconvolution of the refractive index distribution calculation step S6, without performing the step S34.

According to the present embodiment, it is possible to observe the moving observation object while reducing the influence of the multiple scattered light even when the observation object is the multiple scattering object.

Second Embodiment

As a configuration of an apparatus according to a second embodiment, an observation apparatus 1C and an observation apparatus 1D will be described.

Figure 17:
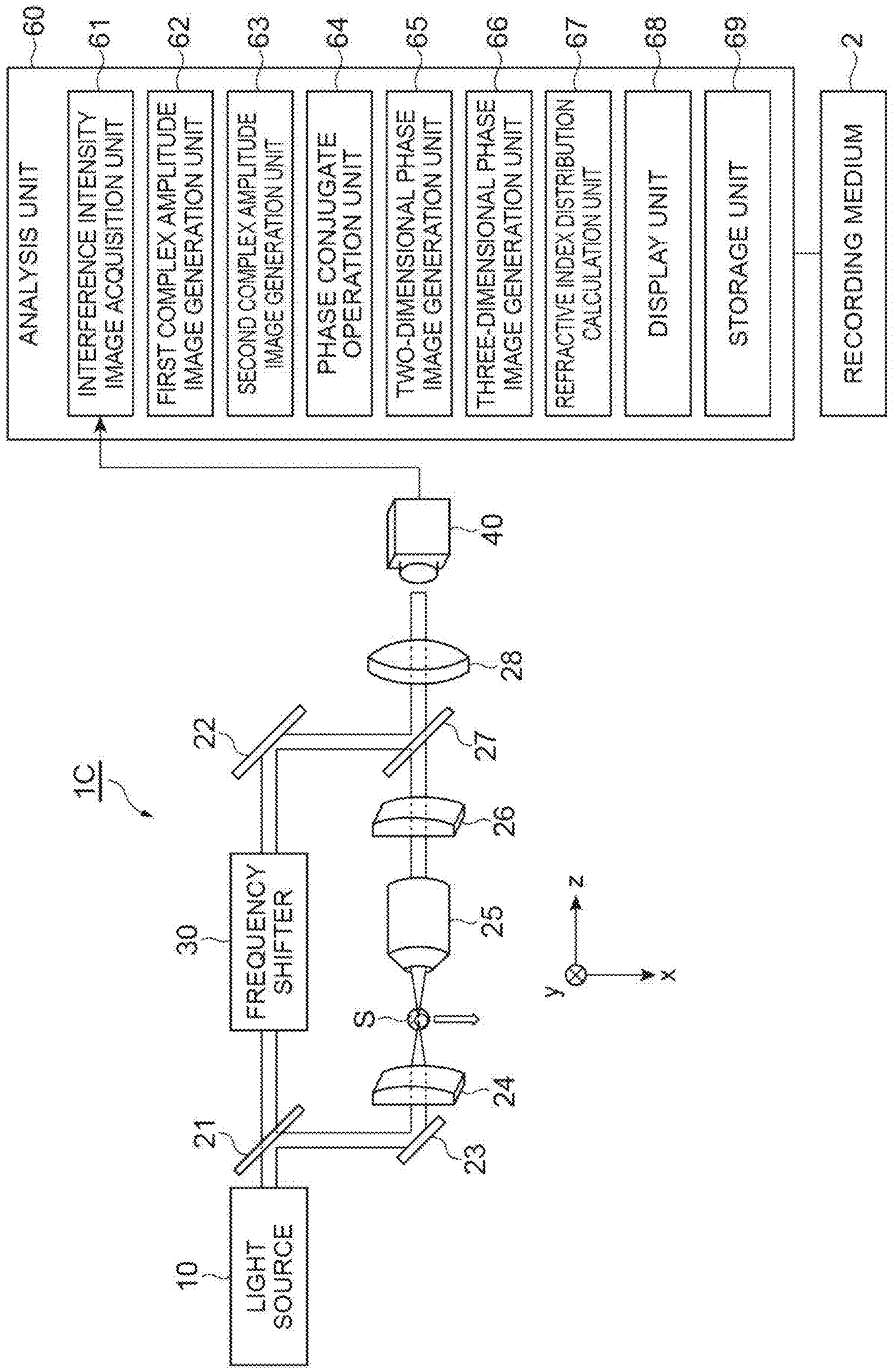
FIG. 17 is a diagram illustrating a configuration of an observation apparatus 1C.
Figure 18:
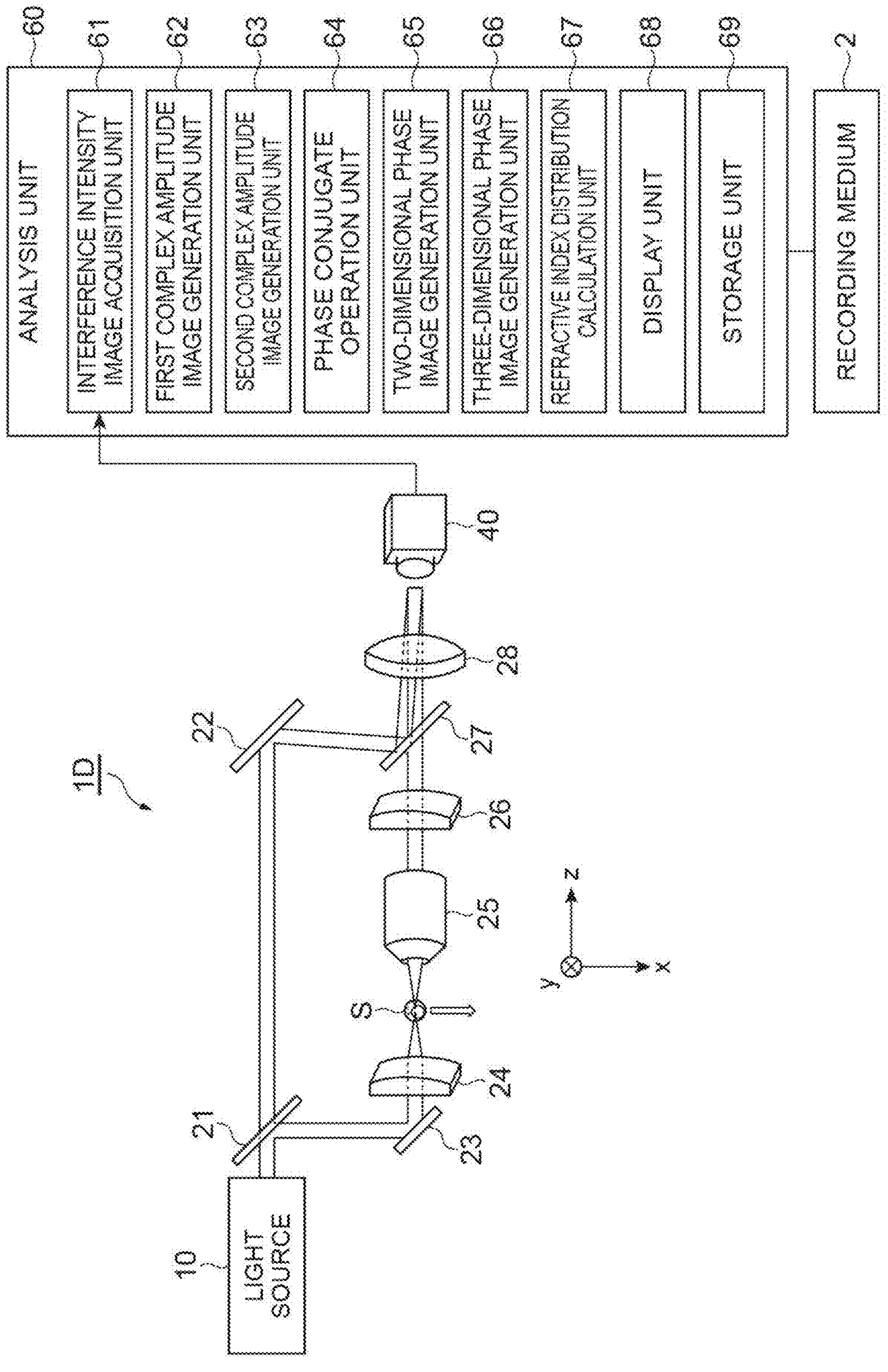
FIG. 18 is a diagram illustrating a configuration of an observation apparatus 1D.

The observation apparatus 1C illustrated in FIG. 17, as compared with the configuration of the observation apparatus 1A illustrated in FIG. 1, has the common configuration for the optical system from the light source 10 to the imaging unit 40, and further, is different in that an analysis unit 60 is provided instead of the analysis unit 50. The observation apparatus 1D illustrated in FIG. 18, as compared with the configuration of the observation apparatus 1B illustrated in FIG. 2, has the common configuration for the optical system from the light source 10 to the imaging unit 40, and further, is different in that the analysis unit 60 is provided instead of the analysis unit 50.

The analysis unit 60 is electrically connected to the imaging unit 40, and inputs the time series data of the interference intensity image output from the imaging unit 40. The analysis unit 60 generates the complex amplitude image of each of the plurality of light irradiation directions of the object light based on the time series data of the interference intensity image, and generates the three-dimensional complex differential interference image of the observation object S based on the complex amplitude image of each of the plurality of light irradiation directions. In addition, the analysis unit 60 obtains the three-dimensional refractive index distribution of the observation object S based on the three-dimensional complex differential interference image.

The analysis unit 60 may be a computer. The analysis unit 60 includes an interference intensity image acquisition unit 61, a first complex amplitude image generation unit 62, a second complex amplitude image generation unit 63, a phase conjugate operation unit 64, a two-dimensional phase image generation unit 65, a three-dimensional phase image generation unit 66, a refractive index distribution calculation unit 67, a display unit 68, and a storage unit 69.

The interference intensity image acquisition unit 61 acquires the time series data of the interference intensity image output from the imaging unit 40. The interference intensity image acquisition unit 61 includes a CPU, and has an input port for inputting the data of the interference intensity image output from the imaging unit 40.

The first complex amplitude image generation unit 62, the second complex amplitude image generation unit 63, the phase conjugate operation unit 64, the two-dimensional phase image generation unit 65, the three-dimensional phase image generation unit 66, and the refractive index distribution calculation unit 67 perform processing based on the time series data of the interference intensity image, and include a processing device such as a CPU, a GPU, a DSP, an FPGA, or the like. The display unit 68 displays an image to be processed, an image in the middle of the processing, an image after the processing, and the like, and includes, for example, a liquid crystal display.

The storage unit 69 stores data of various images, and includes a hard disk drive, a flash memory, a RAM, a ROM, and the like. The first complex amplitude image generation unit 62, the second complex amplitude image generation unit 63, the phase conjugate operation unit 64, the two-dimensional phase image generation unit 65, the three-dimensional phase image generation unit 66, the refractive index distribution calculation unit 67, and the storage unit 69 may be constituted by a cloud computing.

The storage unit 69 also stores a program for causing the interference intensity image acquisition unit 61, the first complex amplitude image generation unit 62, the second complex amplitude image generation unit 63, the phase conjugate operation unit 64, the two-dimensional phase image generation unit 65, the three-dimensional phase image generation unit 66, and the refractive index distribution calculation unit 67 to execute respective steps of the processing.

The program may be stored in the storage unit 69 at the time of manufacture or shipment of the observation apparatus, may be acquired via a communication line after shipment and then stored in the storage unit 69, or may be recorded in a computer readable recording medium 2 and then stored in the storage unit 69. The recording medium 2 may be an arbitrary medium such as a flexible disk, a CD-ROM, a DVD-ROM, a BD-ROM, a USB memory, or the like.

The details of the processing step of each of the interference intensity image acquisition unit 61, the first complex amplitude image generation unit 62, the second complex amplitude image generation unit 63, the phase conjugate operation unit 64, the two-dimensional phase image generation unit 65, the three-dimensional phase image generation unit 66, and the refractive index distribution calculation unit 67 will be described later.

Figure 19:
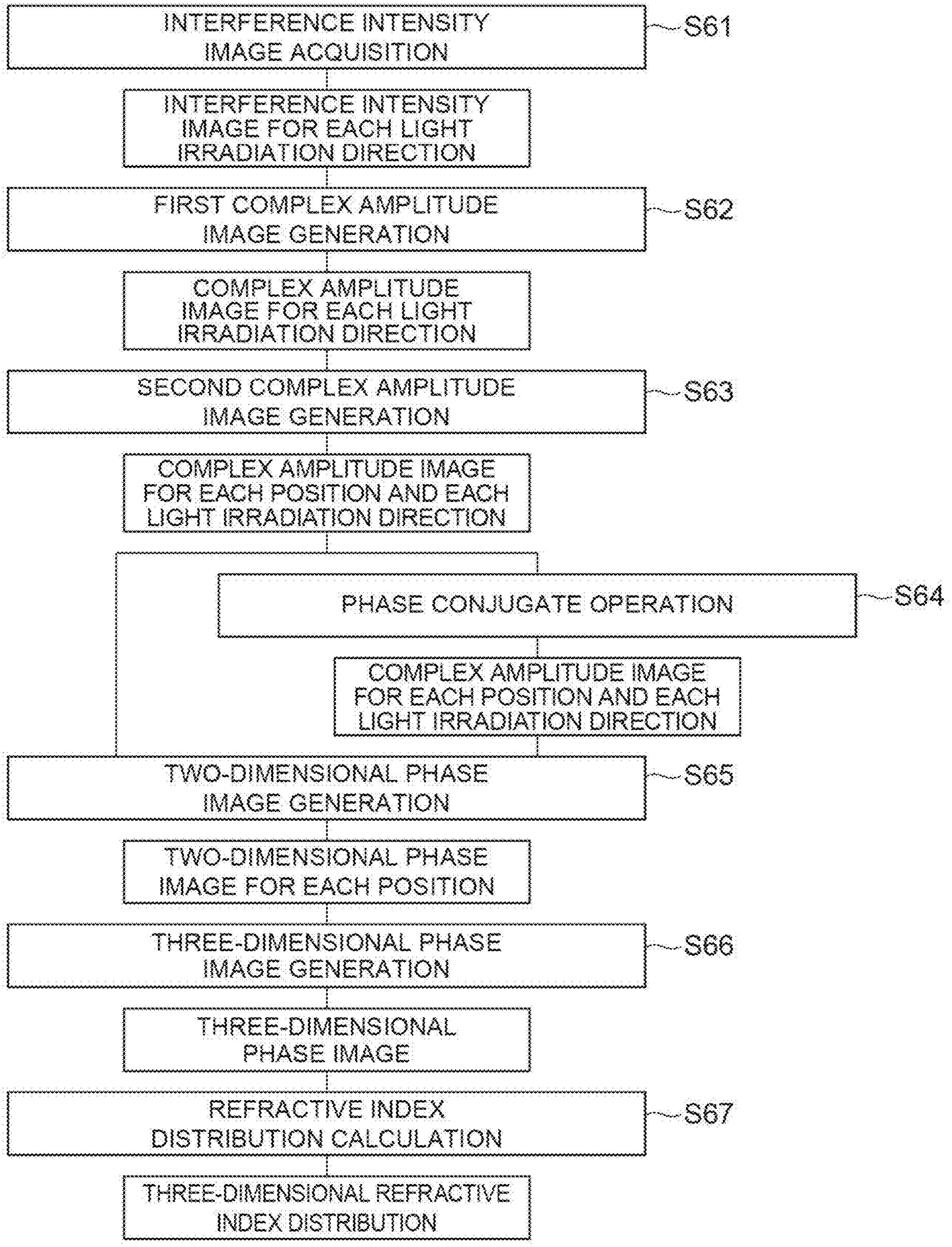
FIG. 19 is a flowchart of an observation method according to a second embodiment.

FIG. 19 is a flowchart of an observation method according to the second embodiment. This observation method can be applied to each of the observation apparatus 1C and the observation apparatus 1D. The observation method includes an interference intensity image acquisition step S61, a first complex amplitude image generation step S62, a second complex amplitude image generation step S63, a phase conjugate operation step S64, a two-dimensional phase image generation step S65, a three-dimensional phase image generation step S66, and a refractive index distribution calculation step S67.

The processing step of the interference intensity image acquisition step S61 is performed by the interference intensity image acquisition unit 61. The processing step of the first complex amplitude image generation step S62 is performed by the first complex amplitude image generation unit 62. The processing step of the second complex amplitude image generation step S63 is performed by the second complex amplitude image generation unit 63.

The processing step of the phase conjugate operation step S64 is performed by the phase conjugate operation unit 64. The processing step of the two-dimensional phase image generation step S65 is performed by the two-dimensional phase image generation unit 65. The processing step of the three-dimensional phase image generation step S66 is performed by the three-dimensional phase image generation unit 66. The processing step of the refractive index distribution calculation step S67 is performed by the refractive index distribution calculation unit 67.

In the interference intensity image acquisition step S61, the interference intensity image acquisition unit 61 acquires the time series data of the interference intensity image output from the imaging unit 40. In the first complex amplitude image generation step S62, the first complex amplitude image generation unit 62 obtains the time series data $u(k_x, y, t)$ of the complex amplitude image of the object light reaching the imaging plane of the imaging unit 40 based on the time series data $I(k_x, y, t)$ acquired by the interference intensity image acquisition unit 61, and in addition, generates the complex amplitude image $u(x, y)$ of each of the plurality of light irradiation directions $k_{in}$ based on the time series data $u(k_x, y, t)$ of the complex amplitude image of the object light.

In the second complex amplitude image generation step S63, the second complex amplitude image generation unit 63 generates, for each of the plurality of light irradiation directions, a complex amplitude image at each of a plurality of z direction positions based on the complex amplitude image at the reference position (z=0) generated by the first complex amplitude image generation unit 62.

The interference intensity image acquisition step S61, the first complex amplitude image generation step S62, and the second complex amplitude image generation step S63 in the observation method of the second embodiment respectively perform the same processing steps as the interference intensity image acquisition step S1, the first complex amplitude image generation step S2, and the second complex amplitude image generation step S3 in the observation method of the first embodiment.

The phase conjugate operation step S64 is performed after the processing step of the second complex amplitude image generation step S63. The phase conjugate operation step S64 may be performed before the processing step of the second complex amplitude image generation step S63 (which will be described later). Further, when the second complex amplitude image generation step S63 generates the complex amplitude image at a certain z position through a plurality of stages from the complex amplitude image at the reference position, the phase conjugate operation step S64 may be performed between a certain stage and a next stage in the plurality of stages (which will be described later).

In the phase conjugate operation step S64, the phase conjugate operation unit 64 performs a phase conjugate operation on the complex amplitude image of each of the plurality of light irradiation directions to generate a complex amplitude image of each of the plurality of light irradiation directions when the relationship between the light irradiation and the imaging for the observation object is reversed.

In addition, the phase conjugate operation is an operation for the complex amplitude image based on a phase conjugate method, and is an operation of calculating a transmission matrix representing the relationship between the light irradiation and the light output for the object, and including an inverse matrix calculation thereof and coordinate conversion. The phase conjugate method may be referred to as a phase conjugation, a time reversal method, a time reversal, a digital phase conjugation, a digital phase conjugate method, or the like. The details will be described later.

In the two-dimensional phase image generation step S65, the two-dimensional phase image generation unit 65 generates, for each of the plurality of positions, a two-dimensional phase image based on the complex amplitude image of each of the plurality of light irradiation directions generated by the second complex amplitude image generation unit 63 or the phase conjugate operation unit 64. The two-dimensional phase image generated in this step corresponds to a phase image centered on the focused z direction position.

In the two-dimensional phase image generation step S65, when a phase image generated based on the complex amplitude image before performing the processing step of the phase conjugate operation step S64 is set as a first phase image, and a phase image generated based on the complex amplitude image obtained by performing the processing step of the phase conjugate operation step S64 is set as a second phase image, for the plurality of positions, the two-dimensional phase image is generated mainly based on the first phase image at a position relatively close to the imaging unit, and the two-dimensional phase image is generated mainly based on the second phase image at a position relatively far from the imaging unit.

In addition, the phase conjugate operation unit 64 and the subsequent processing steps may be performed after all the complex amplitude images at the plurality of positions are generated for each of the plurality of light irradiation directions in the second complex amplitude image generation step S63. Further, processes of generating the complex amplitude image at one certain z direction position for each of the plurality of light irradiation directions in the second complex amplitude image generation step S63 and generating the two-dimensional phase image at the position in the two-dimensional phase image generation step S65 may be set as a unit, and the unit process may be repeatedly performed while scanning the z direction position. The latter case is preferable in that a capacity of image data to be stored in the storage unit 69 can be reduced.

In the three-dimensional phase image generation step S66, the three-dimensional phase image generation unit 66 generates a three-dimensional phase image based on the two-dimensional phase image at each of the plurality of positions generated by the two-dimensional phase image generation unit 65. The three-dimensional phase image generated in this step is an image in which the positions x and y in the two-dimensional phase image and the position z of the two-dimensional phase image are variables.

In the refractive index distribution calculation step S67, the refractive index distribution calculation unit 67 obtains a three-dimensional refractive index distribution of the observation object by deconvolution based on the three-dimensional phase image generated by the three-dimensional phase image generation unit 66.

The two-dimensional phase image generation step S65, the three-dimensional phase image generation step S66, and the refractive index distribution calculation step S67 in the observation method of the second embodiment respectively perform the same processing steps as the two-dimensional phase image generation step S4, the three-dimensional phase image generation step S5, and the refractive index distribution calculation step S6 in the observation method of the first embodiment.

Figure 20:
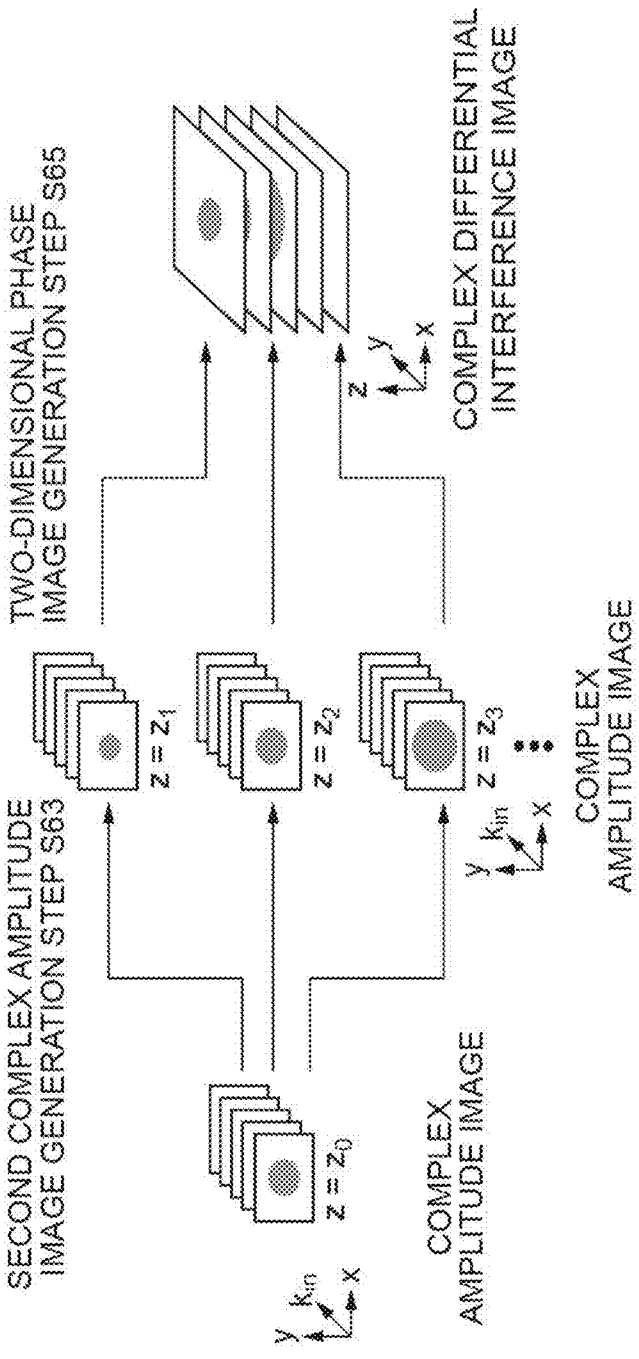
FIG. 20 is a diagram illustrating images and an order of processing steps of a second complex amplitude image generation step S63 and a two-dimensional phase image generation step S65.

FIG. 20 is a diagram illustrating the images and the order of the respective processing steps of the second complex amplitude image generation step S63 and the two-dimensional phase image generation step S65. This diagram illustrates a configuration in which the processing step of the phase conjugate operation step S64 is not performed.

In this configuration, in the second complex amplitude image generation step S63, for each of the plurality of light irradiation directions, the complex amplitude image at each of the plurality of z direction positions ($z=z_1$, $z_2$, $z_3$ in this diagram) is generated based on the complex amplitude image at the reference position ($z=0$) generated in the first complex amplitude image generation step S62 by the above Formulas (4) and (5) of the formulas of the free propagation.

Further, in the two-dimensional phase image generation step S65, for each of the plurality of positions, the complex differential interference image is generated based on the complex amplitude image of each of the plurality of light irradiation directions generated in the second complex amplitude image generation step S63, and in addition, the phase differential image is generated.

Figure 21:
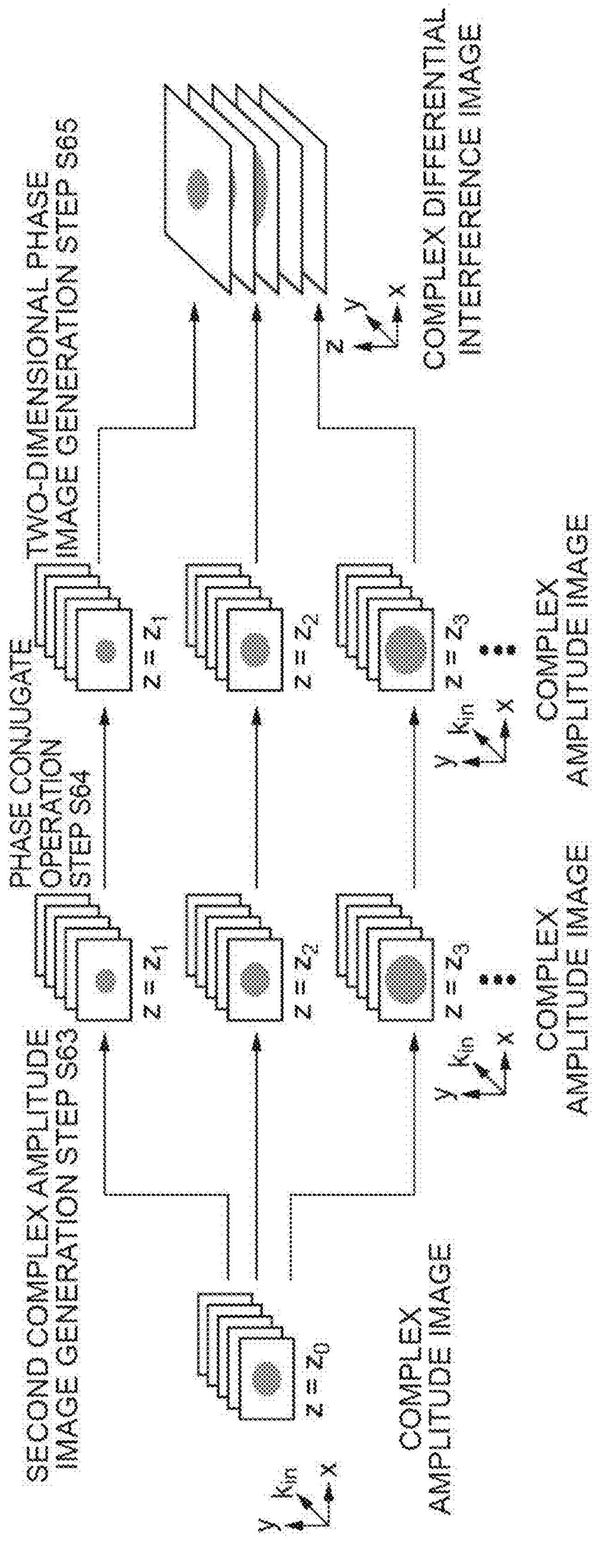
FIG. 21 is a diagram illustrating images and an order of processing steps of the second complex amplitude image generation step S63, a phase conjugate operation step S64, and the two-dimensional phase image generation step S65.
Figure 22:
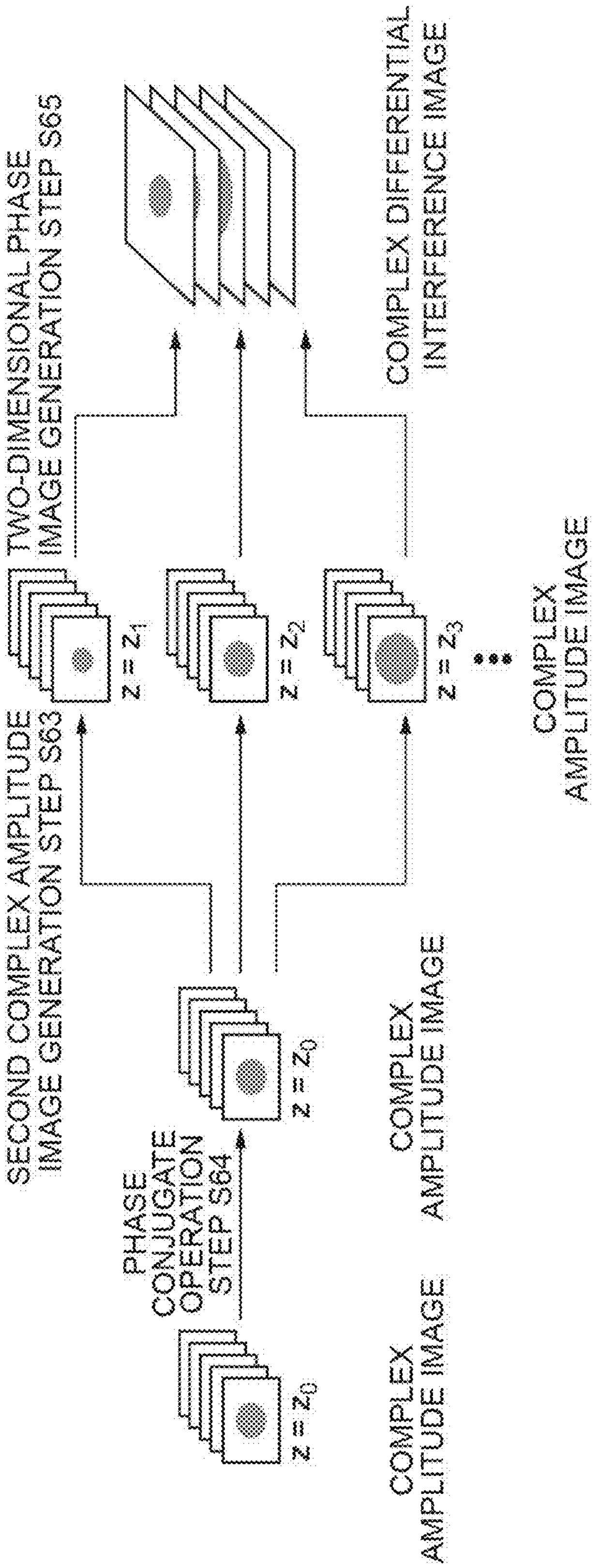
FIG. 22 is a diagram illustrating images and an order of processing steps of the second complex amplitude image generation step S63, the phase conjugate operation step S64, and the two-dimensional phase image generation step S65.
Figure 23:
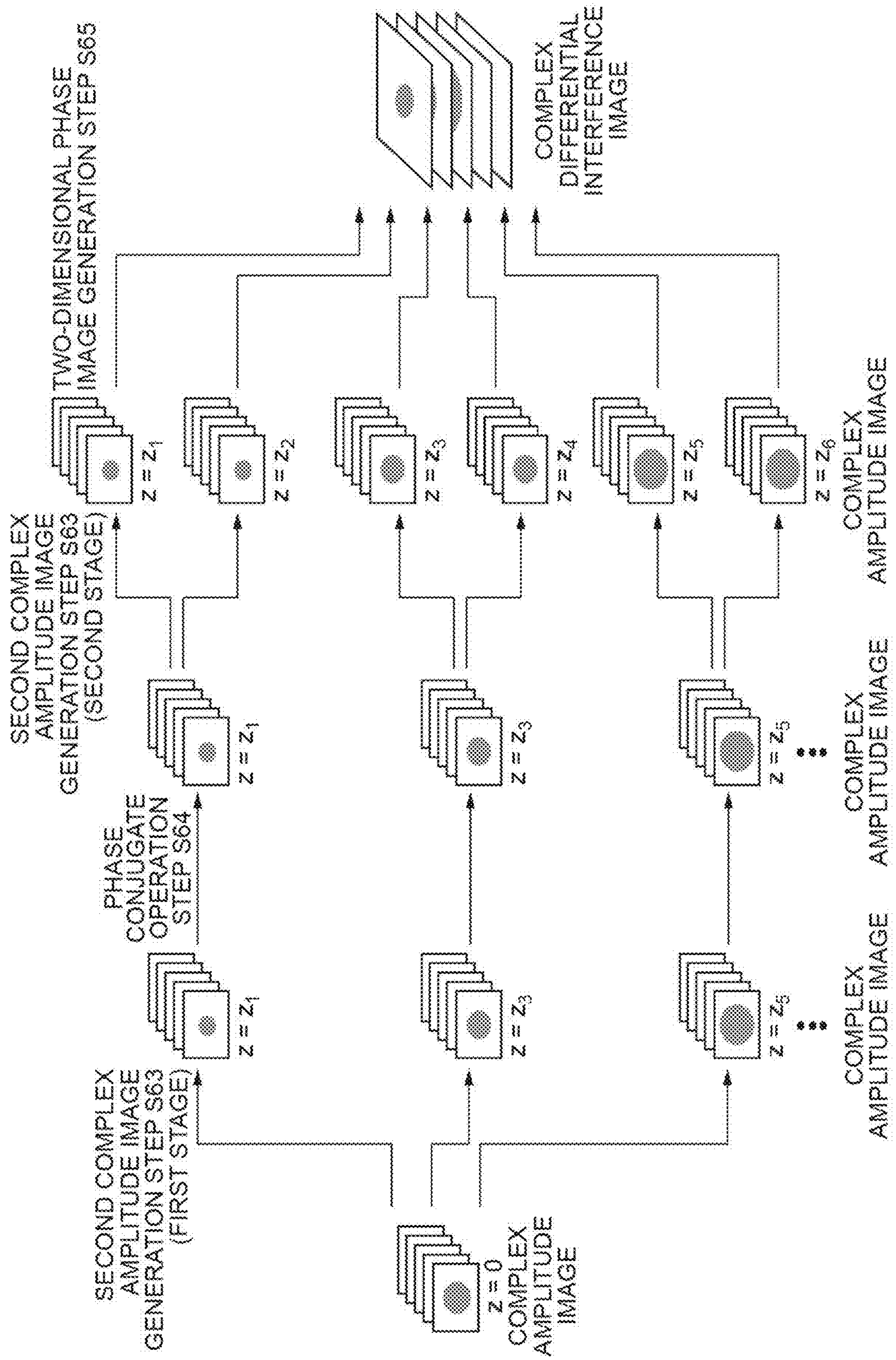
FIG. 23 is a diagram illustrating images and an order of processing steps of the second complex amplitude image generation step S63, the phase conjugate operation step S64, and the two-dimensional phase image generation step S65.

Each of FIG. 21 to FIG. 23 is a diagram illustrating the images and the order of the respective processing steps of the second complex amplitude image generation step S63, the phase conjugate operation step S64, and the two-dimensional phase image generation step S65. Each of these diagrams illustrates a configuration in which the processing step of the phase conjugate operation step S64 is performed before, during, or after the processing step of the second complex amplitude image generation step S63.

A first configuration illustrated in FIG. 21 corresponds to the flowchart illustrated in FIG. 19. In the first configuration, the phase conjugate operation step S64 is performed after the processing step of the second complex amplitude image generation step S63. In the second complex amplitude image generation step S63, for each of the plurality of light irradiation directions, the complex amplitude image at each of the plurality of z direction positions ($z=z_1$, $z_2$, $z_3$ in this diagram) is generated based on the complex amplitude image at the reference position ($z=0$) generated in the first complex amplitude image generation step S62 by the above Formulas (4) and (5) of the formulas of the free propagation.

In the first configuration, subsequently, in the phase conjugate operation step S64, for each of the plurality of positions, the phase conjugate operation is performed on the complex amplitude image of each of the plurality of light irradiation directions, and the complex amplitude image of each of the plurality of light irradiation directions in the case in which the relationship between the light irradiation and the imaging for the observation object is reversed is generated. Further, in the two-dimensional phase image generation step S65, for each of the plurality of positions, the complex differential interference image is generated based on the complex amplitude image of each of the plurality of light irradiation directions generated in the phase conjugate operation step S64, and in addition, the phase differential image is generated.

In a second configuration illustrated in FIG. 22, the phase conjugate operation step S64 is performed before the processing step of the second complex amplitude image generation step S63. In the phase conjugate operation step S64, for each of the plurality of light irradiation directions, the phase conjugate operation is performed on the complex amplitude image at the reference position (z=0) generated in the first complex amplitude image generation step S62, and the complex amplitude image of each of the plurality of light irradiation directions in the case in which the relationship between the light irradiation and the imaging for the observation object is reversed is generated.

In the second configuration, subsequently, in the second complex amplitude image generation step S63, for each of the plurality of light irradiation directions, the complex amplitude image at each of the plurality of z direction positions ($z=z_1$, $z_2$, $z_3$ in this diagram) is generated based on the complex amplitude image at the reference position (z=0) generated in the phase conjugate operation step S64 by the above Formulas (4) and (5) of the formulas of the free propagation. Further, in the two-dimensional phase image generation step S65, for each of the plurality of positions, the complex differential interference image is generated based on the complex amplitude image of each of the plurality of light irradiation directions generated in the second complex amplitude image generation step S63, and in addition, the phase differential image is generated.

In a third configuration illustrated in FIG. 23, in the case in which the second complex amplitude image generation step S63 generates the complex amplitude image at each of the plurality of positions from the complex amplitude image at the reference position through two stages, the phase conjugate operation step S64 is performed between a first stage and a second stage in the two stages.

In the third configuration, in the first stage of the second complex amplitude image generation step S63, for each of the plurality of light irradiation directions, the complex amplitude image at each of the plurality of z direction positions ($z=z_1$, $z_3$, $z_5$ in this diagram) is generated based on the complex amplitude image at the reference position (z=0) generated in the first complex amplitude image generation step S62 by the above Formulas (4) and (5) of the formulas of the free propagation. Subsequently, in the phase conjugate operation step S64, the phase conjugate operation is performed on the complex amplitude image of each of the plurality of light irradiation directions, and the complex amplitude image of each of the plurality of light irradiation directions in the case in which the relationship between the light irradiation and the imaging for the observation object is reversed is generated.

In the third configuration, further subsequently, in the second stage of the second complex amplitude image generation step S63, for each of the plurality of light irradiation directions, the complex amplitude image at each of the z direction positions ($z=z_2$, $z_4$, $z_6$) is generated based on the complex amplitude images at the z direction positions ($z=z_1$, $z_3$, $z_5$) generated in the phase conjugate operation step S64 by the above Formulas (4) and (5) of the formulas of the free propagation. Further, in the two-dimensional phase image generation step S65, for each of the plurality of positions, the complex differential interference image is generated based on the complex amplitude image of each of the plurality of light irradiation directions generated in the second complex amplitude image generation step S63, and in addition, the phase differential image is generated.

In the first configuration, the second configuration, and the third configuration described above, the number of times of the phase conjugate operation on the complex amplitude image in the phase conjugate operation step S64 is different. The overall processing time of the phase conjugate operation step S64 is shorter in the third configuration than in the first configuration, and is even shorter in the second configuration.

Figure 24:
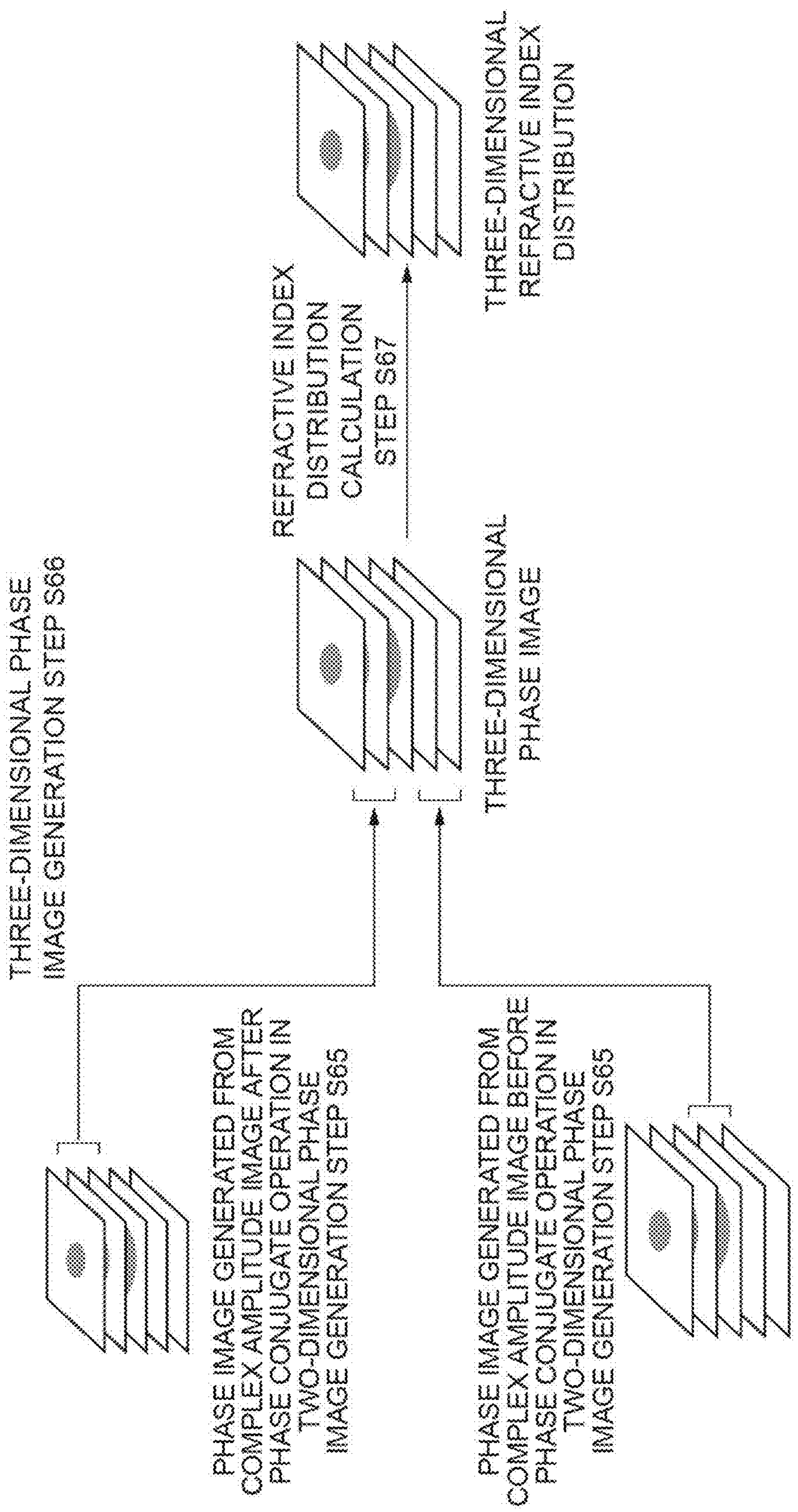
FIG. 24 is a diagram illustrating images and an order of processing steps of a three-dimensional phase image generation step S66 and a refractive index distribution calculation step S67.

FIG. 24 is a diagram illustrating the images and the order of the respective processing steps of the three-dimensional phase image generation step S66 and the refractive index distribution calculation step S67. In the three-dimensional phase image generation step S66, the three-dimensional phase image is generated based on the two-dimensional phase image of each of the plurality of positions generated in the two-dimensional phase image generation step S65.

In this case, for the position which is relatively close to the imaging unit, the two-dimensional phase image generated based on the complex amplitude image before performing the processing step of the phase conjugate operation step S64 (the two-dimensional phase image generated in the configuration illustrated in FIG. 20) is mainly used. On the other hand, for the position which is relatively far from the imaging unit, the two-dimensional phase image generated based on the complex amplitude image after performing the processing step of the phase conjugate operation step S64 (the two-dimensional phase image generated in any one of the configurations illustrated in FIG. 21 to FIG. 23) is mainly used.

Subsequently, in the refractive index distribution calculation step S67, the three-dimensional refractive index distribution of the observation object is obtained by deconvolution based on the three-dimensional phase image generated in the three-dimensional phase image generation step S66.

The generation of the two-dimensional phase image at each position in the z direction includes the following three configurations. The phase image generated based on the complex amplitude image before performing the processing step of the phase conjugate operation step S64 (the phase image generated in the configuration illustrated in FIG. 20) is set as the first phase image $\phi_1$. The phase image generated based on the complex amplitude image after performing the processing step of the phase conjugate operation step S64 (the phase image generated in any one of the configurations illustrated in FIG. 21 to FIG. 23) is set as the second phase image $\phi_2$. A weight function a having a differential coefficient of 0 or less with respect to the variable z representing the distance from the imaging unit along the light propagation path is used. The value of the weight function is 0 or more and 1 or less.

In the first configuration, it is assumed that the weight function a has a positive value (for example, 1) in a range in which z is threshold value $z_{th}$ or less, and has a value of 0 in a range other than the above range. That is, the two-dimensional phase image is represented by the following Formula (11).

[Formula 11]

$$\phi(x, y, z) = \begin{cases} \phi_1(x, y, z) & z \le z_{th} \\ \phi_2(x, y, z) & z > z_{th} \end{cases} \tag{11}$$

In the second configuration, it is assumed that the weight function α is a function having a value which continuously changes in at least a partial range in the z direction. That is, the two-dimensional phase image is represented by the following Formula (12).

[Formula 12]

$$\phi(x, y, z) = \alpha(z)\cdot\phi_1(x, y, z) + [1 - \alpha(z)]\phi_2(x, y, z) \tag{12}$$

In the third configuration, it is assumed that the weight function α has a value according to the position(x, y) on the plane perpendicular to the optical axis (the z direction). That is, the two-dimensional phase image is represented by the following Formula (13).

[Formula 13]

$$\phi(x, y, z) = \alpha(x, y, z)\cdot\phi_1(x, y, z) + [1 - \alpha(x, y, z)]\phi_2(x, y, z) \tag{13}$$

Next, the contents of the phase conjugate operation by the phase conjugate operation step S64 will be described with reference to FIG. 25 and FIG. 26.

Figure 25:
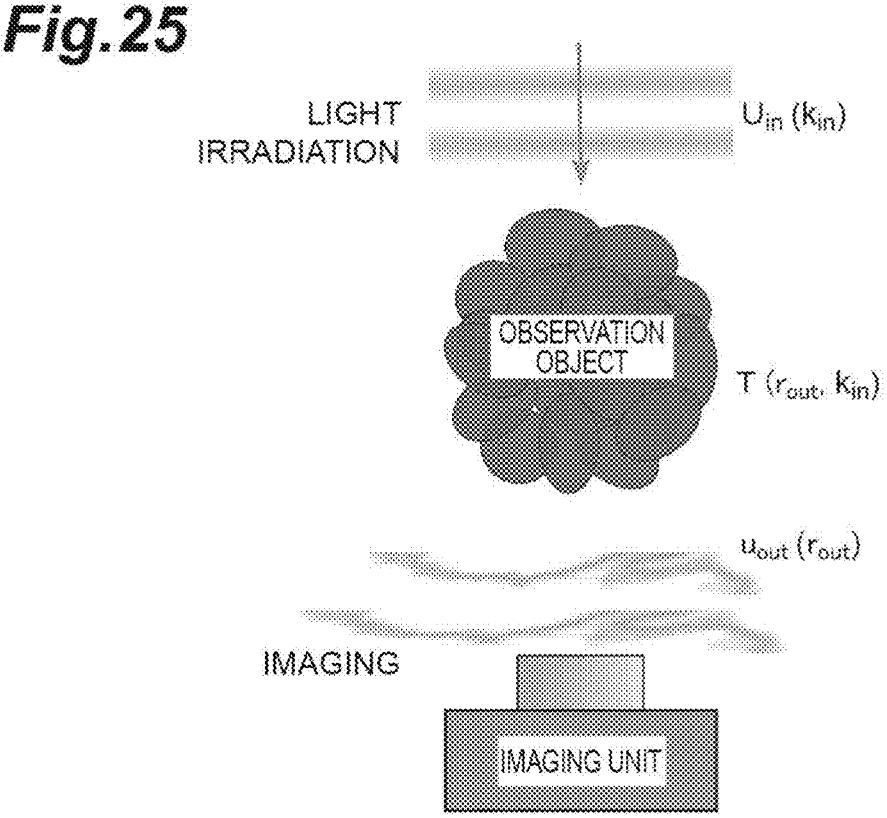
FIG. 25 is a diagram for describing an outline of a phase conjugate operation, and is the diagram illustrating input light and output light when an interference intensity image is imaged by an imaging unit.

FIG. 25 is a diagram illustrating input light $U_{in}(k_{in})$ and output light $u_{out}(r_{out})$ when the interference intensity image is imaged by the imaging unit. $U_{in}(k_{in})$ represents a complex amplitude of a wavenumber $k_{in}$ of the light with which the observation object is irradiated. $u_{out}(r_{out})$ represents a complex amplitude of a position $r_{out}$ of the light output from the observation object.

The relationship between $U_{in}(k_{in})$ and $u_{out}(r_{out})$ is represented by the following Formula (14). An n-th element $U_{in}$ $$(k_{in}^n)$$

of a column vector $U_{in}$ represents a complex amplitude of a plane wave of a wavenumber of $$k_{in}^n.$$

An n-th element $u_{out}$ $$(r_{out}^n)$$

of a column vector $u_{out}$ represents a complex amplitude of the light observed at a position $$r_{out}^n.$$

A matrix $T(r_{out}, k_{in})$ of N rows and N columns represents a linear relationship between $U_{in}(k_{in})$ and $u_{out}(r_{out})$, and is referred to as a transmission matrix. A scattering process of the light in the observation object can be represented by the transmission matrix described above. An element $T_{n1,n2}$ of an n1-th row and an n2-th column of the matrix $T(r_{out}, k_{in})$ represent a complex amplitude of the light observed at a position $$r_{out}^{n1}$$

when the plane wave having a wavenumber of $$k_{in}^{n2}$$

and an amplitude of 1 is input.

[Formula 14]

$$\begin{pmatrix} u_{out}(r_{out}^1) \\ \vdots \\ u_{out}(r_{out}^N) \end{pmatrix} = \begin{pmatrix} T(r_{out}^1, k_{in}^1) & \dots & T(r_{out}^1, k_{in}^N) \\ \vdots & \ddots & \vdots \\ T(r_{out}^N, k_{in}^1) & \dots & T(r_{out}^N, k_{in}^N) \end{pmatrix} \begin{pmatrix} U_{in}(k_{in}^1) \\ \vdots \\ U_{in}(k_{in}^N) \end{pmatrix} = \begin{pmatrix} T_{1,1} & \dots & T_{1,N} \\ \vdots & \ddots & \vdots \\ T_{N,1} & \dots & T_{N,N} \end{pmatrix} \begin{pmatrix} U_{in}(k_{in}^1) \\ \vdots \\ U_{in}(k_{in}^N) \end{pmatrix} \tag{14}$$

Figure 26:
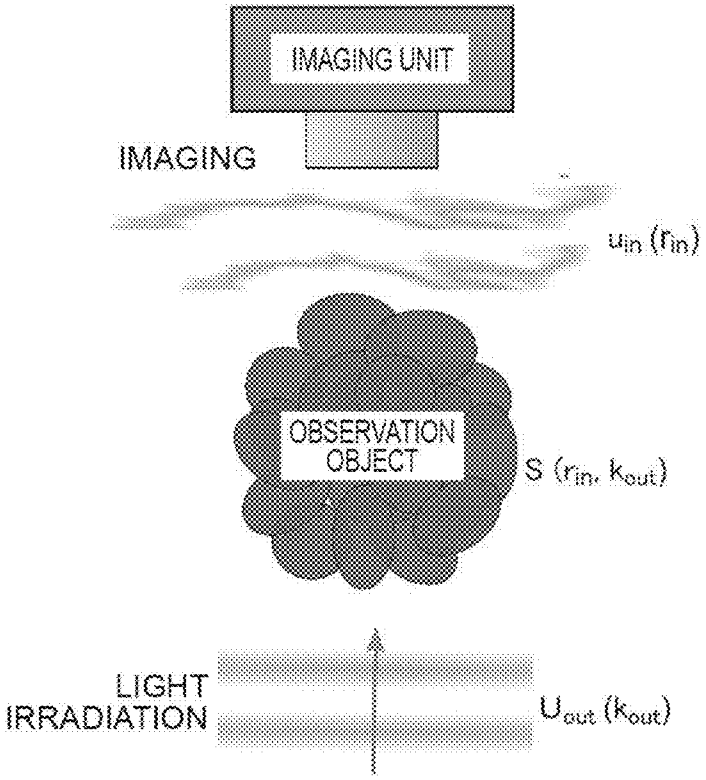
FIG. 26 is a diagram for describing the outline of the phase conjugate operation, and is the diagram illustrating input light and output light in a case in which a relationship between light irradiation and imaging is reversed.

FIG. 26 is a diagram illustrating input light $U_{out}(k_{out})$ and output light $u_{in}(r_{in})$ in the case in which the relationship between the light irradiation and the imaging is reversed. In this case, $U_{out}(k_{out})$ represents a complex amplitude of a wavenumber $k_{out}$ of the light with which the observation object is irradiated. $u_{in}(r_{in})$ represents a complex amplitude of a position $r_{in}$ of the light output from the observation object.

The relationship between $U_{out}(K_{out})$ and $u_{in}(r_{in})$ is represented by the following Formula (15). An n-th element $U_{out}$ $$(k_{out}^n)$$

of a column vector $U_{out}$ represents a complex amplitude of a plane wave of a wavenumber of $$k_{out}^n.$$

An n-th element $u_{in}$ $$(r_{in}^n)$$

of a column vector $u_{in}$ represents a complex amplitude of the light observed at a position $$r_{in}^n.$$

A matrix $S(r_{in}, k_{out})$ of N rows and N columns represents a linear relationship between $U_{out}(k_{out})$ and $u_{in}(r_{in})$, and is a transmission matrix in the case in which the relationship between the light irradiation and the imaging is reversed.

[Formula 15]

$$\begin{pmatrix} u_{in}(r_{in}^1) \\ \vdots \\ u_{in}(r_{in}^N) \end{pmatrix} = \begin{pmatrix} S(r_{in}^1, k_{out}^1) & \cdots & S(r_{in}^1, k_{out}^N) \\ \vdots & \ddots & \vdots \\ S(r_{in}^N, k_{out}^1) & \cdots & S(r_{in}^N, k_{out}^N) \end{pmatrix} \begin{pmatrix} U_{out}(k_{out}^1) \\ \vdots \\ U_{out}(k_{out}^N) \end{pmatrix} = \begin{pmatrix} S_{1,1} & \cdots & S_{1,N} \\ \vdots & \ddots & \vdots \\ S_{N,1} & \cdots & S_{N,N} \end{pmatrix} \begin{pmatrix} U_{out}(k_{out}^1) \\ \vdots \\ U_{out}(k_{out}^N) \end{pmatrix} \quad (15)$$

$U_{in}(k_{in})$ is represented by the Fourier transform of $u_{in}(r_{in})$ as shown in the following Formula (16). $U_{out}(k_{out})$ is represented by the Fourier transform of $u_{out}(r_{out})$ as shown in the following Formula (17). When Formulas (14) to (17) are used, the transmission matrix $S(r_{in}, k_{out})$ in the case in which the relationship between the light irradiation and the imaging is reversed is represented by the following Formula (18) by using a matrix representing the inverse Fourier transform and the transmission matrix $T(r_{out}, k_{in})$.

[Formula 16]

$$\begin{pmatrix} U_{in}(k_{in}^1) \\ \vdots \\ U_{in}(k_{in}^N) \end{pmatrix} = \begin{pmatrix} F_{1,1} & \cdots & F_{1,N} \\ \vdots & \ddots & \vdots \\ F_{N,1} & \cdots & F_{N,N} \end{pmatrix} \begin{pmatrix} u_{in}(r_{in}^1) \\ \vdots \\ u_{in}(r_{in}^N) \end{pmatrix} \quad (16)$$

[Formula 17]

$$\begin{pmatrix} U_{out}(k_{out}^1) \\ \vdots \\ U_{out}(k_{out}^N) \end{pmatrix} = \begin{pmatrix} F_{1,1} & \cdots & F_{1,N} \\ \vdots & \ddots & \vdots \\ F_{N,1} & \cdots & F_{N,N} \end{pmatrix} \begin{pmatrix} u_{out}(r_{out}^1) \\ \vdots \\ u_{out}(r_{out}^N) \end{pmatrix} \quad (17)$$

[Formula 18]

$$\begin{pmatrix} S_{1,1} & \cdots & S_{1,N} \\ \vdots & \ddots & \vdots \\ S_{N,1} & \cdots & S_{N,N} \end{pmatrix} = \begin{pmatrix} F_{1,1} & \cdots & F_{1,N} \\ \vdots & \ddots & \vdots \\ F_{N,1} & \cdots & F_{N,N} \end{pmatrix}^{-1} \begin{pmatrix} T_{1,1} & \cdots & T_{1,N} \\ \vdots & \ddots & \vdots \\ T_{N,1} & \cdots & T_{N,N} \end{pmatrix}^{-1} \begin{pmatrix} F_{1,1} & \cdots & F_{1,N} \\ \vdots & \ddots & \vdots \\ F_{N,1} & \cdots & F_{N,N} \end{pmatrix}^{-1} \quad (18)$$

In the phase conjugate operation step S64, first, the transmission matrix $T(r_{out}, k_{in})$ when the interference intensity image is imaged by the imaging unit is obtained based on the complex amplitude image. Next, based on the above transmission matrix $T(r_{out}, k_{in})$ and the above Formula (18), the transmission matrix $S(r_{in}, k_{out})$ in the case in which the relationship between the light irradiation and the imaging is reversed is obtained. Further, based on the above transmission matrix $S(r_{in}, k_{out})$, the complex amplitude image in the case in which the relationship between the light irradiation and the imaging is reversed is obtained.

The vector $$U_{in}^n$$

$(k_{in})$ of the input light of the n-th light irradiation direction when the interference intensity image is imaged by the imaging unit for each of the plurality of light irradiation directions is represented by the following Formula (19), in which only the value of the n-th element is 1 and the values of the other elements are 0. For the above input light $$U_{in}^n$$

$(k_{in})$, the output light $$u_{out}^n$$

$(r_{out})$ is represented by the following Formula (20). The Formula (20) corresponds to the complex amplitude obtained for the n-th light irradiation direction.

[Formula 19]

$$U_{in}^n(k_{in}) = \begin{pmatrix} U_{in}^n(k_{in}^1) \\ \vdots \\ U_{in}^n(k_{in}^N) \end{pmatrix} = \begin{pmatrix} 0 \\ \vdots \\ 0 \\ 1 \\ 0 \\ \vdots \\ 0 \end{pmatrix} \quad (19)$$

[Formula 20]

$$u_{out}^n(r_{out}) = \begin{pmatrix} u_{out}^n(r_{out}^1) \\ \vdots \\ u_{out}^n(r_{out}^N) \end{pmatrix} \quad (20)$$

From the Formula (19) and the above Formula (14), the following Formula (21) is obtained. Further, the following Formula (22) is obtained by similarly obtaining for each of the plurality of light irradiation directions. In this way, the transmission matrix $T(r_{out}, k_{in})$ can be obtained. In addition, from the Formula (22) and the above Formula (18), the transmission matrix $S(r_{in}, k_{out})$ in the case in which the relationship between the light irradiation and the imaging is reversed can be obtained.

[Formula 21]

$$\begin{pmatrix} u_{out}^n(r_{out}^1) \\ \vdots \\ u_{out}^n(r_{out}^N) \end{pmatrix} = \begin{pmatrix} T_{1,1} & \cdots & T_{1,N} \\ \vdots & \ddots & \vdots \\ T_{N,1} & \cdots & T_{N,N} \end{pmatrix} \begin{pmatrix} U_{in}(k_{in}^1) \\ \vdots \\ U_{in}(k_{in}^N) \end{pmatrix} = \begin{pmatrix} T_{1,n} \\ \vdots \\ T_{N,n} \end{pmatrix} \quad (21)$$

[Formula 22]

$$\begin{pmatrix} T_{1,1} & \cdots & T_{1,N} \\ \vdots & \ddots & \vdots \\ T_{N,1} & \cdots & T_{N,N} \end{pmatrix} = \begin{pmatrix} u_{out}^1(r_{out}^1) & \cdots & u_{out}^N(r_{out}^1) \\ \vdots & \ddots & \vdots \\ u_{out}^1(r_{out}^N) & \cdots & u_{out}^N(r_{out}^N) \end{pmatrix} \quad (22)$$

The input light $$U_{out}^{n}$$

($k_{out}$) of the n-th light irradiation direction out of the plurality of light irradiation directions in the case in which the relationship between the light irradiation and the imaging is reversed is represented by the following Formula (23), in which only the value of the n-th element is 1 and the values of the other elements are 0. From this Formula, the output light $$u_{in}^{n}$$

($r_{in}$) for the input light $$U_{out}^{n}$$

($k_{out}$) is represented by the following Formula (24). The Formula (24) represents the complex amplitude when the relationship between the light irradiation and the imaging is reversed. In this way, the complex amplitude image in the case in which the relationship between the light irradiation and the imaging is reversed can be obtained.

[Formula 23]

$$U_{out}^{n}(k_{out}) = \begin{pmatrix} U_{out}^{n}(k_{out}^{1}) \\ \vdots \\ U_{out}^{n}(k_{out}^{N}) \end{pmatrix} = \begin{pmatrix} 0 \\ \vdots \\ 0 \\ 1 \\ 0 \\ \vdots \\ 0 \end{pmatrix} \tag{23}$$

[Formula 24]

$$\begin{pmatrix} u_{in}^{n}(r_{in}^{1}) \\ \vdots \\ u_{in}^{n}(r_{in}^{N}) \end{pmatrix} = \begin{pmatrix} S_{1,1} & \cdots & S_{1,N} \\ \vdots & \ddots & \vdots \\ S_{N,1} & \cdots & S_{N,N} \end{pmatrix} \begin{pmatrix} U_{out}(k_{out}^{1}) \\ \vdots \\ U_{out}(k_{out}^{N}) \end{pmatrix} = \begin{pmatrix} S_{1,n} \\ \vdots \\ S_{N,n} \end{pmatrix} \tag{24}$$

When the transmission matrix $S(r_{in}, k_{out})$ in the case in which the relationship between the light irradiation and the imaging is reversed is obtained, it is necessary to calculate the inverse matrix of the transmission matrix $T(r_{out}, k_{in})$ as shown in the above Formula (18). Therefore, the transmission matrix T needs to be a square matrix in which the number of row elements and the number of column elements are equal to each other. That is, a matrix dimension in a light irradiation side wavenumber space for the observation object in the interference intensity image acquisition step S61 and the number of pixels of the complex amplitude image need to be equal to each other.

In order to make them equal to each other, the matrix dimension in the light irradiation side wavenumber space for the observation object in the interference intensity image acquisition step S61 may be made equal to the number of pixels, or only a partial range of the image acquired by the imaging unit may be used in the subsequent processing steps. However, in general, the number of pixels of the image acquired by the imaging unit is, for example, 1024×1024, and thus, it is not easy to make the matrix dimension in the light irradiation side wavenumber space for the observation object equal to the number of pixels. Further, it is not preferable to use only the partial range of the image out of the image acquired by the imaging unit in the subsequent processing steps because this leads to a decrease in resolution.

Figure 27:
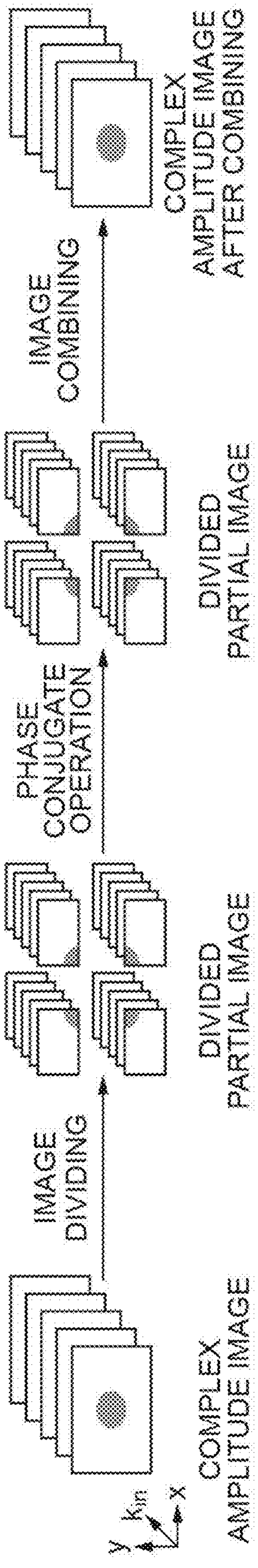
FIG. 27 is a diagram illustrating image dividing, the phase conjugate operation, and image combining in the phase conjugate operation step S64.

Therefore, as illustrated in FIG. 27, in the phase conjugate operation step S64, it is preferable to divide the complex amplitude image into a plurality of partial images each having the same number of pixels as the matrix dimension in the light irradiation side wavenumber space for the observation object, perform the phase conjugate operation on each of the plurality of partial images, and then combine the plurality of partial images. In this case, any two or more partial images out of the plurality of partial images may have a common region.

According to the present embodiment also, it is possible to observe the moving observation object while reducing the influence of the multiple scattered light even when the observation object is the multiple scattering object.

Third Embodiment

As a configuration of an apparatus according to a third embodiment, an observation apparatus 1E and an observation apparatus 1F will be described.

Figure 28:
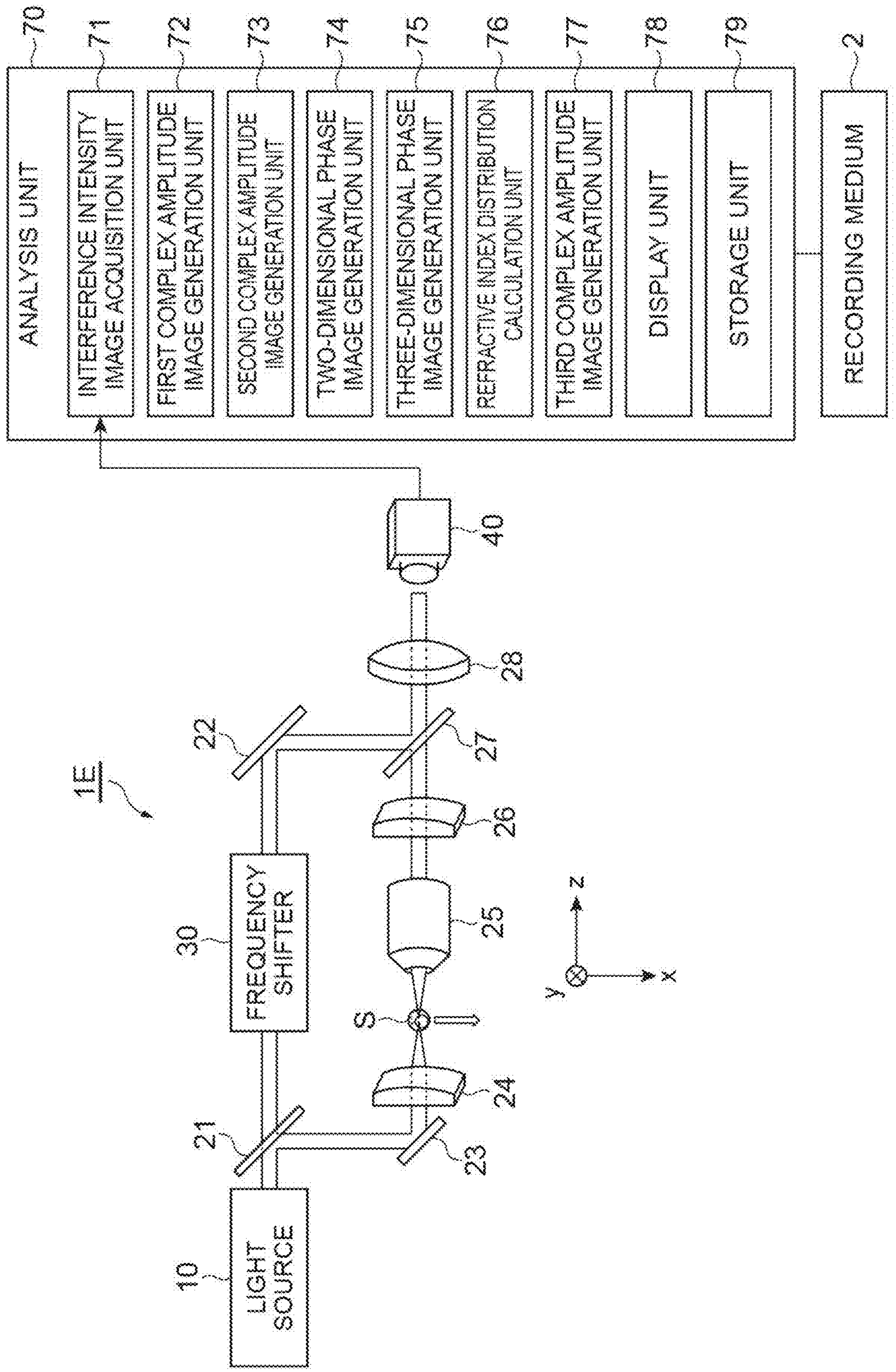
FIG. 28 is a diagram illustrating a configuration of an observation apparatus 1E.
Figure 29:
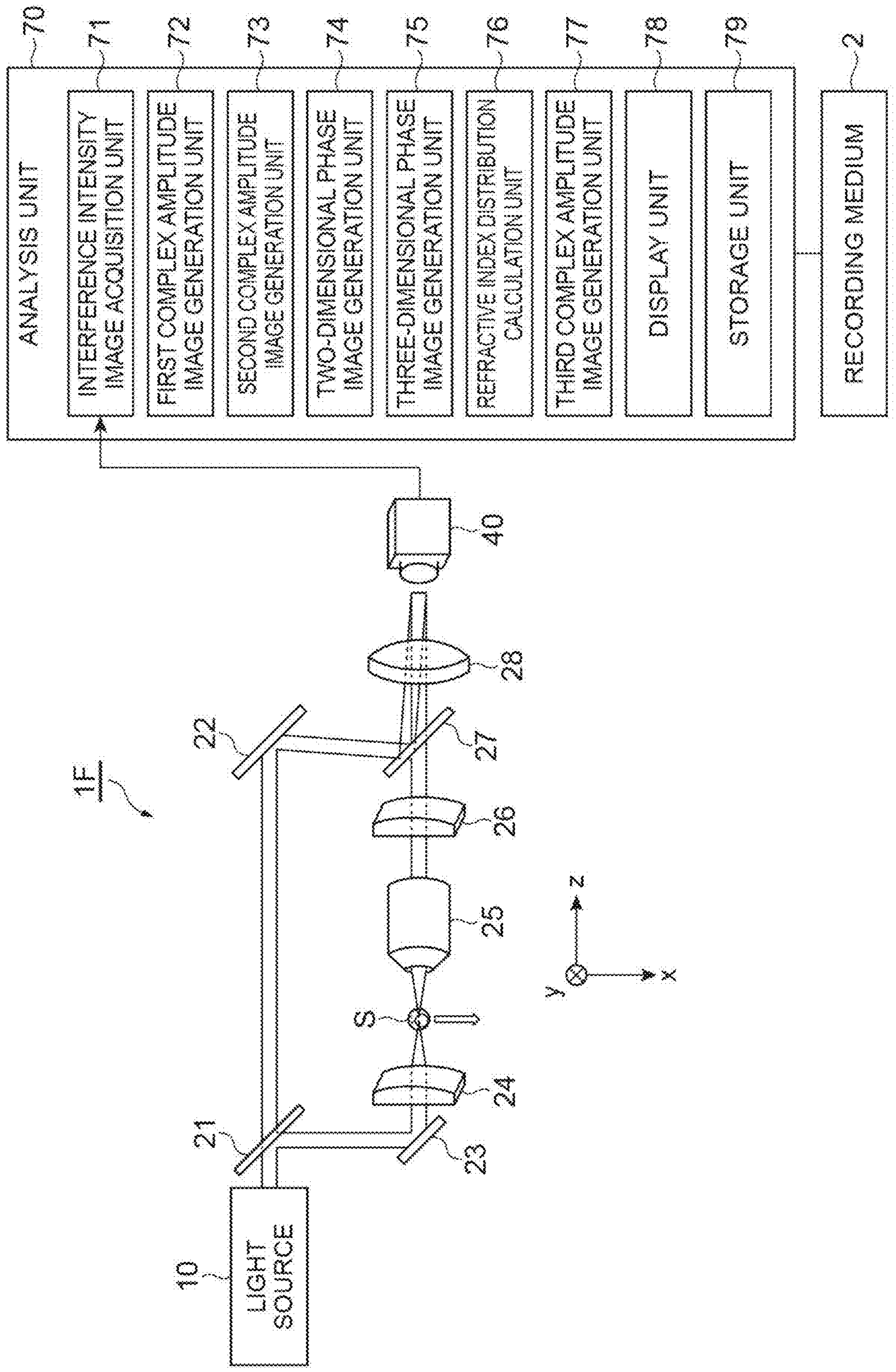
FIG. 29 is a diagram illustrating a configuration of an observation apparatus 1F.

The observation apparatus 1E illustrated in FIG. 28, as compared with the configuration of the observation apparatus 1A illustrated in FIG. 1, has the common configuration for the optical system from the light source 10 to the imaging unit 40, and further, is different in that an analysis unit 70 is provided instead of the analysis unit 50. The observation apparatus 1F illustrated in FIG. 29, as compared with the configuration of the observation apparatus 1B illustrated in FIG. 2, has the common configuration for the optical system from the light source 10 to the imaging unit 40, and further, is different in that the analysis unit 70 is provided instead of the analysis unit 50.

The analysis unit 70 is electrically connected to the imaging unit 40, and inputs the time series data of the interference intensity image output from the imaging unit 40. The analysis unit 70 generates the complex amplitude image of each of the plurality of light irradiation directions of the object light based on the time series data of the interference intensity image, and generates the three-dimensional complex differential interference image of the observation object S based on the complex amplitude image of each of the plurality of light irradiation directions. In addition, the analysis unit 70 obtains the three-dimensional refractive index distribution of the observation object S based on the three-dimensional complex differential interference image.

The analysis unit 70 may be a computer. The analysis unit 70 includes an interference intensity image acquisition unit 71, a first complex amplitude image generation unit 72, a second complex amplitude image generation unit 73, a two-dimensional phase image generation unit 74, a three-dimensional phase image generation unit 75, a refractive index distribution calculation unit 76, a third complex amplitude image generation unit 77, a display unit 78, and a storage unit 79.

The interference intensity image acquisition unit 71 acquires the time series data of the interference intensity image output from the imaging unit 40. The interference intensity image acquisition unit 71 includes a CPU, and has an input port for inputting the data of the interference intensity image output from the imaging unit 40.

The first complex amplitude image generation unit 72, the second complex amplitude image generation unit 73, the two-dimensional phase image generation unit 74, the three-dimensional phase image generation unit 75, the refractive index distribution calculation unit 76, and the third complex amplitude image generation unit 77 perform processing based on the time series data of the interference intensity image, and include a processing device such as a CPU, a GPU, a DSP, an FPGA, or the like. The display unit 78 displays an image to be processed, an image in the middle of the processing, an image after the processing, and the like, and includes, for example, a liquid crystal display.

The storage unit 79 stores data of various images, and includes a hard disk drive, a flash memory, a RAM, a ROM, and the like. The first complex amplitude image generation unit 72, the second complex amplitude image generation unit 73, the two-dimensional phase image generation unit 74, the three-dimensional phase image generation unit 75, the refractive index distribution calculation unit 76, the third complex amplitude image generation unit 77, and the storage unit 79 may be constituted by a cloud computing.

The storage unit 79 also stores a program for causing the interference intensity image acquisition unit 71, the first complex amplitude image generation unit 72, the second complex amplitude image generation unit 73, the two-dimensional phase image generation unit 74, the three-dimensional phase image generation unit 75, the refractive index distribution calculation unit 76, and the third complex amplitude image generation unit 77 to execute respective steps of the processing.

The program may be stored in the storage unit 79 at the time of manufacture or shipment of the observation apparatus, may be acquired via a communication line after shipment and then stored in the storage unit 79, or may be recorded in a computer readable recording medium 2 and then stored in the storage unit 79. The recording medium 2 may be an arbitrary medium such as a flexible disk, a CD-ROM, a DVD-ROM, a BD-ROM, a USB memory, or the like.

The details of the processing step of each of the interference intensity image acquisition unit 71, the first complex amplitude image generation unit 72, the second complex amplitude image generation unit 73, the two-dimensional phase image generation unit 74, the three-dimensional phase image generation unit 75, the refractive index distribution calculation unit 76, and the third complex amplitude image generation unit 77 will be described later.

Figure 30:
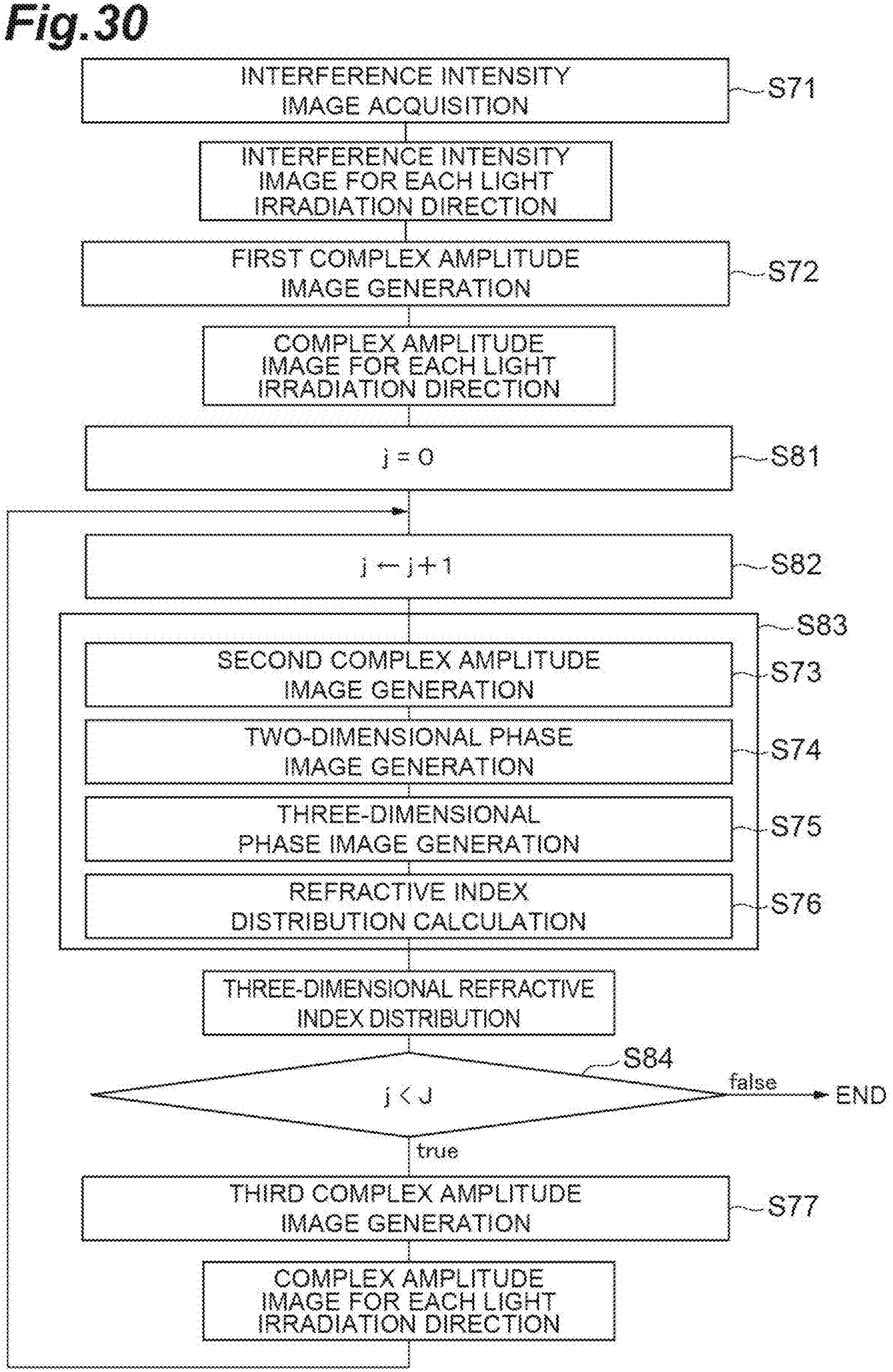
FIG. 30 is a flowchart of an observation method according to a third embodiment.
Figure 31:
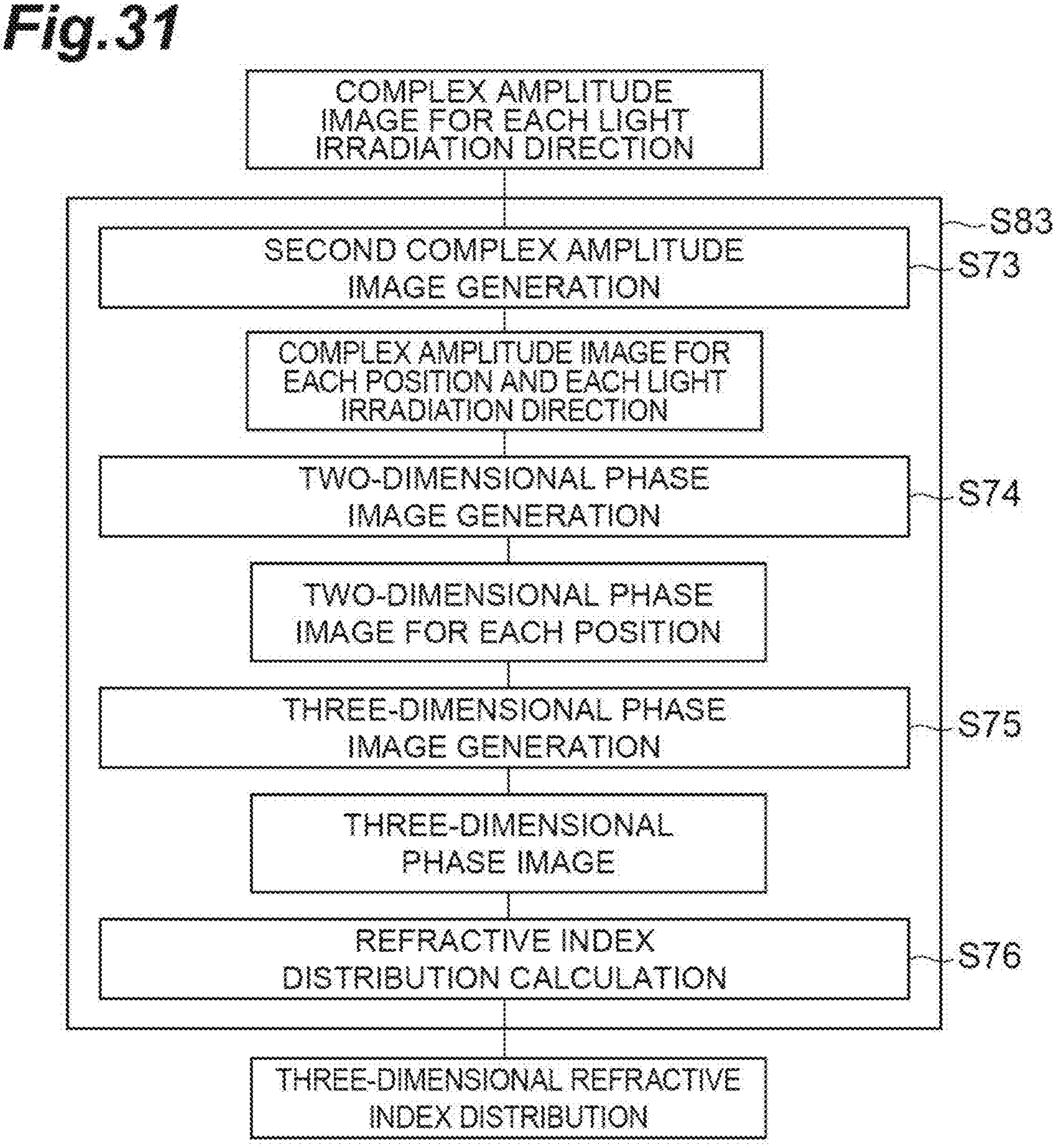
FIG. 31 is a flowchart of the observation method according to the third embodiment.

FIG. 30 and FIG. 31 are flowcharts of an observation method according to the third embodiment. FIG. 31 illustrates a part of the flowchart illustrated in FIG. 30. This observation method can be applied to each of the observation apparatus 1E and the observation apparatus 1F. The observation method includes an interference intensity image acquisition step S71, a first complex amplitude image generation step S72, a second complex amplitude image generation step S73, a two-dimensional phase image generation step S74, a three-dimensional phase image generation step S75, a refractive index distribution calculation step S76, and a third complex amplitude image generation step S77.

The processing step of the interference intensity image acquisition step S71 is performed by the interference intensity image acquisition unit 71. The processing step of the first complex amplitude image generation step S72 is performed by the first complex amplitude image generation unit 72. The processing step of the second complex amplitude image generation step S73 is performed by the second complex amplitude image generation unit 73.

The processing step of the two-dimensional phase image generation step S74 is performed by the two-dimensional phase image generation unit 74. The processing step of the three-dimensional phase image generation step S75 is performed by the three-dimensional phase image generation unit 75. The processing step of the refractive index distribution calculation step S76 is performed by the refractive index distribution calculation unit 76. The processing step of the third complex amplitude image generation step S77 is performed by the third complex amplitude image generation unit 77.

In the interference intensity image acquisition step S71, the interference intensity image acquisition unit 71 acquires the time series data of the interference intensity image output from the imaging unit 40. In the first complex amplitude image generation step S72, the first complex amplitude image generation unit 72 obtains the time series data $u(k_x, y, t)$ of the complex amplitude image of the object light reaching the imaging plane of the imaging unit 40 based on the time series data $I(k_x, y, t)$ acquired by the interference intensity image acquisition unit 71, and in addition, generates the complex amplitude image $u(x, y)$ of each of the plurality of light irradiation directions $k_{in}$ based on the time series data $u(k_x, y, t)$ of the complex amplitude image of the object light.

In the second complex amplitude image generation step S73, the second complex amplitude image generation unit 73 generates, for each of the plurality of light irradiation directions, a complex amplitude image at each of a plurality of z direction positions between a first position and a second position based on the complex amplitude image at the first position with respect to a distance from the imaging unit 40 along a light propagation path.

In the two-dimensional phase image generation step S74, the two-dimensional phase image generation unit 74 generates, for each of the plurality of positions, a two-dimensional phase image based on the complex amplitude image of each of the plurality of light irradiation directions generated by the second complex amplitude image generation unit 73. The two-dimensional phase image generated in this step corresponds to a phase image centered on the focused z direction position.

In the three-dimensional phase image generation step S75, the three-dimensional phase image generation unit 75 generates a three-dimensional phase image between the first position and the second position based on the two-dimensional phase image at each of the plurality of positions generated by the two-dimensional phase image generation unit 74. The three-dimensional phase image generated in this step is an image in which the positions x and y in the two-dimensional phase image and the position z of the two-dimensional phase image are variables.

In the refractive index distribution calculation step S76, the refractive index distribution calculation unit 76 obtains a three-dimensional refractive index distribution of the observation object between the first position and the second position by deconvolution based on the three-dimensional phase image generated by the three-dimensional phase image generation unit 75.

The interference intensity image acquisition step S71, the first complex amplitude image generation step S72, the second complex amplitude image generation step S73, the two-dimensional phase image generation step S74, the three-dimensional phase image generation step S75, and the refractive index distribution calculation step S76 in the observation method of the third embodiment respectively perform substantially the same processing steps as the interference intensity image acquisition step S1, the first complex amplitude image generation step S2, the second complex amplitude image generation step S3, the two-dimensional phase image generation step S4, the three-dimensional phase image generation step S5, and the refractive index distribution calculation step S6 in the observation method of the first embodiment.

In the third complex amplitude image generation step S77, the third complex amplitude image generation unit 77 generates, for each of the plurality of light irradiation directions, a complex amplitude image at the second position based on the complex amplitude image at the first position used in the second complex amplitude image generation step S73 and the three-dimensional refractive index distribution of the observation object between the first position and the second position calculated in the refractive index distribution calculation step S76.

In the step S83 including the second complex amplitude image generation step S73, the two-dimensional phase image generation step S74, the three-dimensional phase image generation step S75, and the refractive index distribution calculation step S76, the three-dimensional refractive index distribution of the observation object between the first position and the second position is obtained based on the complex amplitude image at the first position with respect to the distance from the imaging unit 40 along the light propagation path. The processing steps of the step S83 and the third complex amplitude image generation step S77 are repeatedly performed. This will be described with reference to FIG. 30 to FIG. 33.

Figure 32:
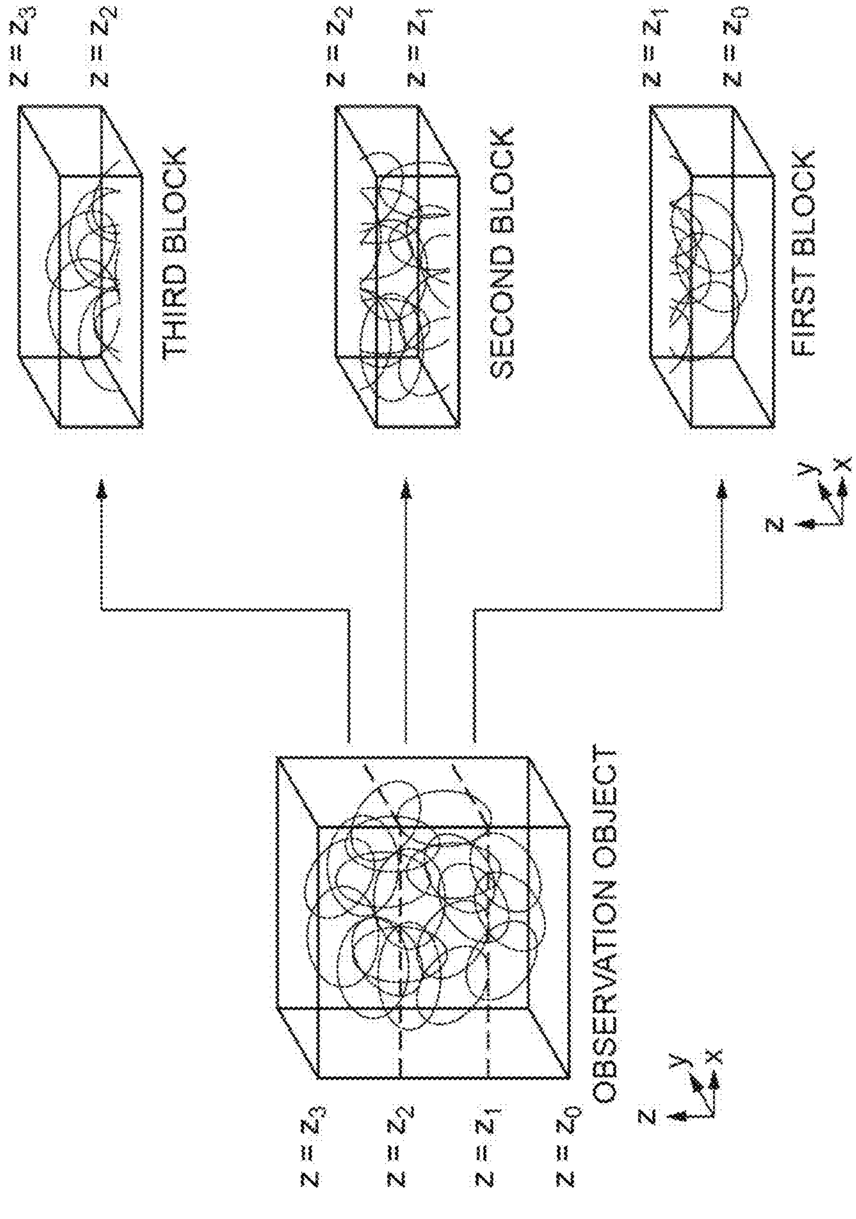
FIG. 32 is a diagram illustrating a relationship between a region including an observation object and first to J-th blocks.

FIG. 32 is a diagram illustrating a relationship between a region including the observation object and first to J-th blocks. As illustrated in this diagram, the region including the observation object is divided into the first to J-th blocks in order based on the distance from the imaging unit along the light propagation path (z direction). In this diagram, it is set to J=3. The j-th block in the first to J-th blocks is a region from $z=z_{j-1}$ to $z=z_j$. In each j-th block, a position (near end) of $z=z_{j-1}$ closest to the imaging unit is set as the first position, and a position (far end) of $z=z_j$ farthest from the imaging unit is set as the second position.

Figure 33:
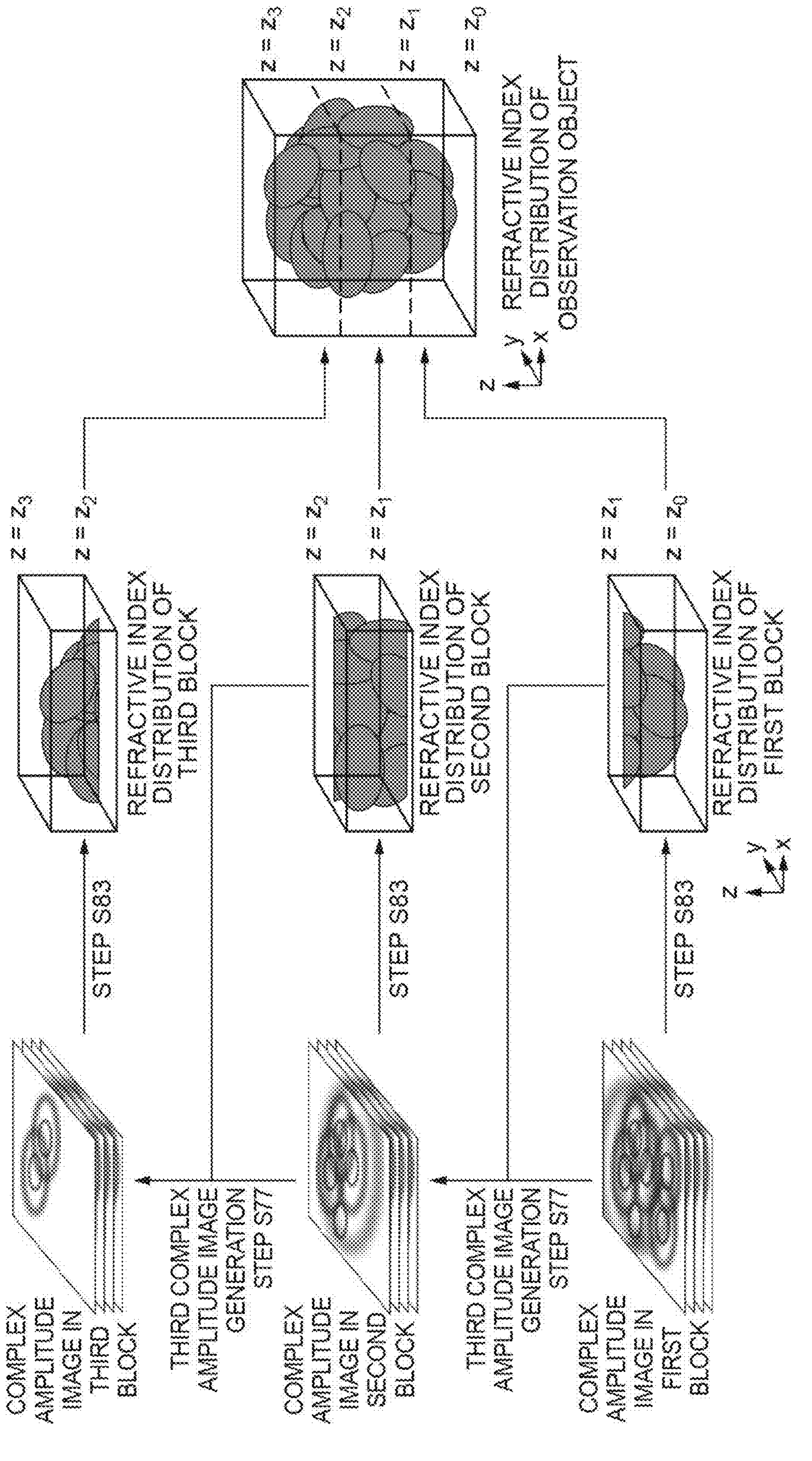
FIG. 33 is a diagram illustrating a processing procedure for the first to J-th blocks.

FIG. 33 is a diagram illustrating a processing procedure for the first to J-th blocks. As illustrated in this diagram, for each j-th block, in the step S83, the complex amplitude image and the two-dimensional phase image at each of the plurality of z direction positions from the first position to the second position are generated based on the complex amplitude image at the first position, the three-dimensional phase image between the first position and the second position is generated, and the three-dimensional refractive index distribution is obtained. For each j-th block, in the third complex amplitude image generation step S77, the complex amplitude image at the second position is generated based on the complex amplitude image at the first position and the three-dimensional refractive index distribution calculated in the step S83.

The complex amplitude image at the second position in the (j−1)-th block generated in the third complex amplitude image generation step S77 is used as the complex amplitude image at the first position in the next j-th block, and the processing steps of the step S83 and the third complex amplitude image generation step S77 are performed for the j-th block. When the three-dimensional refractive index distribution is obtained for each of the first to J-th blocks, the three-dimensional refractive index distribution of the entire observation object is obtained by combining these distributions.

As illustrated in FIG. 30 and FIG. 31, in the step S81 after the first complex amplitude image generation step S72, it is set to j=0, and in the subsequent step S82, the value of j is increased as j=1, and the processing steps of the step S83 and the third complex amplitude image generation step S77 are performed for the first block.

That is, for the first block closest to the imaging unit, based on the complex amplitude image generated in the first complex amplitude image generation step S72, a position of $z=z_0$ (near end) closest to the imaging unit is set as the first position, a position of $z=z_1$ (far end) farthest from the imaging unit is set as the second position, and the respective processing steps of the step S83 (the second complex amplitude image generation step S73, the two-dimensional phase image generation step S74, the three-dimensional phase image generation step S75, and the refractive index distribution calculation step S76) and the third complex amplitude image generation step S77 are sequentially performed. Thereafter, the process returns to the step S82.

For the j-th block (in this case, j is 2 or more and less than J), based on the complex amplitude image generated for the (j−1)-th block in the third complex amplitude image generation step S77, a position of $z=z_{j-1}$ (near end) closest to the imaging unit is set as the first position, a position of $z=z_j$ (far end) farthest from the imaging unit is set as the second position, and the respective processing steps of the step S83 (the second complex amplitude image generation step S73, the two-dimensional phase image generation step S74, the three-dimensional phase image generation step S75, and the refractive index distribution calculation step S76) and the third complex amplitude image generation step S77 are sequentially performed. Thereafter, the process returns to the step S82.

For the J-th block which is the last block farthest from the imaging unit, based on the complex amplitude image generated for the (J−1)-th block in the third complex amplitude image generation step S77, a position of $z=z_{J-1}$ (near end) closest to the imaging unit is set as the first position, a position of $z=z_J$ (far end) farthest from the imaging unit is set as the second position, and the processing step of the step S83 (the second complex amplitude image generation step S73, the two-dimensional phase image generation step S74, the three-dimensional phase image generation step S75, and the refractive index distribution calculation step S76) is performed.

For the J-th block, it is determined to be the last block in the step S84 after the step S83, and may be ended without proceeding to the third complex amplitude image generation step S77. In addition, for the J-th block, it may be determined to be the last block after the three-dimensional phase image generation step S75, and may be ended without proceeding to the refractive index distribution calculation step S76, and in this case, the three-dimensional phase image of the entire observation object is obtained.

In addition, the region including the observation object may be divided into the two blocks in order based on the distance from the imaging unit along the light propagation path (z direction), and in this case, the processing for the first block and the processing for the last J-th block described above may be performed.

Further, the region including the observation object may not be divided into the plurality of blocks, and in this case, the respective processing steps of the step S83 (the second complex amplitude image generation step S73, the two-dimensional phase image generation step S74, the three-dimensional phase image generation step S75, and the refractive index distribution calculation step S76) and the third complex amplitude image generation step S77 may be sequentially performed only once.

Next, the details of the third complex amplitude image generation step S77 will be described. When acquiring the interference intensity image by irradiating the observation object with the light, in the j-th block, a light wavefront at the second position ($z=z_j$) propagates inside the j-th block to reach the first position ($z=z_{j-1}$) and further propagates to the imaging unit. Therefore, in the third complex amplitude image generation step S77, the light wavefront at the first position ($z=z_{j-1}$) is reversely propagated inside the j-th block by numerical calculation in consideration of the refractive index distribution of the j-th block, thereby obtaining the light wavefront at the second position ($z=z_j$).

That is, in the third complex amplitude image generation step S77, for each of the plurality of light irradiation directions, the complex amplitude image at the second position ($z=z_j$) of the j-th block is generated based on the complex amplitude image at the first position ($z=z_{j-1}$) of the j-th block and the refractive index distribution of the j-th block. In the above processing, a method of numerically calculating the propagation of the light wavefront in consideration of the refractive index distribution of the medium is used. A beam propagation method (BPM), a split-step non-paraxial (SSNP), and the like are known as the numerical calculation method of the inhomogeneous medium propagation described above. Hereinafter, the processing using the BPM in the third complex amplitude image generation step S77 will be described.

Figure 34:
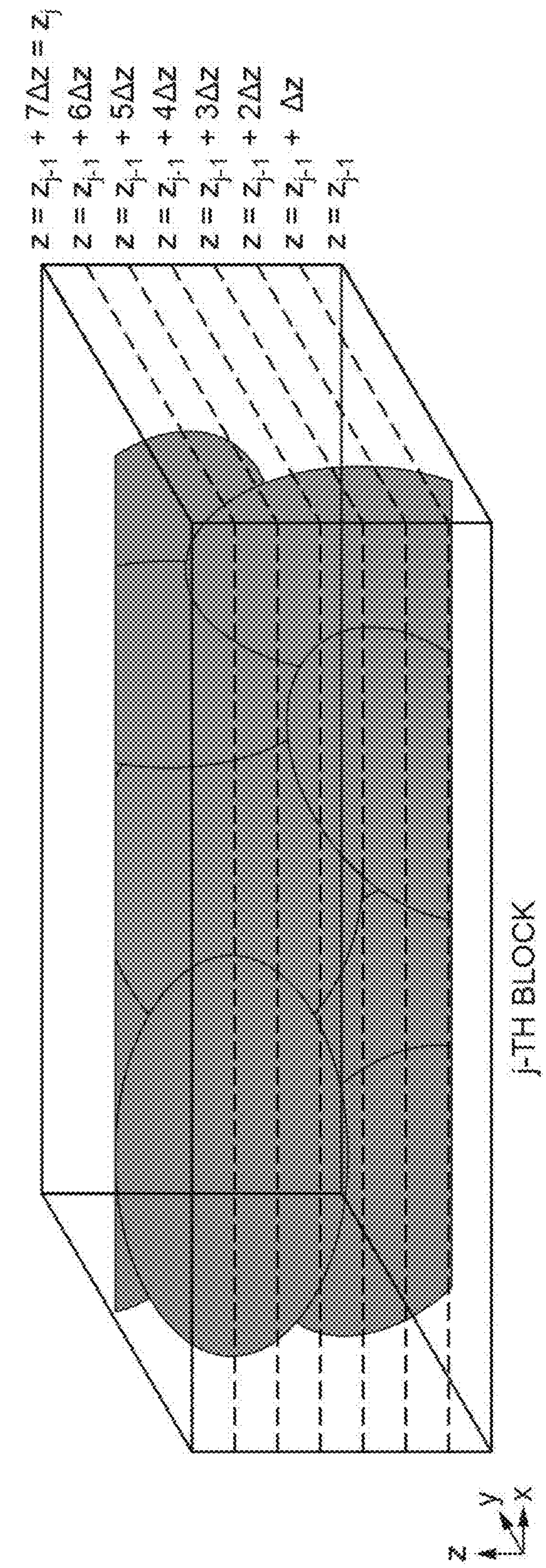
FIG. 34 is a diagram illustrating processing contents of a BPM.

FIG. 34 is a diagram illustrating processing contents of the BPM. This diagram illustrates an arbitrary j-th block. As illustrated in this diagram, the j-th block is divided into M slices (7 slices in this diagram) (first to M-th slices) based on the distance from the imaging unit along the light propagation path (z direction). A thickness of each slice is about a wavelength.

The thickness of each slice may be constant. In this case, it is assumed that the thickness of each slice is a constant value of $\Delta z$. The m-th slice out of the first to M-th slices of the j-th block is from a position ($z_{j-1}+(m-1)\Delta z$) to a position ($z_{j-1}+m\Delta z$). In order from the first position ($z=z_{j-1}$) of the j-th block to the second position ($z=z_j$), a phase change according to the refractive index distribution is sequentially applied in each of the first to M-th slices, and the light wavefront is reversely propagated by $\Delta z$.

In addition, the thickness $\Delta z$ of each slice in the processing of the third complex amplitude image generation step S77 may be different from or may coincide with the position interval when generating the complex amplitude image of each of the plurality of z direction positions from the first position to the second position in the processing of the second complex amplitude image generation step S73.

The phase change o(x, y, z) applied to the light wavefront when reversely propagating the slice of the thickness $\Delta z$ at the position z is represented by the following Formula (25). In the Formula (25), $k_v$ is a wavenumber of the light in vacuum. $\delta n(x, y, z)$ is a difference between the refractive index distribution n(x, y, z) of the observation object at the position z and the refractive index $n_b$ of the background (medium), and is represented by the following Formula (26). Further, cos θ is represented by the following Formula (27).

[Formula 25]

$$o(x, y, z) = \exp\left(-ik_v \delta n(x, y, z)\frac{\Delta z}{\cos\theta}\right) \tag{25}$$

[Formula 26]

$$\delta n(x, y, z) = n(x, y, z) - n_b \tag{26}$$

[Formula 27]

$$\cos\theta = \frac{\sqrt{n_b^2 k_V^2 - k_x^2 - k_y^2}}{n_b k_v} \tag{27}$$

Assuming that the complex amplitude of the light at the position ($z=z_{j-1}+(m-1)\,\Delta z$) of the m-th slice is u(x, y, z), the complex amplitude u (x, y, z+Δz) of the light at the position (z+Δz) after the light reversely propagates inside the m-th slice is represented by the following Formula (28). In the Formula (28), $P(k_x, k_y; \Delta z)$ is represented by the following Formula (29). The Formula (28) indicates that the complex amplitude u (x, y, z+Δz) of the light at the position (z+Δz) after propagating the slice of the thickness Δz is obtained by performing Fourier transform on a product of the complex amplitude u(x, y, z) of the light and the phase change o(x, y, z), and performing inverse Fourier transform on a product of a result of the above Fourier transform and $P(k_x, k_y; \Delta z)$. Paz is a function for performing calculation of the light propagation of Δz.

[Formula 28]

$$u(x, y, z+\Delta z) = P_{\Delta z}[o(x, y, z)\cdot u(x, y, z)] \equiv F^{-1}[P(k_x, k_y; \Delta z)\cdot F[o(x, y, z)\cdot u(x, y, z)]] \tag{28}$$

[Formula 29]

$$P(k_x, k_y; \Delta z) = \exp\left(-i\sqrt{n_b^2 k_v^2 - k_x^2 - k_y^2}\,\Delta z\right) \tag{29}$$

The propagation of the light wavefront in each slice of the j-th block is represented by the following Formulas (30) to (32). That is, when the complex amplitude of the light at the first position ($z=z_{j-1}$) of the j-th block is set to $u(x, y, z_{j-1})$, the complex amplitude $u(x, y, z_{j-1}+\Delta z)$ of the light after propagating the first slice of the j-th block is represented by the following Formula (30). When the complex amplitude of the light after propagating the (m−1)-th slice of the j-th block is set to $u(x, y, z_{j-1}+(m-1)\Delta z)$, the complex amplitude $u(x, y, z_{j-1}+m\Delta z)$ of the light after propagating the m-th slice of the j-th block is represented by the following Formula (31). When the complex amplitude of the light after propagating the (M−1)-th slice of the j-th block is set to $u(x, y, z_{j-1}+(M-1)\Delta z)$, the complex amplitude $u(x, y, z_j)$ of the light at the second position ($z=z_j$) after propagating the M-th slice of the j-th block is represented by the following Formula (32).

[Formula 30]

$$u(x, y, z_{j-1}+\Delta z) = P_{\Delta z}[o(x, y, z_{j-1})\cdot u(x, y, z_{j-1})] \tag{30}$$

[Formula 31]

$$u(x, y, z_{j-1}+m\Delta z) = P_{\Delta z}[o(x, y, z_{j-1}+(m-1)\Delta z)\cdot u(x, y, z_{j-1}+(m-1)\Delta z)] \tag{31}$$

-continued

[Formula 32]

$$u(x, y, z_j) = P_{\Delta z}[o(x, y, z_{j-1} + (M-1)\Delta z) \cdot u(x, y, z_{j-1} + (M-1)\Delta z)] \quad (32)$$

As described above, in the third complex amplitude image generation step S77, the light wavefront at the first position ($z=z_{j-1}$) is sequentially and reversely propagated inside the j-th block for each slice by the numerical calculation in consideration of the refractive index distribution of the j-th block, and thus, the light wavefront at the second position ($z=z_j$) can be obtained.

Figure 35:
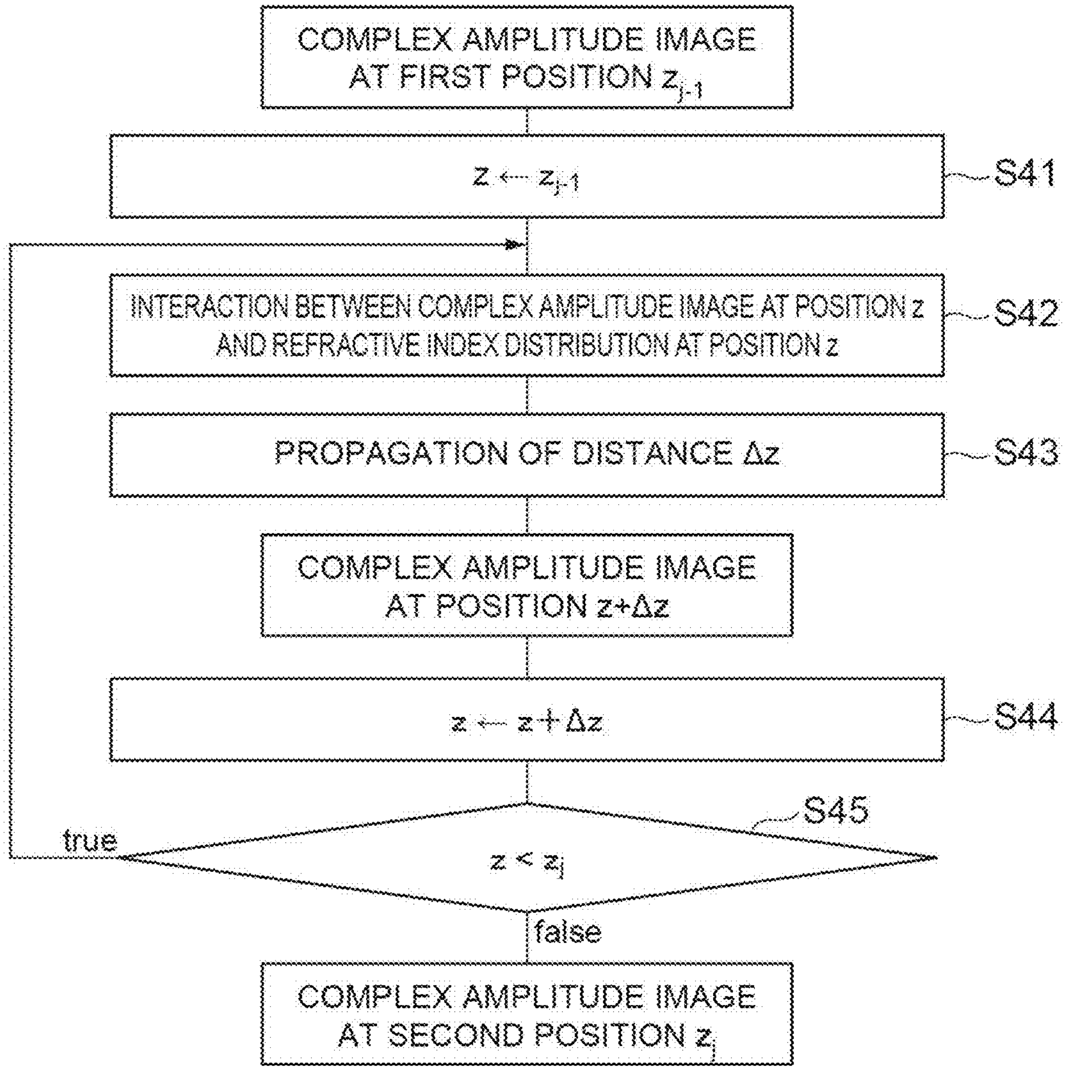
FIG. 35 is a flowchart of a third complex amplitude image generation step S77.

FIG. 35 is a flowchart of the third complex amplitude image generation step S77. In a step S41, the position z is initialized to the first position ($z=z_{j-1}$) of the j-th block. In a step S42, interaction between the complex amplitude u(x, y, z) of the light at the position z and the phase change o(x, y, z) is obtained. In a step S43, the wavefront of the light after the interaction is propagated by the distance Δz, and the complex amplitude u(x, y, z+Δz) of the light at the position z+Δz is obtained.

In a step S44, z obtained by adding Δz is set as new z. In a step S45, when it is determined that the position z has not yet reached the second position ($z=z_j$) of the j-th block, the process returns to the step S42 to repeat the steps S42 to S44. In the step S45, when it is determined that the position z reaches the second position ($z=z_j$) of the j-th block, the processing of the third complex amplitude image generation step S77 is ended. The complex amplitude of the light acquired at the end becomes the complex amplitude at the second position ($z=z_j$) of the j-th block.

According to the present embodiment also, it is possible to observe the moving observation object while reducing the influence of the multiple scattered light even when the observation object is the multiple scattering object.

In addition, self-interference may be used in the observation apparatus and the observation method. In this case, it is not necessary to provide the interference optical system in the observation apparatus.

The observation apparatus and the observation method are not limited to the embodiments and configuration examples described above, and various modifications are possible.

The observation apparatus of the first aspect according to the above embodiment includes (1) an interference optical system for splitting light output from a light source into object light and reference light, irradiating an observation object moving along a first direction with the object light, and combining and outputting the object light passed through the observation object and the reference light; (2) a frequency shifter provided on an optical path of the object light or the reference light from splitting to combining in the interference optical system, and for setting respective optical frequencies of the object light and the reference light different from each other by a heterodyne frequency; (3) an imaging unit having an imaging plane for receiving the object light and the reference light output from the interference optical system, and for imaging an interference intensity image generated by interference between the object light and the reference light on the imaging plane, and outputting time series data of the interference intensity image; and (4) an analysis unit for performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane coaxially with each other, and the analysis unit generates a complex differential interference image of each of a plurality of positions and a plurality of light irradiation directions when performing focused irradiation of the object light on the observation object by the irradiation optical system based on the time series data of the interference intensity image, and generates a three-dimensional phase image of the observation object based on the complex differential interference image.

The observation apparatus of the second aspect according to the above embodiment includes (1) an interference optical system for splitting light output from a light source into object light and reference light, irradiating an observation object moving along a first direction with the object light, and combining and outputting the object light passed through the observation object and the reference light; (2) an imaging unit having an imaging plane for receiving the object light and the reference light output from the interference optical system, and for imaging an interference intensity image generated by interference between the object light and the reference light on the imaging plane, and outputting time series data of the interference intensity image; and (3) an analysis unit for performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane from directions different from each other, and the analysis unit generates a complex differential interference image of each of a plurality of positions and a plurality of light irradiation directions when performing focused irradiation of the object light on the observation object by the irradiation optical system based on the time series data of the interference intensity image, and generates a three-dimensional phase image of the observation object based on the complex differential interference image.

In the above observation apparatus of the first or second aspect, the analysis unit may include (a) an interference intensity image acquisition unit for acquiring the time series data of the interference intensity image from the imaging unit; (b) a first complex amplitude image generation unit for generating, for each of the plurality of light irradiation directions, a complex amplitude image based on the time series data of the interference intensity image; (c) a second complex amplitude image generation unit for generating, for each of the plurality of light irradiation directions, a complex amplitude image at each of the plurality of positions based on the complex amplitude image generated by the first complex amplitude image generation unit; (d) a two-dimensional phase image generation unit for generating, for each of the plurality of positions, the complex differential interference image of each of the plurality of light irradiation directions based on the complex amplitude image of each of the plurality of light irradiation directions, and generating a two-dimensional phase image based on the complex differential interference image of each of the plurality of light irradiation directions; and (e) a three-dimensional phase image generation unit for generating the three-dimensional phase image based on the two-dimensional phase image at each of the plurality of positions.

In the above observation apparatus of the first or second aspect, the analysis unit may include (a) an interference intensity image acquisition unit for acquiring the time series data of the interference intensity image from the imaging unit; (b) a first complex amplitude image generation unit for generating, for each of the plurality of light irradiation directions, a complex amplitude image based on the time series data of the interference intensity image; (c) a second complex amplitude image generation unit for generating, for each of the plurality of light irradiation directions, a complex amplitude image at each of the plurality of positions based on the complex amplitude image generated by the first complex amplitude image generation unit; (d) a two-dimensional phase image generation unit for dividing, for each of the plurality of positions, the complex amplitude image of each of the plurality of light irradiation directions into a plurality of batches, correcting a phase of the complex amplitude image included in the batch based on the light irradiation direction for each of the plurality of batches, and then generating a complex amplitude summation image representing a summation of the complex amplitude images after correction, generating the complex differential interference image of each of the plurality of batches based on the complex amplitude summation image of each of the plurality of batches, and generating a two-dimensional phase image based on the complex differential interference image of each of the plurality of batches; and (e) a three-dimensional phase image generation unit for generating the three-dimensional phase image based on the two-dimensional phase image at each of the plurality of positions.

In the above observation apparatus of the first or second aspect, the analysis unit may include (a) an interference intensity image acquisition unit for acquiring the time series data of the interference intensity image from the imaging unit; (b) a first complex amplitude image generation unit for generating, for each of the plurality of light irradiation directions, a complex amplitude image based on the time series data of the interference intensity image; (c) a second complex amplitude image generation unit for generating, for each of the plurality of light irradiation directions, a complex amplitude image at each of the plurality of positions based on the complex amplitude image; (d) a phase conjugate operation unit for performing, before, during, or after a processing step by the second complex amplitude image generation unit, a phase conjugate operation on the complex amplitude image of each of the plurality of light irradiation directions to generate a complex amplitude image of each of the plurality of light irradiation directions when a relationship between light irradiation and imaging for the observation object is reversed; (e) a two-dimensional phase image generation unit for generating, for each of the plurality of positions, the complex differential interference image of each of the plurality of light irradiation directions based on the complex amplitude image of each of the plurality of light irradiation directions generated by the second complex amplitude image generation unit or the phase conjugate operation unit, and generating a two-dimensional phase image based on the complex differential interference image of each of the plurality of light irradiation directions; and (f) a three-dimensional phase image generation unit for generating the three-dimensional phase image based on the two-dimensional phase image at each of the plurality of positions, and when a phase image generated based on the complex amplitude image before performing the operation by the phase conjugate operation unit is set as a first phase image, and a phase image generated based on the complex amplitude image obtained by performing the operation by the phase conjugate operation unit is set as a second phase image, out of the plurality of positions, the two-dimensional phase image generation unit may generate the two-dimensional phase image mainly based on the first phase image at a position relatively close to the imaging unit, and may generate the two-dimensional phase image mainly based on the second phase image at a position relatively far from the imaging unit.

In the above observation apparatus of the first or second aspect, the analysis unit may further include a refractive index distribution calculation unit for obtaining a three-dimensional refractive index distribution of the observation object based on the three-dimensional phase image.

In the above observation apparatus of the first or second aspect, the analysis unit may include (a) an interference intensity image acquisition unit for acquiring the time series data of the interference intensity image from the imaging unit; (b) a first complex amplitude image generation unit for generating, for each of the plurality of light irradiation directions, a complex amplitude image based on the time series data of the interference intensity image; (c) a second complex amplitude image generation unit for generating, for each of the plurality of light irradiation directions, a complex amplitude image at each of the plurality of positions between a first position and a second position based on a complex amplitude image at the first position with respect to a distance from the imaging unit along a light propagation path; (d) a two-dimensional phase image generation unit for generating, for each of the plurality of positions, the complex differential interference image of each of the plurality of light irradiation directions based on the complex amplitude image of each of the plurality of light irradiation directions, and generating a two-dimensional phase image based on the complex differential interference image of each of the plurality of light irradiation directions; (e) a three-dimensional phase image generation unit for generating the three-dimensional phase image between the first position and the second position based on the two-dimensional phase image at each of the plurality of positions; (f) a refractive index distribution calculation unit for obtaining a three-dimensional refractive index distribution of the observation object between the first position and the second position based on the three-dimensional phase image; and (g) a third complex amplitude image generation unit for generating, for each of the plurality of light irradiation directions, a complex amplitude image at the second position based on the complex amplitude image at the first position and the three-dimensional refractive index distribution, and based on the complex amplitude image generated by the first complex amplitude image generation unit, respective processing steps of the second complex amplitude image generation unit, the two-dimensional phase image generation unit, the three-dimensional phase image generation unit, the refractive index distribution calculation unit, and the third complex amplitude image generation unit may be sequentially performed.

In the above observation apparatus, the two-dimensional phase image generation unit may generate the two-dimensional phase image based on a summation of the complex differential interference images of the plurality of light irradiation directions.

The observation method of the first aspect according to the above embodiment includes (1) an interference step of causing object light and reference light to interfere with each other, by using an interference optical system for splitting light output from a light source into the object light and the reference light, irradiating an observation object moving along a first direction with the object light, and combining and outputting the object light passed through the observation object and the reference light; (2) a modulation step of setting respective optical frequencies of the object light and the reference light different from each other by a heterodyne frequency, by using a frequency shifter provided on an optical path of the object light or the reference light from splitting to combining in the interference optical system; (3) an imaging step of imaging an interference intensity image generated by interference between the object light and the reference light on an imaging plane, and outputting time series data of the interference intensity image, by using an imaging unit having the imaging plane for receiving the object light and the reference light output from the interference optical system; and (4) an analysis step of performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane coaxially with each other, and the analysis step includes generating a complex differential interference image of each of a plurality of positions and a plurality of light irradiation directions when performing focused irradiation of the object light on the observation object by the irradiation optical system based on the time series data of the interference intensity image, and generating a three-dimensional phase image of the observation object based on the complex differential interference image.

The observation method of the second aspect according to the above embodiment includes (1) an interference step of causing object light and reference light to interfere with each other, by using an interference optical system for splitting light output from a light source into the object light and the reference light, irradiating an observation object moving along a first direction with the object light, and combining and outputting the object light passed through the observation object and the reference light; (2) an imaging step of imaging an interference intensity image generated by interference between the object light and the reference light on an imaging plane, and outputting time series data of the interference intensity image, by using an imaging unit having the imaging plane for receiving the object light and the reference light output from the interference optical system; and (3) an analysis step of performing analysis based on the time series data of the interference intensity image, and the interference optical system includes an irradiation optical system for, when the observation object is irradiated with the object light, focusing the object light and irradiating a line-shaped region extending in a second direction perpendicular to the first direction in the observation object with the object light; and an imaging optical system for, when the object light passed through the observation object is guided to the imaging plane, setting a positional relationship of Fourier transform between the observation object and the imaging plane in the first direction, and setting a positional relationship conjugate to each other between the observation object and the imaging plane in the second direction, and the object light and the reference light are incident on the imaging plane from directions different from each other, and the analysis step includes generating a complex differential interference image of each of a plurality of positions and a plurality of light irradiation directions when performing focused irradiation of the object light on the observation object by the irradiation optical system based on the time series data of the interference intensity image, and generating a three-dimensional phase image of the observation object based on the complex differential interference image.

In the above observation method of the first or second aspect, the analysis step may include (a) an interference intensity image acquisition step of acquiring the time series data of the interference intensity image from the imaging unit; (b) a first complex amplitude image generation step of generating, for each of the plurality of light irradiation directions, a complex amplitude image based on the time series data of the interference intensity image; (c) a second complex amplitude image generation step of generating, for each of the plurality of light irradiation directions, a complex amplitude image at each of the plurality of positions based on the complex amplitude image generated by the first complex amplitude image generation step; (d) a two-dimensional phase image generation step of generating, for each of the plurality of positions, the complex differential interference image of each of the plurality of light irradiation directions based on the complex amplitude image of each of the plurality of light irradiation directions, and generating a two-dimensional phase image based on the complex differential interference image of each of the plurality of light irradiation directions; and (e) a three-dimensional phase image generation step of generating the three-dimensional phase image based on the two-dimensional phase image at each of the plurality of positions.

In the above observation method of the first or second aspect, the analysis step may include (a) an interference intensity image acquisition step of acquiring the time series data of the interference intensity image from the imaging unit; (b) a first complex amplitude image generation step of generating, for each of the plurality of light irradiation directions, a complex amplitude image based on the time series data of the interference intensity image; (c) a second complex amplitude image generation step of generating, for each of the plurality of light irradiation directions, a complex amplitude image at each of the plurality of positions based on the complex amplitude image generated by the first complex amplitude image generation step; (d) a two-dimensional phase image generation step of dividing, for each of the plurality of positions, the complex amplitude image of each of the plurality of light irradiation directions into a plurality of batches, correcting a phase of the complex amplitude image included in the batch based on the light irradiation direction for each of the plurality of batches, and then generating a complex amplitude summation image representing a summation of the complex amplitude images after correction, generating the complex differential interference image of each of the plurality of batches based on the complex amplitude summation image of each of the plurality of batches, and generating a two-dimensional phase image based on the complex differential interference image of each of the plurality of batches; and (e) a three-dimensional phase image generation step of generating the three-dimensional phase image based on the two-dimensional phase image at each of the plurality of positions.

In the above observation method of the first or second aspect, the analysis step may include (a) an interference intensity image acquisition step of acquiring the time series data of the interference intensity image from the imaging unit; (b) a first complex amplitude image generation step of generating, for each of the plurality of light irradiation directions, a complex amplitude image based on the time series data of the interference intensity image; (c) a second complex amplitude image generation step of generating, for each of the plurality of light irradiation directions, a complex amplitude image at each of the plurality of positions based on the complex amplitude image; (d) a phase conjugate operation step of performing, before, during, or after a processing step by the second complex amplitude image generation step, a phase conjugate operation on the complex amplitude image of each of the plurality of light irradiation directions to generate a complex amplitude image of each of the plurality of light irradiation directions when a relationship between light irradiation and imaging for the observation object is reversed; (e) a two-dimensional phase image generation step of generating, for each of the plurality of positions, the complex differential interference image of each of the plurality of light irradiation directions based on the complex amplitude image of each of the plurality of light irradiation directions generated by the second complex amplitude image generation step or the phase conjugate operation step, and generating a two-dimensional phase image based on the complex differential interference image of each of the plurality of light irradiation directions; and (f) a three-dimensional phase image generation step of generating the three-dimensional phase image based on the two-dimensional phase image at each of the plurality of positions, and when a phase image generated based on the complex amplitude image before performing the operation by the phase conjugate operation step is set as a first phase image, and a phase image generated based on the complex amplitude image obtained by performing the operation by the phase conjugate operation step is set as a second phase image, out of the plurality of positions, the two-dimensional phase image generation step may include generating the two-dimensional phase image mainly based on the first phase image at a position relatively close to the imaging unit, and generating the two-dimensional phase image mainly based on the second phase image at a position relatively far from the imaging unit.

In the above observation method of the first or second aspect, the analysis step may further include a refractive index distribution calculation step of obtaining a three-dimensional refractive index distribution of the observation object based on the three-dimensional phase image.

In the above observation method of the first or second aspect, the analysis step may include (a) an interference intensity image acquisition step of acquiring the time series data of the interference intensity image from the imaging unit; (b) a first complex amplitude image generation step of generating, for each of the plurality of light irradiation directions, a complex amplitude image based on the time series data of the interference intensity image; (c) a second complex amplitude image generation step of generating, for each of the plurality of light irradiation directions, a complex amplitude image at each of the plurality of positions between a first position and a second position based on a complex amplitude image at the first position with respect to a distance from the imaging unit along a light propagation path; (d) a two-dimensional phase image generation step of generating, for each of the plurality of positions, the complex differential interference image of each of the plurality of light irradiation directions based on the complex amplitude image of each of the plurality of light irradiation directions, and generating a two-dimensional phase image based on the complex differential interference image of each of the plurality of light irradiation directions; (e) a three-dimensional phase image generation step of generating the three-dimensional phase image between the first position and the second position based on the two-dimensional phase image at each of the plurality of positions; (f) a refractive index distribution calculation step of obtaining a three-dimensional refractive index distribution of the observation object between the first position and the second position based on the three-dimensional phase image; and (g) a third complex amplitude image generation step of generating, for each of the plurality of light irradiation directions, a complex amplitude image at the second position based on the complex amplitude image at the first position and the three-dimensional refractive index distribution, and based on the complex amplitude image generated by the first complex amplitude image generation step, respective processing steps of the second complex amplitude image generation step, the two-dimensional phase image generation step, the three-dimensional phase image generation step, the refractive index distribution calculation step, and the third complex amplitude image generation step may be sequentially performed.

In the above observation method, the two-dimensional phase image generation step may include generating the two-dimensional phase image based on a summation of the complex differential interference images of the plurality of light irradiation directions.

The program according to the above embodiment is a program for causing a computer to execute the steps of the observation method of the above configuration.

The recording medium according to the above embodiment is a computer readable recording medium recording the program of the above configuration.

INDUSTRIAL APPLICABILITY

The embodiments can be used as an observation apparatus and an observation method capable of observing a moving observation object while reducing influence of multiple scattered light even when the observation object is a multiple scattering object.

The observation apparatus or the observation method of the above embodiments can reduce the influence of the multiple scattered light and observe the observation object even when the moving observation object is the multiple scattering object, and can be applied to, for example, a flow cytometer. Even when the observation object flowing along a flow path in the flow cytometer is the three-dimensional cell tissue such as the spheroid or the organoid, the three-dimensional cell tissue can be observed while reducing the influence of the multiple scattered light.

When the observation apparatus of the above embodiment and a three-dimensional culture analyzer are used in combination in the flow cytometer, a three-dimensional refractive index distribution of each three-dimensional cell tissue flowing along the flow path can be obtained by the observation apparatus, and further, the type can be determined by the three-dimensional culture analyzer based on the three-dimensional refractive index distribution. Thus, the number and the ratio of the three-dimensional cell tissues for each type can be obtained. Further, when a branch flow path is provided, separation, selection, and the like of the three-dimensional tissue can be performed by changing a direction in which the three-dimensional cell tissue flows for each type.

In addition, in the case in which gyratory culture (forming the three-dimensional culture while flowing cells along the flow path such as the flow cytometer) is performed, the observation apparatus or the observation method of the above embodiment can be used to observe the state in which the three-dimensional culture is gradually formed.

REFERENCE SIGNS LIST

1A-1F—observation apparatus, 10—light source, 21—beam splitter, 22, 23—mirror, 24—cylindrical lens, 25—lens, 26—cylindrical lens, 27—beam splitter, 28—lens, 30—frequency shifter, 40—imaging unit, 50—analysis unit, 51—interference intensity image acquisition unit, 52—first complex amplitude image generation unit, 53—second complex amplitude image generation unit, 54—two-dimensional phase image generation unit, 55—three-dimensional phase image generation unit, 56—refractive index distribution calculation unit, 57—display unit, 58—storage unit, 60—analysis unit, 61—interference intensity image acquisition unit, 62—first complex amplitude image generation unit, 63—second complex amplitude image generation unit, 64—phase conjugate operation unit, 65—two-dimensional phase image generation unit, 66—three-dimensional phase image generation unit, 67—refractive index distribution calculation unit, 68—display unit, 69—storage unit, 70—analysis unit, 71—interference intensity image acquisition unit, 72—first complex amplitude image generation unit, 73—second complex amplitude image generation unit, 74—two-dimensional phase image generation unit, 75—three-dimensional phase image generation unit, 76—refractive index distribution calculation unit, 77—third complex amplitude image generation unit, 78—display unit, 79—storage unit.

The invention claimed is:

1. An observation apparatus comprising:

an interference optical system configured to split light output from a light source into object light and reference light, irradiate an observation object moving along a first direction with the object light, and combine and output the object light passed through the observation object and the reference light;

a frequency shifter provided on an optical path of the object light or the reference light from splitting to combining in the interference optical system, and configured to set respective optical frequencies of the object light and the reference light different from each other by a heterodyne frequency;

a camera having an imaging plane configured to receive the object light and the reference light output from the interference optical system, and configured to image an interference intensity image generated by interference between the object light and the reference light on the imaging plane, and output time series data of the interference intensity image; and a computer configured to perform analysis based on the time series data of the interference intensity image, wherein the interference optical system includes:

an irradiation optical system configured to, when the observation object is irradiated with the object light, focus the object light and irradiate a line-shaped region extending in a second direction perpendicular to the first direction in the observation object with the object light; and an imaging optical system configured to, when the object light passed through the observation object is guided to the imaging plane, set a positional relationship of Fourier transform between the observation object and the imaging plane in the first direction, and set a positional relationship conjugate to each other between the observation object and the imaging plane in the second direction, and wherein the object light and the reference light are incident on the imaging plane coaxially with each other, the computer is configured to generate a complex differential interference image of each of a plurality of positions and a plurality of light irradiation directions when performing focused irradiation of the object light on the observation object by the irradiation optical system based on the time series data of the interference intensity image, and generate a three-dimensional phase image of the observation object based on the complex differential interference image, and the computer is further configured to:

acquire the time series data of the interference intensity image from the camera;

generate, for each of the plurality of light irradiation directions, a complex amplitude image based on the time series data of the interference intensity image;

generate, for each of the plurality of light irradiation directions, a complex amplitude image at each of the plurality of positions based on the complex amplitude image;

perform, before, during, or after generating, for each of the plurality of light irradiation directions, the complex amplitude image at each of the plurality of positions, a phase conjugate operation on the complex amplitude image of each of the plurality of light irradiation directions to generate a complex amplitude image of each of the plurality of light irradiation directions when a relationship between light irradiation and imaging for the observation object is reversed;

generate, for each of the plurality of positions, the complex differential interference image of each of the plurality of light irradiation directions based on the generated complex amplitude image of each of the plurality of light irradiation directions, and generate a two-dimensional phase image based on the complex differential interference image of each of the plurality of light irradiation directions; and generate the three-dimensional phase image based on the two-dimensional phase image at each of the plurality of positions, wherein when a phase image generated based on the complex amplitude image before performing the phase conjugate operation is set as a first phase image, and a phase image generated based on the complex amplitude image obtained by performing the phase conjugate operation is set as a second phase image, out of the plurality of positions, the computer is configured to generate the two-dimensional phase image mainly based on the first phase image at a position relatively close to the camera, and generate the two-dimensional phase image mainly based on the second phase image at a position relatively far from the camera.

2. The observation apparatus according to claim 1, wherein the computer is further configured to obtain a three-dimensional refractive index distribution of the observation object based on the three-dimensional phase image.

3. The observation apparatus according to claim 1, wherein the computer is further configured to generate the two-dimensional phase image based on a summation of the complex differential interference images of the plurality of light irradiation directions.

4. An observation apparatus comprising:

an interference optical system configured to split light output from a light source into object light and reference light, irradiate an observation object moving along a first direction with the object light, and combine and output the object light passed through the observation object and the reference light;

a camera having an imaging plane configured to receive the object light and the reference light output from the interference optical system, and configured to image an interference intensity image generated by interference between the object light and the reference light on the imaging plane, and output time series data of the interference intensity image; and a computer configured to perform analysis based on the time series data of the interference intensity image, wherein the interference optical system includes:

an irradiation optical system configured to, when the observation object is irradiated with the object light, focus the object light and irradiate a line-shaped region extending in a second direction perpendicular to the first direction in the observation object with the object light; and an imaging optical system configured to, when the object light passed through the observation object is guided to the imaging plane, set a positional relationship of Fourier transform between the observation object and the imaging plane in the first direction, and set a positional relationship conjugate to each other between the observation object and the imaging plane in the second direction, and wherein the object light and the reference light are incident on the imaging plane from directions different from each other, the computer is configured to generate a complex differential interference image of each of a plurality of positions and a plurality of light irradiation directions when performing focused irradiation of the object light on the observation object by the irradiation optical system based on the time series data of the interference intensity image, and generate a three-dimensional phase image of the observation object based on the complex differential interference image, and the computer is further configured to:

acquire the time series data of the interference intensity image from the camera;

generate, for each of the plurality of light irradiation directions, a complex amplitude image based on the time series data of the interference intensity image;

generate, for each of the plurality of light irradiation directions, a complex amplitude image at each of the plurality of positions based on the complex amplitude image;

perform, before, during, or after generating, for each of the plurality of light irradiation directions, the complex amplitude image at each of the plurality of positions, a phase conjugate operation on the complex amplitude image of each of the plurality of light irradiation directions to generate a complex amplitude image of each of the plurality of light irradiation directions when a relationship between light irradiation and imaging for the observation object is reversed;

generate, for each of the plurality of positions, the complex differential interference image of each of the plurality of light irradiation directions based on the generated complex amplitude image of each of the plurality of light irradiation directions, and generate a two-dimensional phase image based on the complex differential interference image of each of the plurality of light irradiation directions; and generate the three-dimensional phase image based on the two-dimensional phase image at each of the plurality of positions, wherein when a phase image generated based on the complex amplitude image before performing the phase conjugate operation is set as a first phase image, and a phase image generated based on the complex amplitude image obtained by performing the phase conjugate operation is set as a second phase image, out of the plurality of positions, the computer is configured to generate the two-dimensional phase image mainly based on the first phase image at a position relatively close to the camera, and generate the two-dimensional phase image mainly based on the second phase image at a position relatively far from the camera.

5. The observation apparatus according to claim 4, wherein the computer is further configured to obtain a three-dimensional refractive index distribution of the observation object based on the three-dimensional phase image.

6. The observation apparatus according to claim 4, wherein the computer is further configured to generate the two-dimensional phase image based on a summation of the complex differential interference images of the plurality of light irradiation directions.

7. An observation method comprising:

performing an interference of causing object light and reference light to interfere with each other, by using an interference optical system configured to split light output from a light source into the object light and the reference light, irradiate an observation object moving along a first direction with the object light, and combine and output the object light passed through the observation object and the reference light;

performing a modulation of setting respective optical frequencies of the object light and the reference light different from each other by a heterodyne frequency, by using a frequency shifter provided on an optical path of the object light or the reference light from splitting to combining in the interference optical system;

performing an imaging of imaging an interference intensity image generated by interference between the object light and the reference light on an imaging plane, and outputting time series data of the interference intensity image, by using a camera having the imaging plane configured to receive the object light and the reference light output from the interference optical system; and performing analysis based on the time series data of the interference intensity image, wherein the interference optical system includes:

an irradiation optical system configured to, when the observation object is irradiated with the object light, focus the object light and irradiate a line-shaped region extending in a second direction perpendicular to the first direction in the observation object with the object light; and an imaging optical system configured to, when the object light passed through the observation object is guided to the imaging plane, set a positional relationship of Fourier transform between the observation object and the imaging plane in the first direction, and set a positional relationship conjugate to each other between the observation object and the imaging plane in the second direction, and wherein the object light and the reference light are incident on the imaging plane coaxially with each other, the analysis includes generating a complex differential interference image of each of a plurality of positions and a plurality of light irradiation directions when performing focused irradiation of the object light on the observation object by the irradiation optical system based on the time series data of the interference intensity image, and generating a three-dimensional phase image of the observation object based on the complex differential interference image, and the analysis includes:

performing an interference intensity image acquisition of acquiring the time series data of the interference intensity image from the camera;

performing a first complex amplitude image generation of generating, for each of the plurality of light irradiation directions, a complex amplitude image based on the time series data of the interference intensity image;

performing a second complex amplitude image generation of generating, for each of the plurality of light irradiation directions, a complex amplitude image at each of the plurality of positions based on the complex amplitude image;

performing a phase conjugate operation of performing, before, during, or after a processing step by the second complex amplitude image generation, a phase conjugate operation on the complex amplitude image of each of the plurality of light irradiation directions to generate a complex amplitude image of each of the plurality of light irradiation directions when a relationship between light irradiation and imaging for the observation object is reversed;

performing a two-dimensional phase image generation of generating, for each of the plurality of positions, the complex differential interference image of each of the plurality of light irradiation directions based on the complex amplitude image of each of the plurality of light irradiation directions generated by the second complex amplitude image generation or the phase conjugate operation, and generating a two-dimensional phase image based on the complex differential interference image of each of the plurality of light irradiation directions; and performing a three-dimensional phase image generation f generating the three-dimensional phase image based on the two-dimensional phase image at each of the plurality of positions, wherein when a phase image generated based on the complex amplitude image before performing the operation by the phase conjugate operation is set as a first phase image, and a phase image generated based on the complex amplitude image obtained by performing the operation by the phase conjugate operation is set as a second phase image, out of the plurality of positions, the two-dimensional phase image generation includes generating the two-dimensional phase image mainly based on the first phase image at a position relatively close to the camera, and generating the two-dimensional phase image mainly based on the second phase image at a position relatively far from the camera.

8. The observation method according to claim 7, wherein the analysis further includes performing a refractive index distribution calculation of obtaining a three-dimensional refractive index distribution of the observation object based on the three-dimensional phase image.

9. The observation method according to claim 7, wherein the two-dimensional phase image generation includes generating the two-dimensional phase image based on a summation of the complex differential interference images of the plurality of light irradiation directions.

10. A non-transitory computer readable recording medium recording a program for causing a computer to execute the steps of the observation method according to claim 7.

11. An observation method comprising:

performing an interference of causing object light and reference light to interfere with each other, by using an interference optical system configured to split light output from a light source into the object light and the reference light, irradiate an observation object moving along a first direction with the object light, and combine and output the object light passed through the observation object and the reference light;

performing an imaging of imaging an interference intensity image generated by interference between the object light and the reference light on an imaging plane, and outputting time series data of the interference intensity image, by using a camera having the imaging plane configured to receive the object light and the reference light output from the interference optical system; and performing analysis based on the time series data of the interference intensity image, wherein the interference optical system includes:

an irradiation optical system configured to, when the observation object is irradiated with the object light, the object light and irradiate a line-shaped region extending in a second direction perpendicular to the first direction in the observation object with the object light; and an imaging optical system configured to, when the object light passed through the observation object is guided to the imaging plane, set a positional relationship of Fourier transform between the observation object and the imaging plane in the first direction, and set a positional relationship conjugate to each other between the observation object and the imaging plane in the second direction, and wherein the object light and the reference light are incident on the imaging plane from directions different from each other, the analysis includes generating a complex differential interference image of each of a plurality of positions and a plurality of light irradiation directions when performing focused irradiation of the object light on the observation object by the irradiation optical system based on the time series data of the interference intensity image, and generating a three-dimensional phase image of the observation object based on the complex differential interference image, and the analysis includes:

performing an interference intensity image acquisition of acquiring the time series data of the interference intensity image from the camera;

performing a first complex amplitude image generation of generating, for each of the plurality of light irradiation directions, a complex amplitude image based on the time series data of the interference intensity image;

performing a second complex amplitude image generation of generating, for each of the plurality of light irradiation directions, a complex amplitude image at each of the plurality of positions based on the complex amplitude image;

performing a phase conjugate operation of performing, before, during, or after a processing step by the second complex amplitude image generation, a phase conjugate operation on the complex amplitude image of each of the plurality of light irradiation directions to generate a complex amplitude image of each of the plurality of light irradiation directions when a relationship between light irradiation and imaging for the observation object is reversed;

performing a two-dimensional phase image generation of generating, for each of the plurality of positions, the complex differential interference image of each of the plurality of light irradiation directions based on the complex amplitude image of each of the plurality of light irradiation directions generated by the second complex amplitude image generation or the phase conjugate operation, and generating a two-dimensional phase image based on the complex differential interference image of each of the plurality of light irradiation directions; and performing a three-dimensional phase image generation f generating the three-dimensional phase image based on the two-dimensional phase image at each of the plurality of positions, wherein when a phase image generated based on the complex amplitude image before performing the operation by the phase conjugate operation is set as a first phase image, and a phase image generated based on the complex amplitude image obtained by performing the operation by the phase conjugate operation is set as a second phase image, out of the plurality of positions, the two-dimensional phase image generation includes generating the two-dimensional phase image mainly based on the first phase image at a position relatively close to the camera, and generating the two-dimensional phase image mainly based on the second phase image at a position relatively far from the camera.

12. A non-transitory computer readable recording medium recording a program for causing a computer to execute the steps of the observation method according to claim 11.

13. The observation method according to claim 11, wherein the analysis further includes performing a refractive index distribution calculation of obtaining a three-dimensional refractive index distribution of the observation object based on the three-dimensional phase image.

14. The observation method according to claim 11, wherein the two-dimensional phase image generation includes generating the two-dimensional phase image based on a summation of the complex differential interference images of the plurality of light irradiation directions.

* * * * *